United States Patent
Sawamura et al.

(12)

(10) Patent No.: US 6,362,792 B1
(45) Date of Patent: *Mar. 26, 2002

(54) ANTENNA APPARATUS AND PORTABLE RADIO SET

(75) Inventors: Masatoshi Sawamura; Yoshiki Kanayama, both of Saitama; Hiroki Ito, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/633,676

(22) Filed: Aug. 7, 2000

(30) Foreign Application Priority Data

Aug. 6, 1999 (JP) .......................... P11-224261
Aug. 6, 1999 (JP) .......................... P11-224263

(51) Int. Cl.[7] .............................. H01Q 1/24; H01Q 1/36
(52) U.S. Cl. .................... 343/702; 343/895; 343/725
(58) Field of Search ................. 343/702, 895, 343/725, 729, 850, 853, 852, 859, 860, 865; H01Q 1/24, 1/36

(56) References Cited

U.S. PATENT DOCUMENTS

| 6,075,488 A | * | 6/2000 | Hope | 343/702 |
| 6,097,341 A | * | 8/2000 | Saito | 343/702 |
| 6,097,349 A | * | 8/2000 | Sanford | 343/859 |
| 6,239,755 B1 | * | 5/2001 | Klemens et al. | 343/702 |

* cited by examiner

Primary Examiner—Hoanganh Le
(74) Attorney, Agent, or Firm—Jay H. Maioli

(57) ABSTRACT

An antenna that functions as an approximately balanced antenna that is structurally asymmetric but electrically symmetric includes a first antenna element that is extendable and retractable, a second fixed antenna element, an unbalanced transmission line feeding the first and second antenna elements, and a balanced-unbalanced convertor. At a time of extending the first antenna element, the first and second antenna elements are supplied an electric power from the unbalanced transmission line through the balanced-unbalanced convertor, so that the first and second antenna elements cooperate to function as an antenna.

43 Claims, 57 Drawing Sheets

FIRST ANTENNA ELEMENT

SECOND ANTENNA ELEMENT

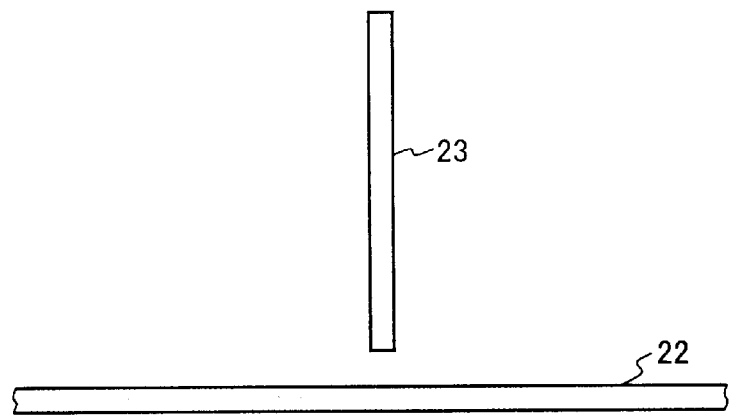
FIG.5
ANTENNA
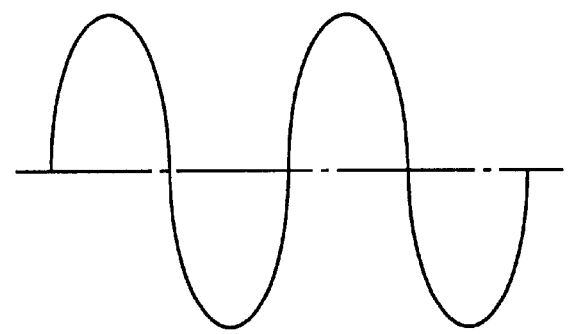
FIG.6A
GROUNDING MEMBER ─────────────────
FIG.6B

FIRST ANTENNA ELEMENT

SECOND ANTENNA ELEMENT

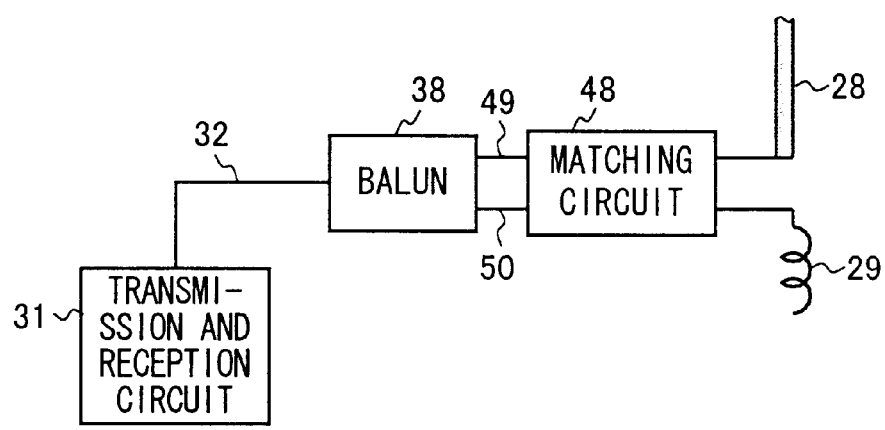
FIG.18
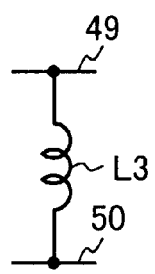 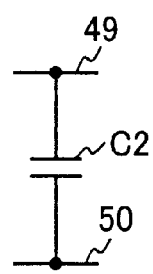
FIG.19A          FIG.19B

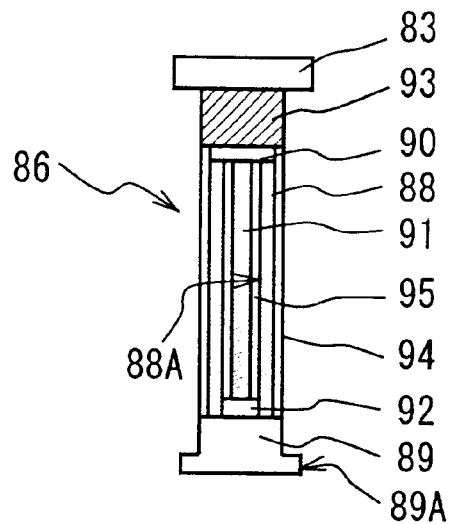
FIG.31A
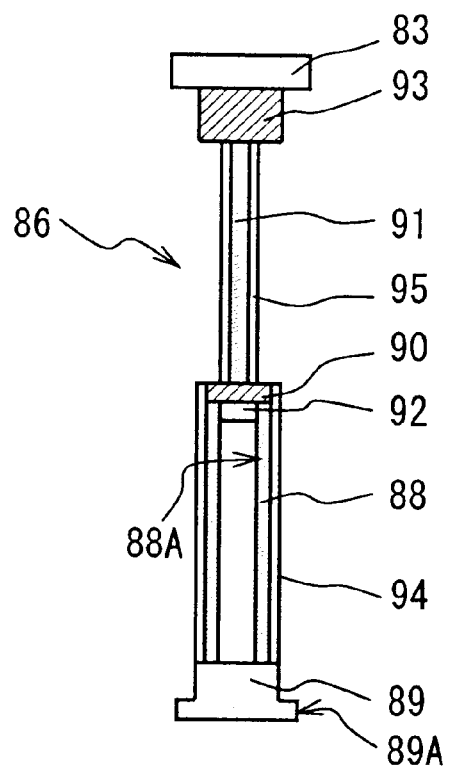
FG.31B

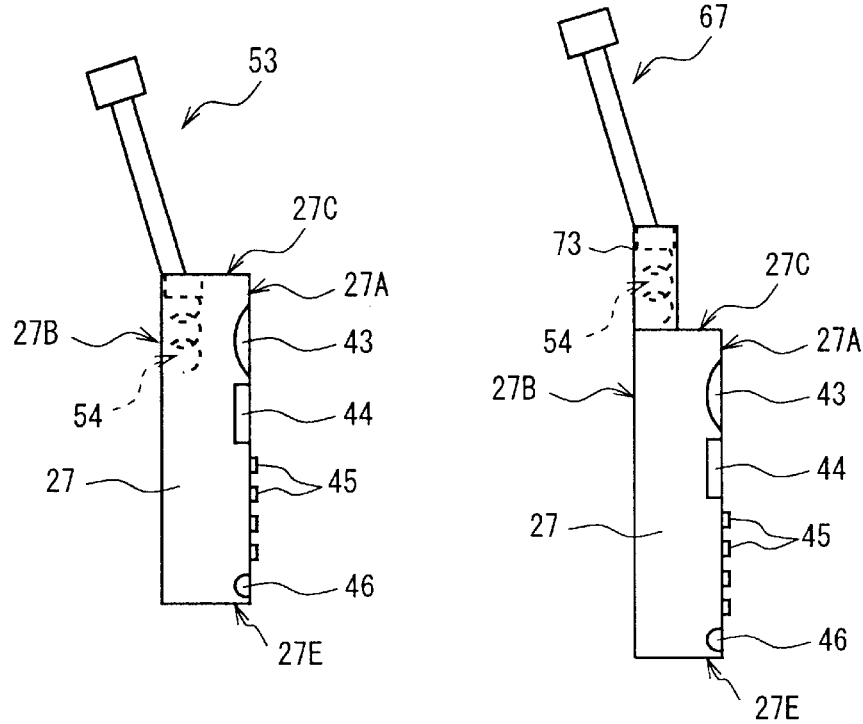
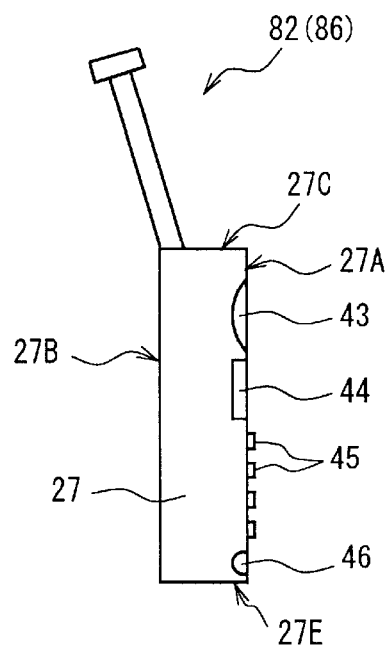
FIG.67A  FIG.67B
FIG.67C

ANTENNA APPARATUS AND PORTABLE RADIO SET

BACKGROUND OF THE INVENTION

1. Field of the Invention

The present invention relates to an antenna apparatus and a portable radio set, and more particularly, is suitably applied to a cellular telephone.

2. Description of the Related Art

At present, such kind of the cellular telephone is miniaturized and reduced in weight for improvement of portability. Thus, in the antenna apparatus installed in the cellular telephone, a retracting/pulling type of whip antenna is actively developed. Such kind of the cellular telephone is exemplified by that configured as shown in FIGS. 1A and 1B.

The cellular telephone 1 of such configuration is configured by installing a whip antenna apparatus 3 in a housing case 2 made of such nonconductive material as a synthetic resin.

The antenna apparatus 3 has an antenna part 6 in which a telescopic antenna 4 made of a conductive, rod-like wire material and a helical antenna 5 formed by winding helically the conductive wire material are installed. The antenna part 6 is retractably and pullably installed along with a direction (hereafter, retracting direction,) in which the antenna part 6 is pushed into the inside of the housing case 2 shown by an arrow A in the top end 2A of the housing case 2, and on the contrary, a direction (hereafter, pulling direction,) in which pulled out from the inside of the housing case 2 to outside.

In the antenna part 6, a first feeding member 7 made of the conductive material and having a projected part 7A is electrically and mechanically connected to the bottom end of the telescopic antenna 4, and a connecting part 8 made of nonconductive material is mechanically connected to the top end of the telescopic antenna 4.

A second feeding member 9 made of the conductive material is electrically and mechanically connected to the bottom end of the helical antenna 5 and the second feeding member 9 is mechanically connected to the connecting part 8. According to this, in the antenna part 6 the telescopic antenna 4 and the helical antenna 5 are mechanically connected by the connecting part 8 and electrically insulated.

The telescopic antenna 4 is covered with an antenna cover 10 for the rod and the helical antenna 5 is retracted in the cap-like antenna cover 11 for the helix to prevent direct touch with a human body.

On the other hand, the inside of the housing case 2 contains a circuit substrate (not illustrated,) in which various circuit elements such as a transmission and reception circuit 12 and a matching circuit 13 are implemented, and a shield case (not illustrated,) made of the conductive material covering the circuit substrate, as a grounding member.

Inside the top end 2A of the housing case 2, an antenna feeding terminal 14, made of the conductive material, electrically connected to the matching circuit 13 is installed, and the antenna feeding terminal 14 is electrically connected to only any one of the telescopic antenna 4 or the helical antenna 5 in retracting and pulling out the antenna part 6.

Practically in the antenna apparatus 3, in pushing the antenna part 6 in, the antenna cover 11 for helix is pushed to a retracting direction to contact to the top end 2A of the housing case 2, the telescopic antenna 4 is retracted in the inside of the housing case 2 to house it and then, the second feeding member 9 is electrically connected to the antenna feeding terminal 14.

In the antenna apparatus 3, the helical antenna 5 is worked as the antenna by feeding the helical antenna 5 sequentially through the transmission and reception circuit 12, the matching circuit 13, the antenna feeding terminal 14, and the second feeding member 9.

Here in the antenna apparatus 3, the telescopic antenna 4 is adapted to no work as the antenna by electrically insulating from the antenna feeding terminal 14 in the connecting part 8.

In contrast, in the antenna apparatus 3, the second antenna cover 11 is pinched to pull to a pulling direction in a status in which the telescopic antenna 4 is retracted inside of the housing case 2 followed in pulling out the telescopic antenna 4 from the top end 2A of the housing case 2 to outside, and then the projected part 7A of the first feeding member 7 contacts with the antenna feeding terminal 14 to connect electrically the first feeding member 7 to the antenna feeding terminal 14.

In the antenna apparatus 3, the telescopic antenna 4 is worked as the antenna by feeding the telescopic antenna 4 sequentially through the transmission and reception circuit 12, the matching circuit 13, the antenna feeding terminal 14, and the first feeding member 7.

Here in the antenna apparatus 3, the helical antenna 5 is adapted to no work as the antenna by electrically insulating from the antenna feeding terminal 14 in the connecting part 8.

When the telescopic antenna 4 and the helical antenna 5 are worked respectively as antennae, impedance of the telescopic antenna 4 and the helical antenna 5 are matched to that of the unbalanced transmission line 16 using the matching circuit 13.

The shield case functions as a ground against various circuit elements and also functions as an electric shielding plate to prevent invasion of stray components of an electric wave of an external noise and the electric wave radiated from the antenna part 6 into various circuit elements implemented on the circuit substrate.

According to this, in the cellular telephone 1, in pulling the antenna part 6, the telescopic antenna 4 is pulled outside from the housing case 2, a transmission signal consisting of a high frequency signal is sent from the transmission and reception circuit 12 to the telescopic antenna 4 through the matching circuit 13, the transmission signal is sent to a base station (not illustrated) through the telescopic antenna 4, and also signal consisting of a high frequency signal, which is sent from base station and received by the telescopic antenna 4, is sent to the transmission and reception circuit 12 through the matching circuit 13.

In the cellular telephone 1, in retracting the antenna part 6, the telescopic antenna 4 is retracted inside the housing case 2 to prevent loss of portability thereof, in this status the transmission signal is sent from the transmission and reception circuit 12 to the helical antenna 5 through the matching circuit 13, the transmission signal is sent to the base station through the helical antenna 5, and also signal, which is sent from base station and received by the helical antenna 5, is sent to the transmission and reception circuit 12 through the matching circuit 13.

In the cellular telephone 1 with such configuration, for example, the unbalanced transmission line 15 comprising a microstrip line formed on the circuit substrate is installed, the telescopic antenna 4 or the helical antenna 5 is electrically connected to the transmission and reception circuit 12 sequentially through a hot side of the unbalanced transmission line 15 and the matching circuit 13, and also the ground side of the unbalanced transmission line 15 is grounded to the shield case.

Therefore, in the cellular telephone 1, as shown in FIG. 2A and 2B, when the telescopic antenna 4 or the helical antenna 5 is supplied an electric power from the transmission and reception circuit 12 sequentially through a hot side of the unbalanced transmission line 15 and the matching circuit 13 to work the telescopic antenna 4 or the helical antenna 5 as the antenna, a leak current i1 flows from the ground side of the unbalanced transmission line 15 to the shield case 16, showing that the shield case 16 works as the antenna.

However, in the cellular telephone 1, there is a problem that because the shield case 16 works as the antenna, when a user hold the housing case 2, a hand of the user covers over the shield case 16 through the housing case 2, and as a result, an antenna performances of the cellular telephone 1 deteriorates thereby decreasing in speech quality.

When the shield case 16 works as the antenna, if the user moves the housing case 2, held by the user's hand, close to the user's head, the head goes to the shield case 16 through the housing case 2 and thus, the antenna performances of the cellular telephone 1 further deteriorates resulting in decrease in speech quality.

Further, there is a problem that when the shield case 16 is moved close to the user's hand or head, an electric power (so-called Specific Absorption Rate (SAR)) per unit time per unit mass absorbed by a certain site of a human body increases for amount thereof.

SUMMARY OF THE INVENTION

In view of the foregoing, an object of the invention is to provide an antenna apparatus and a portable radio set allowing greatly inhibiting decrease in speech quality.

The foregoing object and other objects of the invention have been achieved by the provision of an antenna apparatus which comprises a first antenna element installed retractably and pullably in a housing case, a fixed second antenna element making a pair with the first antenna element; an unbalanced transmission line feeding to the first and second antenna elements; and balanced-unbalanced converter means operating the balanced-unbalanced converter action between the unbalanced transmission line and the first and second antenna elements, wherein at the time of retracting and pulling the first antenna element, the first and second antenna elements are supplied an electric power from the unbalanced transmission line through the balanced-unbalanced converter means to work the first and second antenna elements as an antenna.

As a result, when the first and second antenna elements work as the antennae, it is prevented that the leaked current flows from the first and second antenna elements to the grounding member, to which the unbalanced transmission line is grounded, by the balanced-unbalanced converter action of the unbalanced transmission means through the unbalanced transmission line, and therefore, the work of the grounding member as the antenna can be prevented to allow greatly reducing deterioration of the performances of antenna near the human body.

Further the present invention provides an antenna apparatus which comprises a first antenna element installed retractably and pullably, fixed second and third antenna elements, an unbalanced transmission line feeding to the first and second and third antenna elements, balanced-unbalanced converter means operating the balanced converter between the unbalanced transmission line and the second and third antenna elements, wherein in retracting in the first antenna element, the first antenna element is electrically connected to the third antenna elements to make the first complex antenna to work as the antenna by feeding the second antenna elements and the first complex antenna from the unbalanced transmission line through the balanced-unbalanced converter means, and in pulling out the first antenna element, the first antenna element is electrically connected to the second antenna element to make the second complex antenna to work as the antenna by feeding the second complex antenna and third antenna element from the unbalanced transmission line through the balanced-unbalanced converter means.

As a result, when the second antenna element and the first complex antenna, and the second complex antenna and third antenna element are respectively worked as the antenna, a flow of a leaked current from the second antenna element or the first complex antenna, and the second complex antenna or third antenna element to the grounding member, to which the unbalanced transmission line is grounded, through the unbalanced transmission line is inhibited by balancing and unbalancing converter actions of the balanced-unbalanced converter means; and thus, action of the grounding member as the antenna is inhibited to allow greatly reducing deterioration of the performances of antenna near the human body.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is the outlined line drawing showing a configuration of an unbalanced type antenna;

FIGS. 6A and 6B are the outlined line drawings of a voltage wavelength for explanation of an action of the unbalanced type antenna;

FIG. 18 is the block diagram for explanation of arrangement of the matching circuit to a balanced side of the balun;

FIG. 19A and 19B are the block diagram showing the configuration of the matching circuit arranged in the balanced side of the balun;

FIGS. 31A and 31B are the sectional views showing the configuration of the first antenna part of the cellular telephone according to the eighth embodiment;

FIGS. 67A to 67C are the outlined drawings of the side view for explanation of retracting and pulling directions of the antenna parts, according to another embodiment;

DETAILED DESCRIPTION OF THE EMBODIMENT

Figure 3:
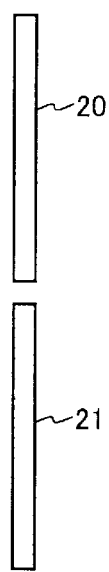
FIG. 3 is an outlined line drawing showing a configuration of a balanced type antenna.
Figure 4A:
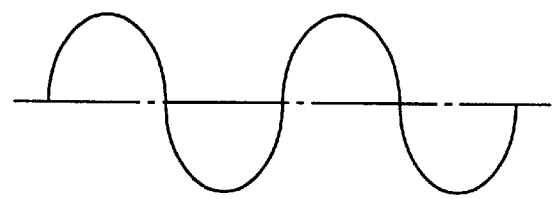
FIGS. 4A and 4B are the outlined line drawings of a voltage wavelength for explanation of an action of the balanced type antenna.
Figure 4B:
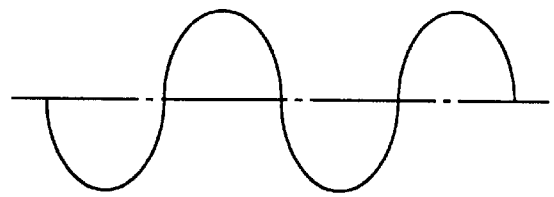

Preferred embodiments of this invention will be described with reference to the accompanying drawings:
(1) Principle As shown in FIG. 3, as similar to a dipole antenna, the antenna comprising the first and the second antenna elements 20 and 21, which are structurally and electrically symmetric, as shown in FIGS. 4A and 4B, has the same amplitude as that of the first and the second antenna elements 20 and 21, and also has a driven mode of a balanced type by working through an occurrence of voltages of which phases differ 180° C. from each other, and thus, classified in a balanced type antenna.

In addition, as shown in FIG. 5, exemplified by a monopole antenna almost vertically arranged on the grounding member which can be regarded as infinite area vast than a disk with a semidiameter of wavelength (electric length,) that configured by the grounding member 22 structurally asymmetric and regarded as infinite area and the antenna 23 arranged almost vertically to this is, as shown in FIGS. 6A and 6B, the vast grounding member 22 becomes approximately zero potential and then, works by occurrence of the voltage changing in a predetermined cycle in the antenna 23 to take an unbalanced driven mode and thus, is classified as an unbalanced type antenna.

For reference, in such unbalanced type antenna, having the vast grounding member 22 allows estimating easily an image current running in the unbalanced type antenna and the antenna performances of the unbalanced type antenna can be selected to be almost equal to the balanced type antenna.

Figure 1A:
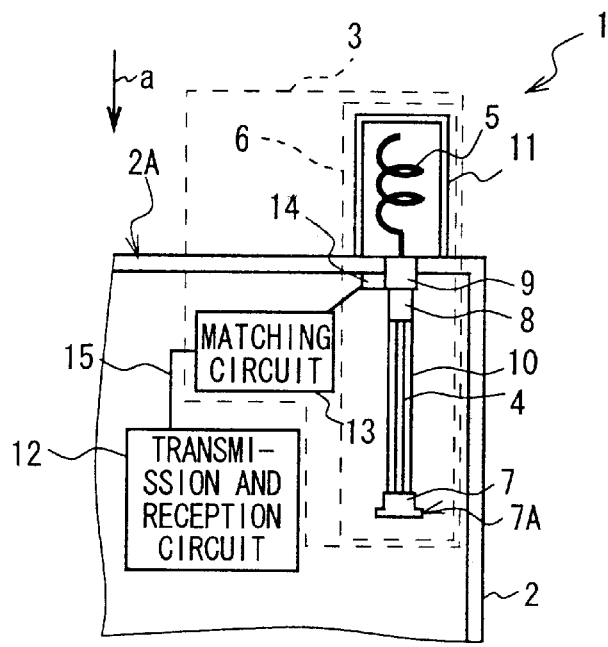
FIGS. 1A and 1B are the block diagrams showing the configuration of a circuit of a conventional cellular telephone.
Figure 1B:
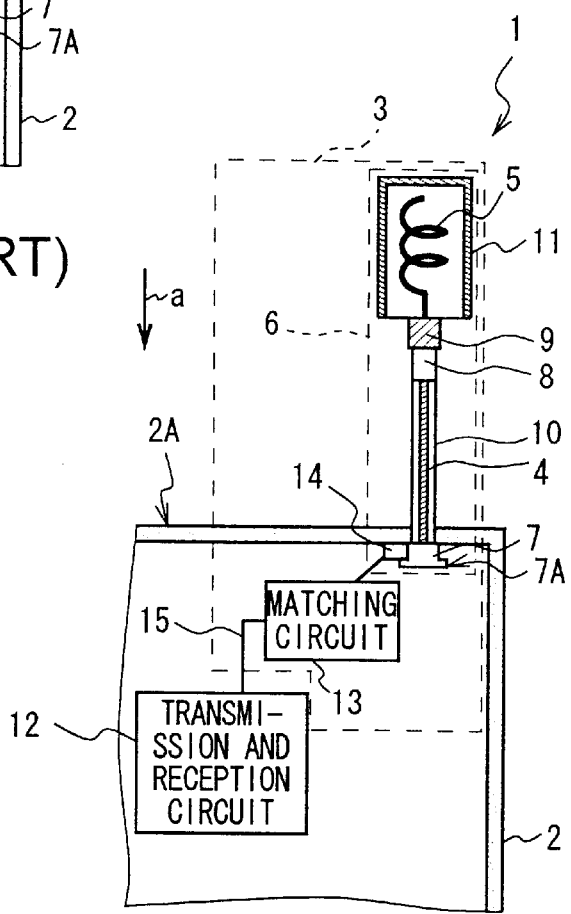
Figure 2A:
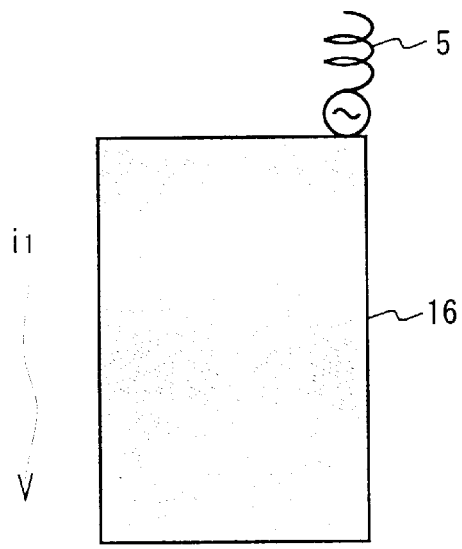
FIGS. 2A and 2B are the outlined drawings of a frontal view for explanation of the action of a conventional shield case as the antenna.
Figure 2B:
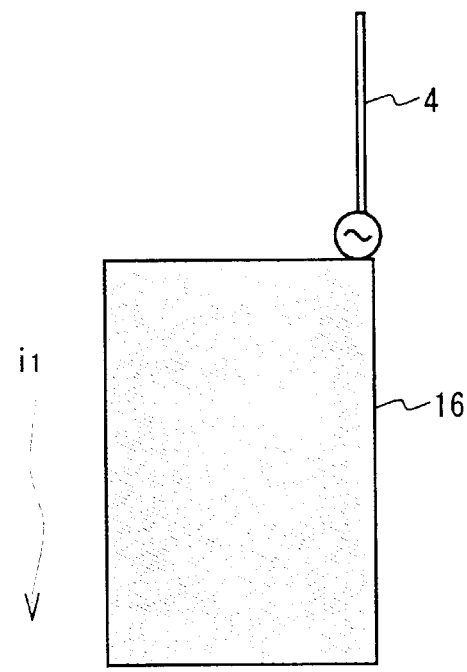
Figure 7:
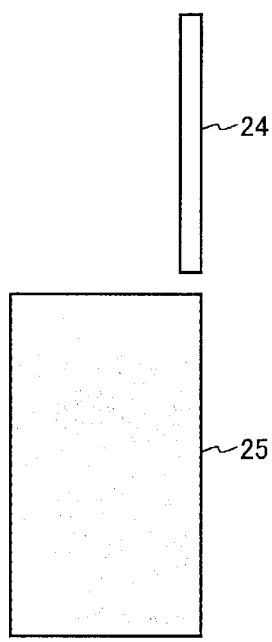
FIG. 7 is the outlined line drawing showing a configuration of an intermediate driven mode antenna.

Further, shown in FIG. 7, there are antennae configured by the first and the second antenna elements 24 and 25 structurally and electrically asymmetric, exemplified by the telescopic antenna 4 (FIGS. 1A and 1B) or the helical antenna 5 (FIGS. 1A and 1B) and the shield case 16 (FIGS. 2A and 2B) shown in the conventional cellular telephone 1. (FIGS. 1A and 1B)

Figure 8A:
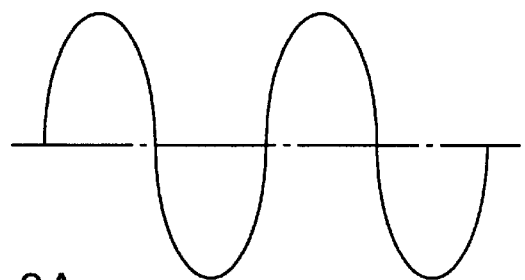
FIG. 8A and 8B are the outlined line drawing of a voltage wavelength for explanation of an example of the action of the intermediate driven mode antenna.
Figure 8B:
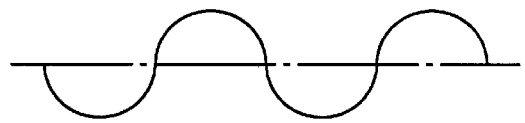

The antenna with such configuration is structurally and electrically asymmetric and thus, as shown in FIGS. 8A and 8B for example, takes an intermediate driven mode not determined to balanced driven mode or unbalanced driven mode; and therefore, is classified in an antenna (hereafter, the antenna of intermediate driven mode) differing from balanced antenna and unbalanced antenna.

Figure 9:
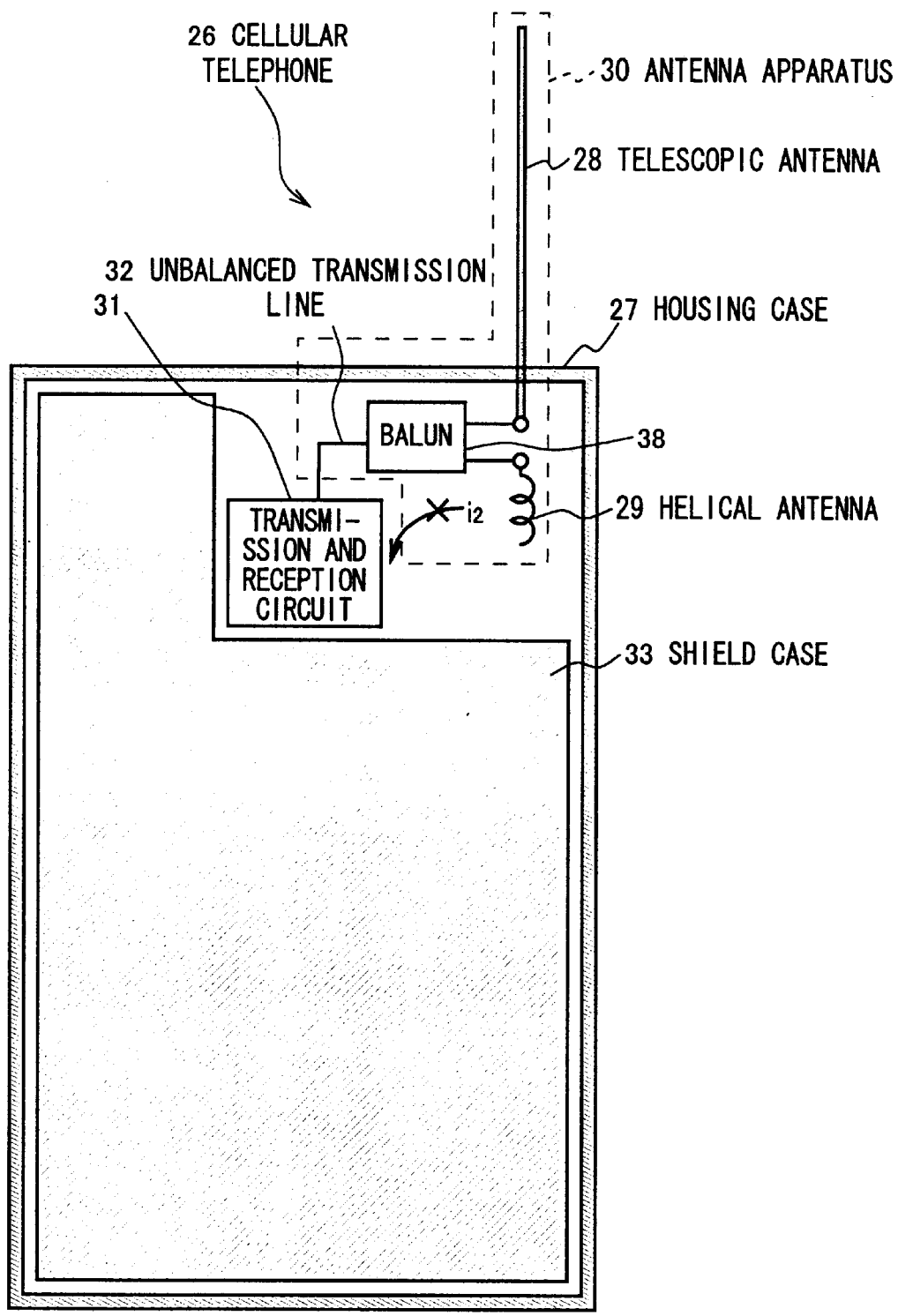
FIG. 9 is the outlined line drawing of a sectional view for explanation of principle of a cellular telephone according to the present invention.

And, FIG. 9 shows the cellular telephone 26 according to the present invention, excluding the matching circuit. In the cellular telephone 26, the antenna apparatus 30 having the antenna (hereafter, an approximately balanced antenna,) as the first and the second antenna elements, which, similar to such as the telescopic antenna 28 and the helical antenna 29, is structurally asymmetric but becomes electrically symmetric to take almost balanced type driven mode by selecting an approximately same values in the electric lengths of the telescopic antenna 28 and the helical antenna 29, is adapted to install in the housing case 27.

In addition, in the antenna apparatus 30, the telescopic antenna 28 and the helical antenna 29 are simultaneously adapted to work as the antennae by feeding the telescopic antenna 28 and the helical antenna 29 from the transmission and reception circuit 31 through the unbalanced transmission line 32.

For reference, the antenna used for the antenna apparatus is classified as the approximately balanced antenna unless otherwise w mentioned, on the basis in that it is structurally asymmetric but electrically symmetric to take the balanced driven mode.

In addition, FIG. 9 shows the transmission and reception circuit 31 by locating outside of the shield case 33 inside the housing case 27 to simplify the explanation; however, the transmission and reception circuit 31 has been really located inside the shield case 33.

Figure 10:
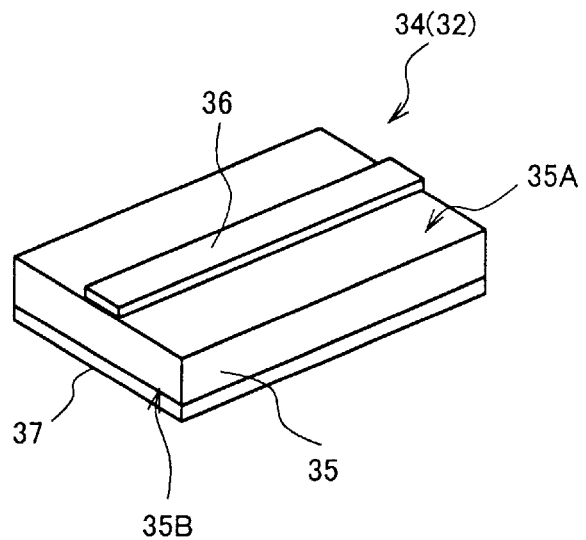
FIG. 10 is the outlined line drawing of a perspective side view showing the configuration of an unbalanced transmission line comprising a microstrip line.
Figure 11:
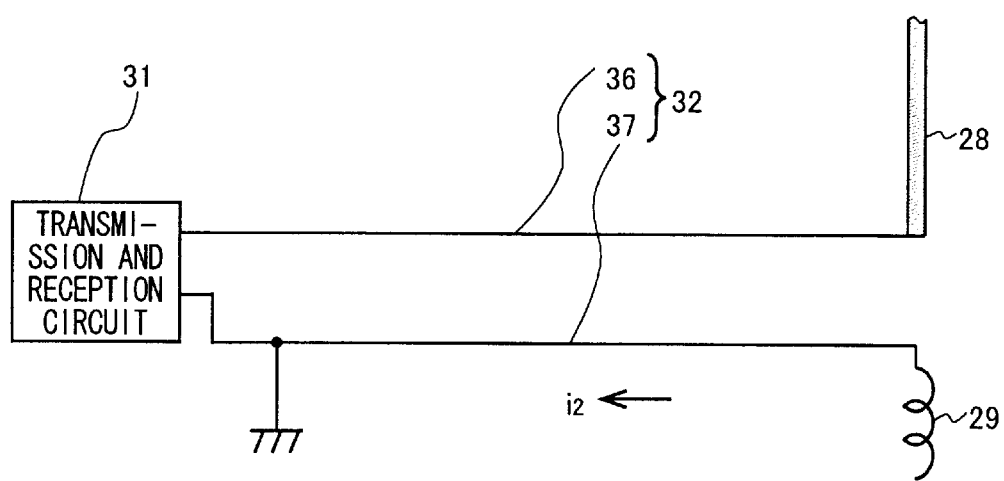
FIG. 11 is the outlined line drawing of block diagram for explanation of connection of the unbalanced transmission line to a telescopic antenna and a helical antenna.

By the way, as shown in FIG. 10, when the microstrip line 34 is applied as the unbalanced transmission line 32, the microstrip line 34 is configured by forming a strip electric conductor 36 in the one face 35A of a dielectric layer 35 having a predetermined thickness and forming a grounding electric conductor 37 on the other face 35B of the dielectric layer 35 and thereby the strip electric conductor 36 is assigned to a hot side and the grounding electric conductor 37 is assigned to a ground side.

And, as described above, in the antenna apparatus 30, as shown in FIG. 9, the one of the telescopic antenna 28, for example, of basically approximately balanced type antenna is electrically connected to the transmission and reception circuit 31 through the hot side 36 of the unbalanced transmission line 32 and the other helical antenna 29 is electrically connected to the transmission and reception circuit 31 through the grounded side 37 of the unbalanced transmission line 32 and also connected to the shield case (not illustrated) through the grounded side 37.

However, in the antenna apparatus 30, the telescopic antenna 28 and the helical antenna 29 take the balanced type driven mode and in contrast, the unbalanced transmission line 32 takes the unbalanced driven mode by grounding of the grounded side 37 to make the driven mode different from each. Therefore, after the telescopic antenna 28 and the helical antenna 29 are directly electrically connected to the unbalanced transmission line 32, unbalanced current is caused by a difference in driven modes when the telescopic antenna 28 and the helical antenna 29 work as the antenna.

As the result, in the cellular telephone 26, the leaked current i2 flows from the helical antenna 29 to the shield case (not illustrated) having the approximately same potential as that of the grounded side 37 through the grounded side 37 of the unbalanced transmission line 32. According to this, the shield case works as the antenna by this leaked current i2 to cause deterioration of the antenna performances of the cellular telephone 26, when the housing case 27 is covered by the hand or head of the user.

Figure 12:
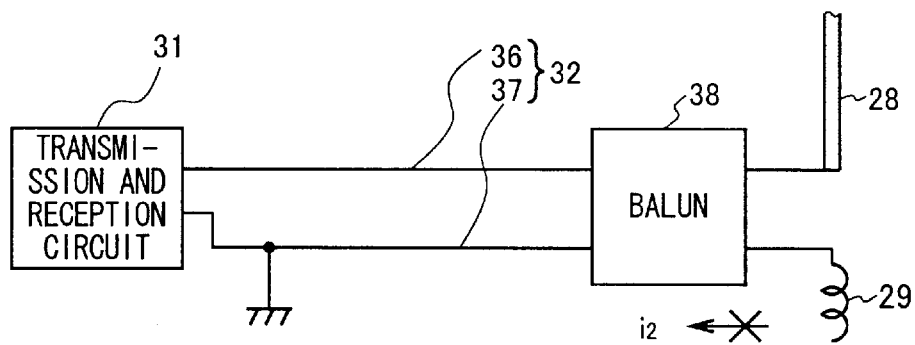
FIG. 12 is the outlined line drawing of block diagram for explanation of connection of the unbalanced transmission line to a telescopic antenna and a helical antenna by using a balun.

Thus, as shown in FIG. 12, in the antenna apparatus 30 according to the present invention, a balun (balanced-to-unbalanced transformer) 38, which operates the balanced converter action, is installed across the unbalanced transmission line 32 and the telescopic antenna 28 and the helical antenna 29. Flow of the leaked current i2 from the helical antenna 29 to the grounded side 37 of the unbalanced transmission line 32 is prevented by the balanced converter action of this balun 38. Hence, it is prevented that the shield case works as the antenna by the leaked current i2.

Figure 13:
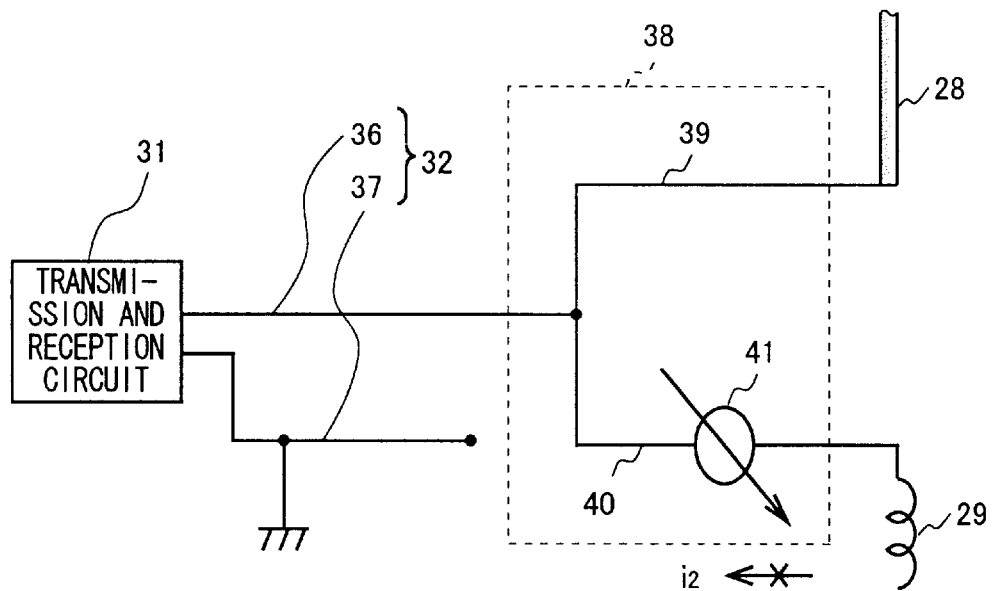
FIG. 13 is the block diagram showing the configuration of the balun.

The balun 38, as shown in FIG. 13, has transmission lines 39 and 40 to branch an end of the hot side 36 of the unbalanced transmission line 32 in two lines, the telescopic antenna 28, for example, of the approximately balanced type is electrically connected to the one transmission line 39 of lines branched, and on the other hand the helical antenna 29 of the approximately balanced type is electrically connected to the other transmission line 40 through a phaser 41.

Figure 14:
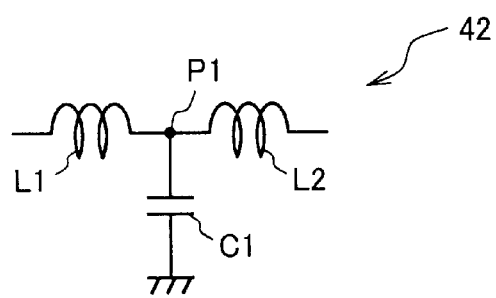
FIG. 14 is the block diagram showing the configuration of a phase circuit of the balun.

Here, the phaser 41, as shown in FIG. 14 for example, is configured by serial connection of two inductive reactance elements L1 and L2, connection of one end of a capacitive reactance element C1 to a middle point P1 of connection with continuity, and combination of a plurality of a T-shaped phase circuit 42, with the symmetric structure, formed by grounding the other end of the capacitive reactance element C1 to the shield case.

And, in the phaser 41, a high frequency signal supplied from the transmission and reception circuit 31 through the hot side 36 of the unbalanced transmission line 32 is supplied to the telescopic antenna 28 through the one transmission line 39, and in the phaser 41 of the other transmission line 40, the high frequency signal is sent to the helical antenna 29 by moving a phase about 180° C. by balanced converter action in a frequency band in service.

According to this, in the balun 38, the telescopic antenna 28 and the helical antenna 29 are worked as the approximately balanced type antenna electrically symmetric to appear the voltage mode similar to the FIGS. 4A and 4B as described above and thus, the current is balanced in the telescopic antenna 28 and the helical antenna 29 to prevent flow of the leaked current i2 from the helical antenna 29 to the grounded side 37 of the unbalanced transmission line 32.

For reference, such balun 38 can be prepared in very small shape as a whole, because the phaser 41 can use inductive reactance elements L1 and L2 and the capacitive reactance element C, that are very small, chip-shaped, 1 mm squared for example, of the phase circuit 42 as described above.

Therefore, in the cellular telephone 26 (FIG. 9) according to the present invention, the telescopic antenna 28 and the helical antenna 29 is supplied the electric power from the transmission and reception circuit 31 sequentially through the unbalanced transmission line 32 and the balun 38 to work the telescopic antenna 28 and the helical antenna 29 as the approximately balanced antenna, and then in order to prevent flow of the leak current i2 from the helical antenna 29 to the ground side 37 of the unbalanced transmission line 32 by balanced converter action of the balun 38, it is possible that the shield case 33 does not work as the antenna but functions only as an original ground and electric shielding plate.

According to this, the cellular telephone 26 decreases deterioration of the antenna performances and thus, it allows greatly inhibiting decrease in speech quality. In the cellular telephone 26, the shield case 33 works only as the original ground and electric shielding plate and thus, the electric power, i. e., SAR, absorbed by the human body is greatly reduced.

For reference, FIG. 9 shows the balun 38 located outside the shield case 33 inside the housing case 27; however, the balun 38 can be located in either inside or outside of the shield case 33.

Figure 15:
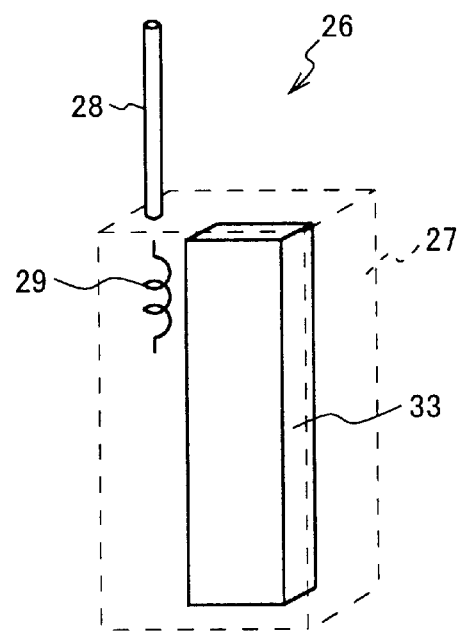
FIG. 15 is the outlined line drawing for explanation of arrangement of the telescopic antenna and the helical antenna, and a shield case.

In the cellular telephone 26 according to the present invention, as shown in FIG. 15, in an internal part of the housing case 27, the shield case 33, the telescopic antenna 28, and the helical antenna 29 are located with a certain distance each other to prevent a capacitive coupling. Thus, when the telescopic antenna 28 and the helical antenna 29 work as the antenna, it is prevented that the shield case 33 works as the antenna by making the capacitive coupling with the telescopic antenna 28 and the helical antenna 29.

Figure 16:
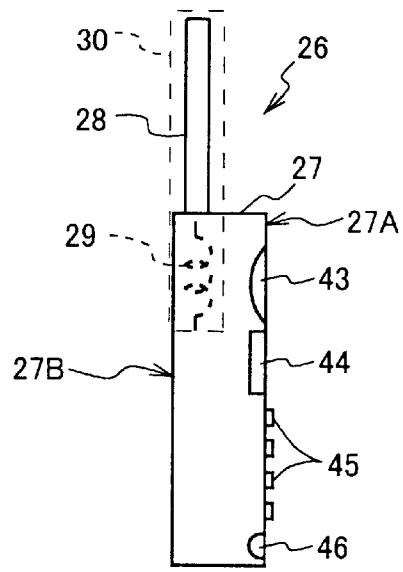
FIG. 16 is the outlined line drawing of a side view for explanation of arrangement of the telescopic antenna and the helical antenna to a housing case.

In addition to this, in the cellular telephone 26 according to the present invention, as shown in FIG. 16, a speaker 43, a liquid crystal display part 44, various operational keys 45, microphone 46 are arranged on a front face 27A of the housing case 27. On speaking, the telescopic antenna 28 and the helical antenna 29 are collectively arranged in a back face 27B side of the housing case 27 by moving the front face 27A close to the head of the user.

Therefore, even if the housing case 27 is moved close to the head of the user, the telescopic antenna 28 and the helical antenna 29 can keep a distance from the head. As a result, it is greatly reduced that the power emitted from the telescopic antenna 28 and the helical antenna 29 is absorbed by the head of the user.

Figure 17:
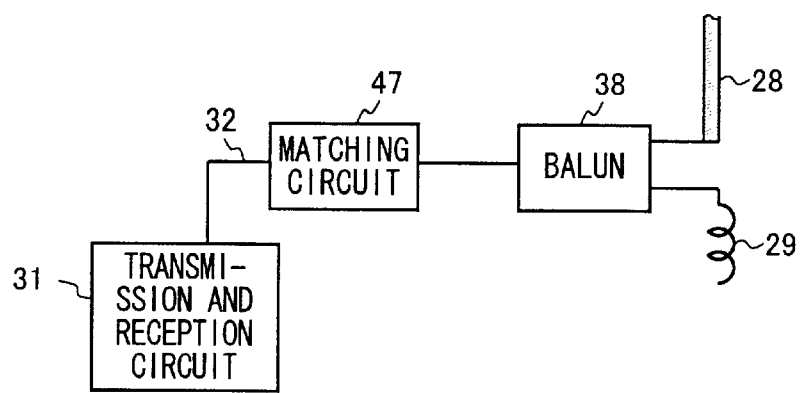
FIG. 17 is the block diagram for explanation of arrangement of a matching circuit to an unbalanced side of the balun.

By the way, FIG. 9, FIGS. 11 to 13 are shown by excluding the matching circuit to simplify explanation. However, as shown in FIG. 17, the matching circuit 47 can be put between the unbalanced transmission line 32 and the balun 38.

Also shown in FIG. 18, the matching circuit 48 can be put between the balun 38 and the telescopic antenna 28 and the helical antenna 29. However, here, if the matching circuit 48 is grounded, even if the balun 38 operates balanced converter action, the leak current occurred in the helical antenna 29 flows to the shield case 33 through the matching circuit 48. As the result, the shield case 33 works as the antenna.

Therefore, if such matching circuit 48 is configured by the inductive reactance elements L3 or the capacitive reactance element C2, which are connected in parallel across two transmission lines 48 and 50 electrically connecting a balanced side of the balun 38 to the telescopic antenna 28 and the helical antenna 29, to inhibit grounding, as shown in FIGS. 19A and 19B, the matching circuit 48 can be put across the balun 38 and the telescopic antenna 28 and the helical antenna 29 without any problem.

(2) First Embodiment

Figure 20:
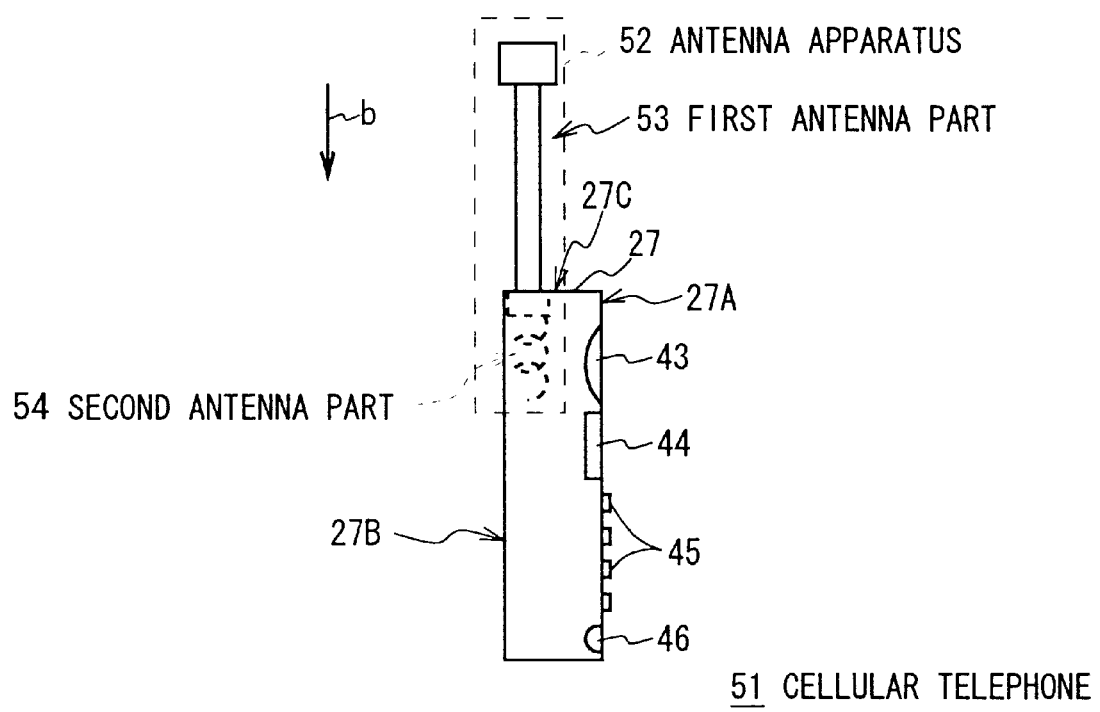
FIG. 20 is the outlined line drawing of a side view showing a first embodiment of the configuration of the cellular telephone according to the present invention.

In FIG. 20, in which a same numeral is assigned to a part corresponding to the identical part of the FIG. 16, reference numeral 51 denotes the cellular telephone according to the first embodiment as a whole and configured by installing the antenna apparatus 52 in the housing case 27 made of the nonconductive material such as a synthetic resin.

The antenna apparatus 52 has the first antenna part 53, which is installed retractably and pullably along with the retracting direction and the reversal pulling direction shown by an arrow b almost parallel to the length direction (hereafter, housing length direction) of the housing case 27 in the back face 27B of the top end 27C of the housing case 27, and a fixed type second antenna part 54, which is located around the top end 27C of the inside of the housing case.

Figure 21A:
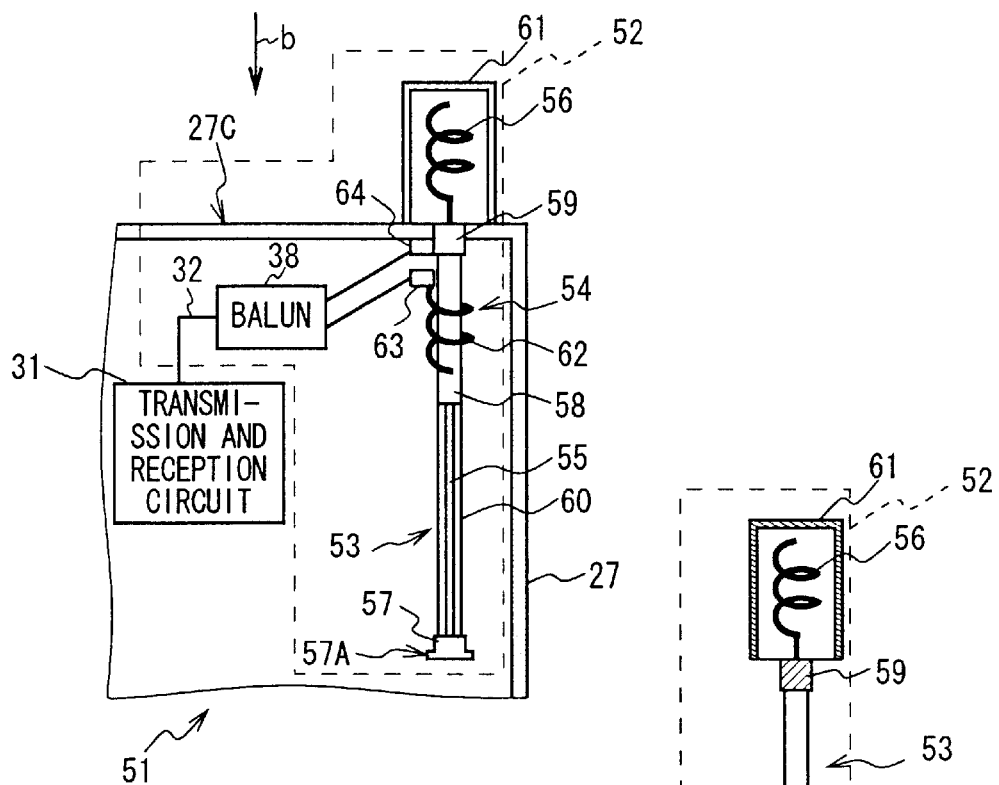
FIGS. 21A and 21B are the block diagrams showing the internal configuration of the cellular telephone according to the first embodiment.
Figure 21B:
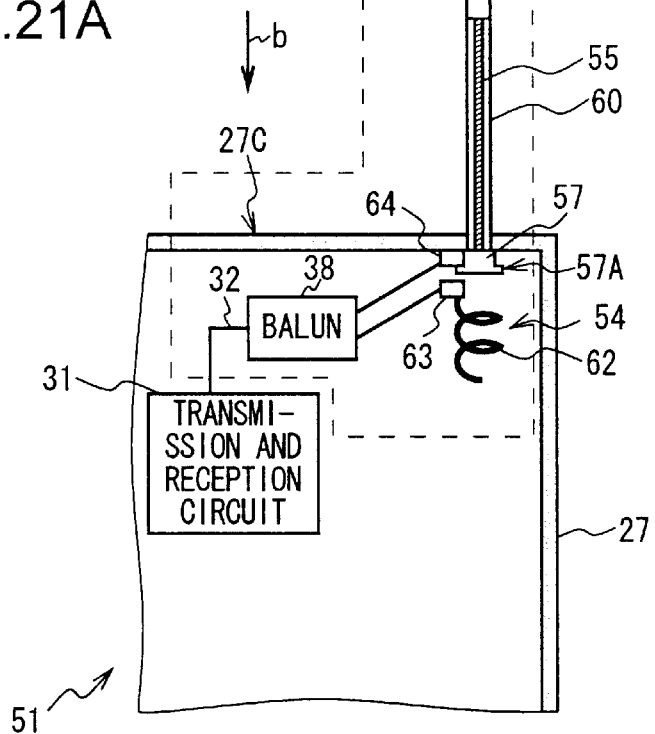

Here, FIGS. 21A and 21B are those showing the internal configuration of the cellular telephone 51, excepting a matching circuit and the shield case. In the first antenna part 53, a telescopic antenna 55 made from a conductive, rod-like line member and the first helical antenna 56 made by winding the conductive line member helically are installed.

The telescopic antenna 55 is prepared by making the length direction (hereafter, telescopic length direction) of the telescopic antenna 55 almost parallel to the housing length direction, and the bottom end thereof is electrically and mechanically connected to the first feeding member 57 made of the conductive material and having a projected part 57A, and the top end thereof is mechanically connected to the connecting part 58 made of the nonconductive material.

And, in the first helical antenna 56, the central axis of the helix of the first helical antenna 56 is almost corresponded to the elongated line of the telescopic length direction, the bottom end thereof is electrically and mechanically connected to the second feeding member 59 made of the conductive material, and the second feeding member 59 is mechanically connected to the connecting part 58.

According to this, the first helical antenna 56 and the telescopic antenna 55 are serially and mechanically installed with the connecting part 58 along with the housing length direction and separated electrically.

And, the telescopic antenna 55 is covered by an antenna cover 60 for the telescopic antenna and the first helical antenna 56 is retracted in the first helical antenna cover 61 formed in a cap-shape to prevent to touch directly with the human body.

In the second antenna part 54, the second helical antenna 62, which is formed by winding the conductive line material helically, is installed and the top end of the second helical antenna 62 is electrically and mechanically connected to the third feeding member 63 made of the conductive material.

And, in the second antenna part 54, the central axis (hereafter, second central axis) of the helix of the second helical antenna 62 is arranged by corresponding almost to the elongated line of the first central axis.

According to this, in the antenna apparatus 52, at the time of retracting and pulling of the first antenna part 53, the first antenna part 53 is pushed and pulled to pass through the second antenna part 54 along with the second central axis and thus, the space for locating the first antenna part 53 and the second antenna part 54 is made very small and upsizing of the housing case 27 is adapted to be able to prevent.

On the other hand, inside the housing case 27, a circuit substrate (not illustrated,) on which various circuit elements such as the transmission and reception circuit 31 and a balun 38 are implemented, and the shield case covering the circuit substrate are installed, and inside the top end 27C of the housing case 27, an antenna feeding terminal 64 made of the conductive material is installed.

Here, the transmission and reception circuit 31 is electrically connected to a terminal of a unbalanced side of the balun 38 through, for example, a hot side of (not illustrated) the unbalanced transmission line 32 comprising a microstrip line formed on the circuit substrate, and the terminal of a balanced side of the balun 38 is electrically connected to a third antenna feeding terminal 63 and the antenna feeding terminal 64.

And, the antenna apparatus 52 is adapted to make electric connection between the antenna feeding terminal 64 and the first helical antenna 56 or the telescopic antenna 55 at the time of retracting and pulling the first antenna part 53.

Practically in the antenna apparatus 52, at the time of retracting the first antenna part 53, by pushing the first helical antenna cover 61 to the retracting direction, the telescopic antenna 55 and the connecting part 58 are sequentially pushed inside the housing case 27 along with the second central axis to pass through the second helical antenna 62.

And, the antenna apparatus 52, when the first helical antenna cover 61 is contacted to the top end 27C of the housing case 27 as described above, the telescopic antenna 55 and the connecting part 58 are retracted into the inside of the housing case 27 to house and the second feeding member 59 is electrically connected to the antenna feeding terminal 64.

For reference, the connecting part 58 of the first antenna part 53 is located inside the second helical antenna 62, and therefore, length and thickness are selected to prevent capacitive coupling among the telescopic antenna 55, the first helical antenna 56, and the second helical antenna 62, each other.

Besides, the telescopic antenna 55 is located to keep a certain distance from the shield case to prevent capacitive coupling with the shield case and also the second helical antenna 62 is located to keep a certain distance to prevent capacitive coupling with the shield case.

And, in the antenna apparatus 52, in this situation, when a high frequency signal is sent from the transmission and reception circuit 31 to the balun 38 through the hot side of the unbalanced transmission line 32, the balun 38 sends the high frequency signal to the first helical antenna 56 through the antenna feeding terminal 64 and moves a phase of the high frequency signal about 180° in the frequency band in service for the first helical antenna 56, and sends the high frequency signal yielded, of which phase has been moved, to the second helical antenna 62 through the third feeding member 63.

According to this, in the antenna apparatus 52, a voltage mode occurs similar to that of FIGS. 4A and 4B of the first and second helical antennae 56 and 62, and the first and second helical antennae 56 and 62 work as an approximately balanced type antenna.

Here, in addition to this, in the antenna apparatus 52, flow of the leaked current from the second helical antenna 62 to the grounded side of the unbalanced transmission line 32 by the balanced-unbalanced converter action of the balun 38.

According to this, in the antenna apparatus 52, it is prevented the leaked current flows from the grounded side of the unbalanced transmission line 32 to the shield case to work the shield case as the antenna. Thus, the shield case can function only as an original electric shield plate and a ground.

Therefore, in the antenna apparatus 52, because the shield case is not worked as the antenna, when the user holds the shield case 27 by user's hand and the user moves the housing case 27 close to the user's head, deterioration of performances of the antenna of the cellular telephone 51 around the human body can be greatly decreased and thus, suppress the electric power, i. e., SAR, absorbed by the human body.

On the contrary, in the antenna apparatus 52, in pulling out the first antenna part 53, in the situation in which the telescopic antenna 55 and the connecting part 58 have been retracted inside the housing case 27, when the first helical antenna cover 61 is pinched to pull to the pulling direction, the telescopic antenna 55 can be pulled out from the top end 27C of the housing case 27 to the outside.

And, in the antenna apparatus 52, as described above, when the telescopic antenna 55 is fully pulled out from the top end 27C of the housing case 27, the projected part 57A of the first feeding member 57 is contacted to the antenna feeding terminal 64, and thus, the first feeding member 57 is electrically connected to the antenna feeding terminal 64.

For reference, here, the first feeding member 57 electrically connects the antenna feeding terminal 64 to the telescopic antenna 55 and contributes as a stopper to prevent to pull out the first antenna part 53 toward the outside of the housing case 27.

And, in the antenna apparatus 52, in this situation, when the high frequency signal is sent from the transmission and reception circuit 31 to the balun 38 through the hot side of the unbalanced transmission line 32, the balun 38 sends the high frequency signal, as it is, the telescopic antenna 55 through the antenna feeding terminal 64 and moves the phase of the high frequency signal about 180° in the frequency band in service for the telescopic antenna 55, and sends the high frequency signal yielded, of which phase has been moved, to the second helical antenna 62 through the third antenna feeding member 63.

According to this, in the antenna apparatus 52, a voltage mode occurs similarly to that of FIGS. 4A and 4B of the telescopic antenna 55 and the second helical antenna 62, and the telescopic antenna 55 and second helical antenna 62 work as the approximately balanced type antenna.

Here, in addition to this, in the antenna apparatus 52, flow of the leaked current from the second helical antenna 62 to the grounded side of the unbalanced transmission line 32 by the balanced-unbalanced converter action of the balun 38.

According to this, in the antenna apparatus 52, it is prevented the leaked current flows from the grounded side of the unbalanced transmission line 32 to the shield case to work the shield case as the antenna. Thus, the shield case can function only as an original electric shield plate and a ground.

Therefore, in the antenna apparatus 52, because the shield case is not worked as the antenna as described above, when the user holds the shield case 27 by user's hand and the user moves the housing case 27 close to the user's head, deterioration of performances of the antenna of the cellular telephone 51 around the human body can be greatly decreased and thus, suppress the electric power, i. e., SAR, absorbed by the human body.

As described above, in the cellular telephone 51, at the time of pulling the first antenna part 53, the transmission signal composed of the high frequency signal is sent from the transmission and reception circuit 31 to the telescopic antenna 55 and the second helical antenna 62 by using the telescopic antenna 55, which is pulled out from the housing case 27 to the outside, and the second helical antenna 62 inside the housing case 27 sequentially through the unbalanced transmission line 32 and the balun 38, the transmission signal is sent to the base station through the telescopic antenna 55 and the second helical antenna 62, and a received signal composed of the high frequency signal, which is sent from the base station and received by the telescopic antenna 55 and the second helical antenna 62, is sent to the transmission and reception circuit 31 sequentially through the balun 38 and the unbalanced transmission line 32.

In the cellular telephone 51, in pushing the first antenna part 53, the telescopic antenna 55 is pushed inside the housing case 27 to prevent loss of portability thereof and, here, by using the first and the second helical antennae 56 and 62, the transmission signal is sent from the transmission and reception circuit 31 to the first and the second helical antennae 56 and 62 sequentially through the unbalanced transmission line 32 and the balun 38, and the transmission signal is sent to the base station through the first and the second helical antennae 56 and 62, and the received signal, which is sent from the base station and received by the first and the second helical antennae 56 and 62, is sent to the transmission and reception circuit 31 sequentially through the balun 38 and the unbalanced transmission line 32.

Fort reference, here in the cellular telephone 51, by arranging the first and the second antenna parts 53 and 54 in the back face 27B side of the housing case 27, when the user moves the housing case 27 close to the user's head, the first and the second antenna parts 53 and 54 can keep a distance from the user's head. and thus, deterioration of performances of the antenna of the cellular telephone 51 around the human body can be greatly decreased.

(3) Second Embodiment

Figure 22A:
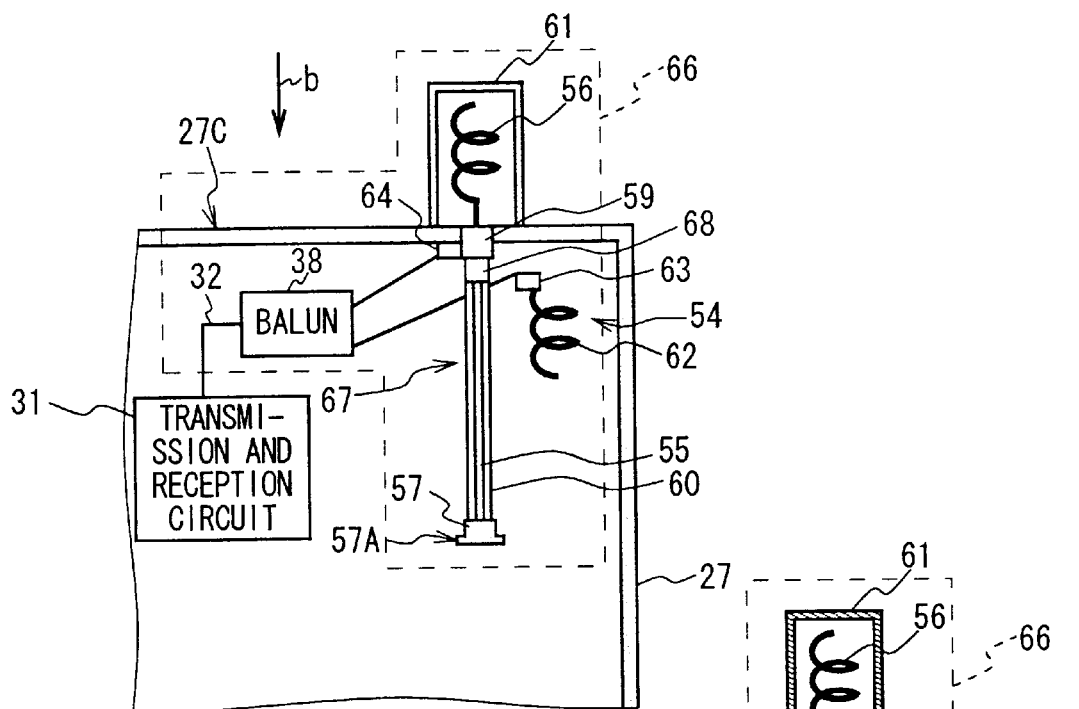
FIGS. 22A and 22B are the block diagrams showing the internal configuration of the cellular telephone according to the second embodiment.
Figure 22B:
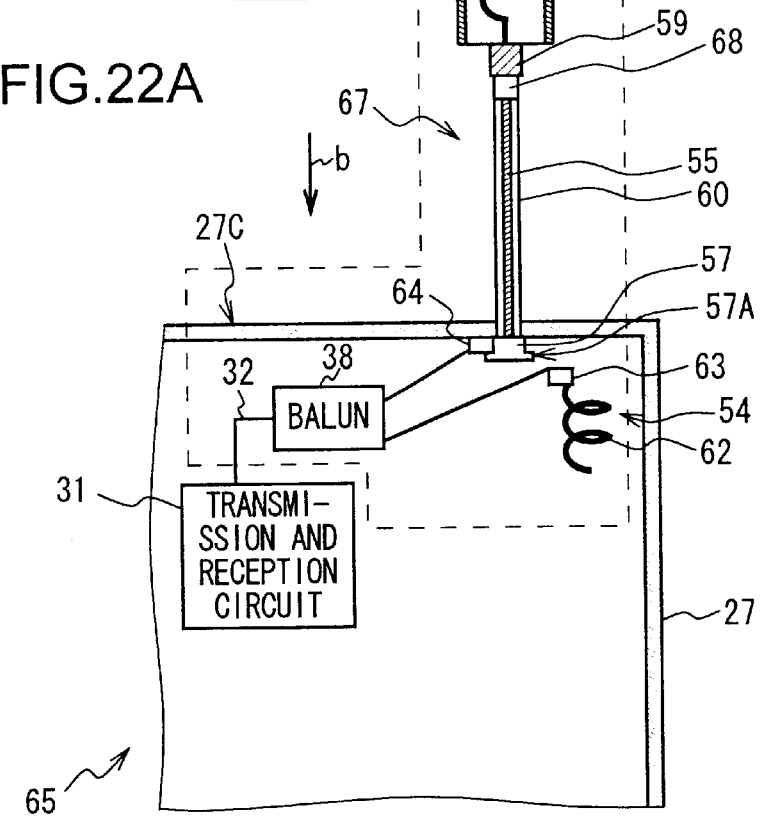

FIGS. 22A and 22B, in which the same numeral is assigned to a part corresponding to the identical part of the FIGS. 21A and 21B, show the cellular telephone 65 according to the second embodiment, and configuration thereof is same as that of the cellular telephone 51 (FIGS. 21A and 21B) according to the first embodiment as described above excluding the configuration of the first antenna part 67 of the antenna apparatus 66 and the position in which the second antenna part 54 is arranged.

In the second antenna part 54, the second central axis of the second helical antenna is made almost parallel to the first central axis of the first helical antenna 56, and in retracting the first antenna part 67, the second helical antenna 62 is located in a predetermined position in a distance from the telescopic antenna 55 to inhibit capacitive coupling inside the housing case 27.

Consequently, in the antenna apparatus 66, in retracting the first antenna part 67, it is pushed in to prevent that the telescopic antenna 55 is not passed through the second helical antenna 62, the length of the connecting part 68 mechanically connecting the telescopic antenna 55 to the first helical antennae 56 can be shorten than the connecting part 58 (FIGS. 21A and 21B) of the cellular telephone 51 according to the first embodiment as described above in order to prevent only the capacitive coupling of the telescopic antenna 55 to the first helical antennae 56.

According to this, in the cellular telephone 65, because the first antenna part 67 is shortened, the part, in which the first antenna part 67 is pushed inside the housing case 27, can be shortened to miniaturize the housing case 27 along the housing length direction, and also in pulling the first antenna part 67, the whole of the cellular telephone 65 can be miniaturized along the housing length direction.

(4) Third Embodiment

Figures 23A, 23B:
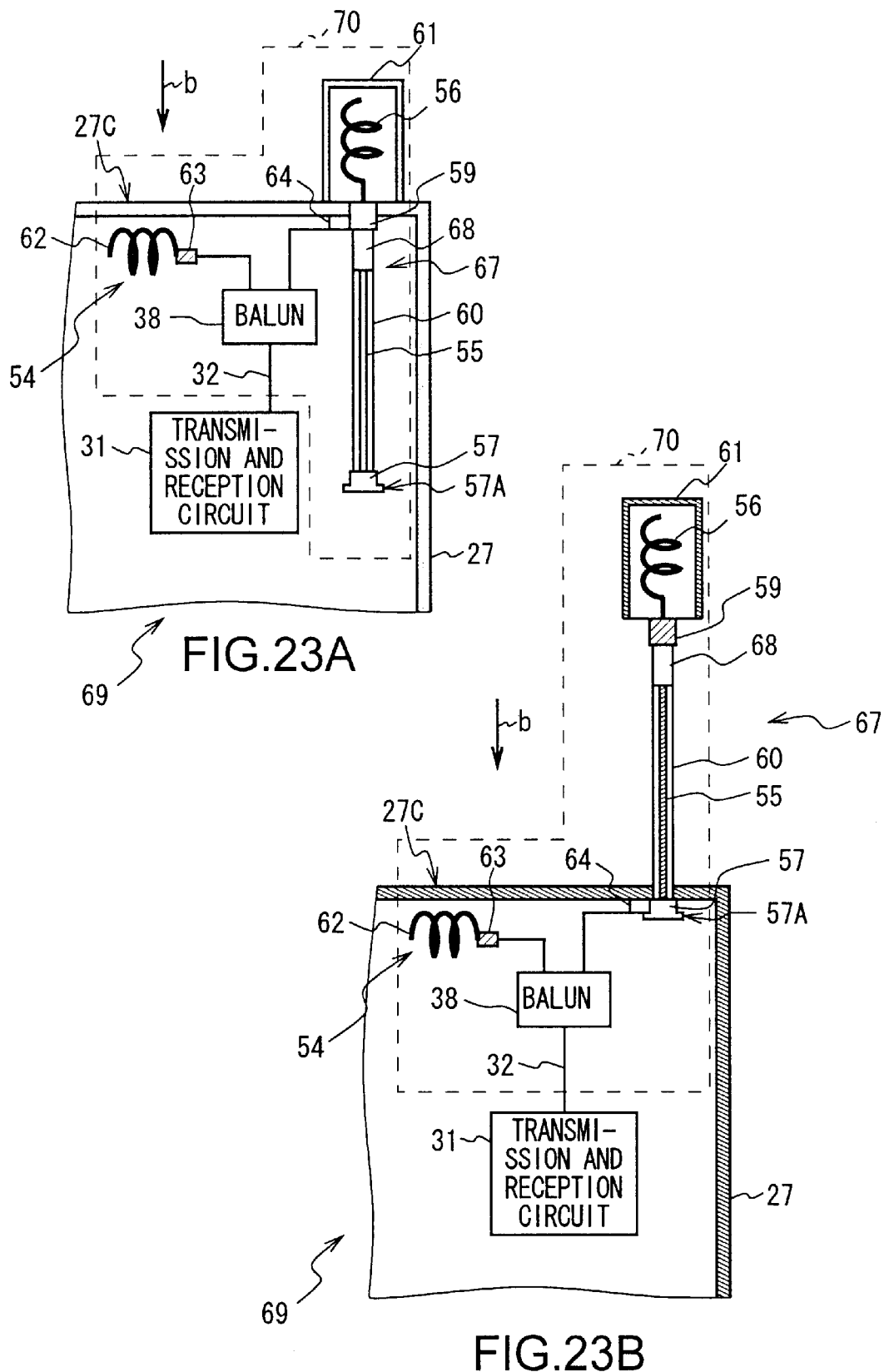
FIGS. 23A and 23B are the block diagrams showing the internal configuration of the cellular telephone according to the third embodiment.

FIGS. 23A and 23B, in which a same numeral is assigned to the part corresponding to the identical part of the FIGS. 22A and 22B, show the cellular telephone 69 according to the third embodiment, and is configured similar to the cellular telephone 65 (FIGS. 23A and 23B) according to the second embodiment as described above excluding the arranging attitude of the second antenna part 54 of the antenna apparatus 70.

Here, for example, in the antenna apparatus 52 (FIGS. 21A and 21B) and 66 (FIGS. 22A and 22B) according to the first and the second embodiments as described above, the telescopic antenna 55 is located making the telescopic length direction almost parallel to the housing length direction, and the first and second helical antennae 56 and 62 are located making the first and the second central axes almost parallel to the housing length direction. Therefore, when the telescopic antenna 55 and the second helical antenna 56 and the first and second helical antennae 56 and 62 work as the approximately balanced type antenna, respectively, those have the antenna performances in which a level of a polarized wave in a plane almost parallel to the housing length direction is relatively high.

In contrast, in the antenna apparatus 70 according to the third embodiment, the second helical antenna 62 is located inside the housing case 27 making the second central axes almost parallel to the housing orthogonal direction.

Therefore, in the antenna apparatus 70, in comparison with antenna properties of the antenna apparatus 52 and 66 of the first and the second embodiments as described above, in the antenna properties when the telescopic antenna 55 and the second helical antennae 56 and the first and second helical antennae 56 and 62 work as the approximately balanced type antenna, respectively, the level of the polarized wave in a plane almost parallel to the housing orthogonal direction can be improved.

On the other hand, in the antenna apparatus 70, because the level of the polarized wave in a plane almost parallel to the housing orthogonal direction is improved in the antenna properties, according to this, the level of the polarized wave in a plane almost parallel to a predetermined direction across the housing orthogonal direction and the housing length direction can be also improved.

Consequently, in the cellular telephone 69, even if the attitude of the cellular telephone 69 is changed, transmission and reception can be carried out for the base station relatively stably.

(5) Fourth Embodiment

Figure 24:
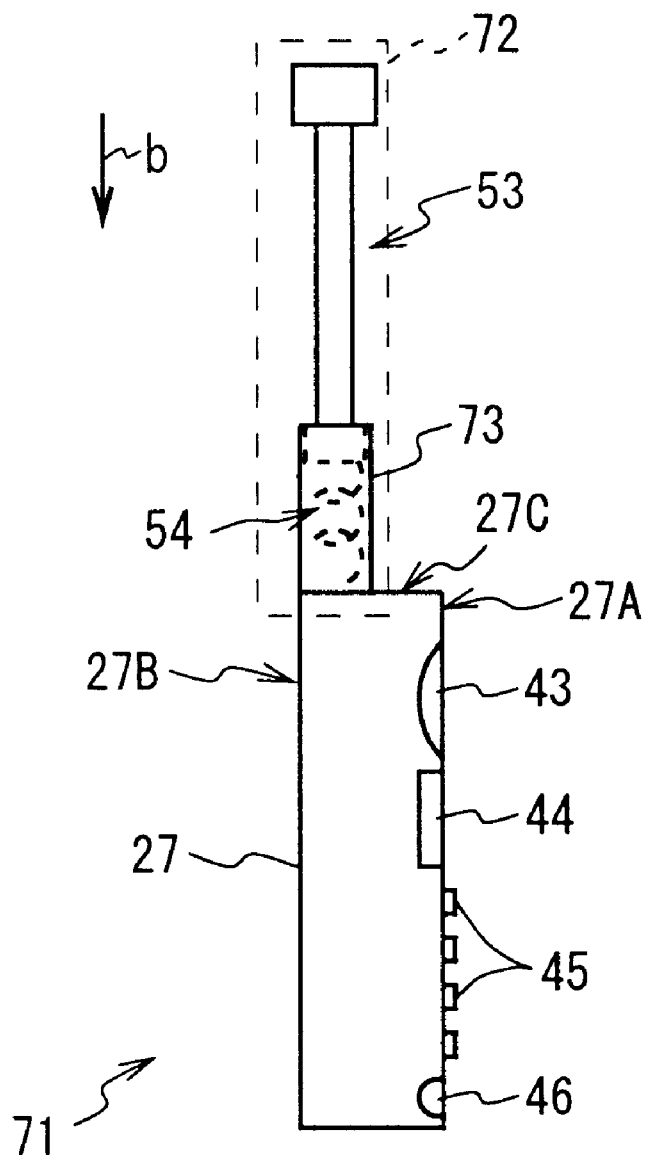
FIG. 24 is the outlined line drawing showing the configuration of the cellular telephone according to the fourth embodiment.

FIG. 24, in which the same numeral is assigned to the part corresponding to the identical part of the FIG. 20, shows the cellular telephone 71 according to the fourth embodiment, and is configured similar to the cellular telephone 51 (FIG. 20) according to the first embodiment as described above excluding the configuration of the antenna apparatus 72.

In this case, in the antenna apparatus 72, the cap-like second helical antenna cover 73 is installed in the back face side 27B of the top end 27C of the housing case 27 by projecting, the second antenna part 54 is located inside the second helical antenna cover 73.

On the other hand, in the top end 73A of the second helical antenna cover 73, the first antenna part 53 is installed retractably and pullably.

Therefore, in the cellular telephone 71, by that the second antenna part 54 is located outside the top end 27C of the housing case 27, the second antenna part 54 can be kept a distance from the user's hand holding the housing case 27 and the user's head and thus, in comparison with the cellular telephone 51 according to the first embodiment as described above, deterioration of performances of the antenna of the cellular telephone 71 around the human body can be greatly decreased.

Figures 25A, 25B:
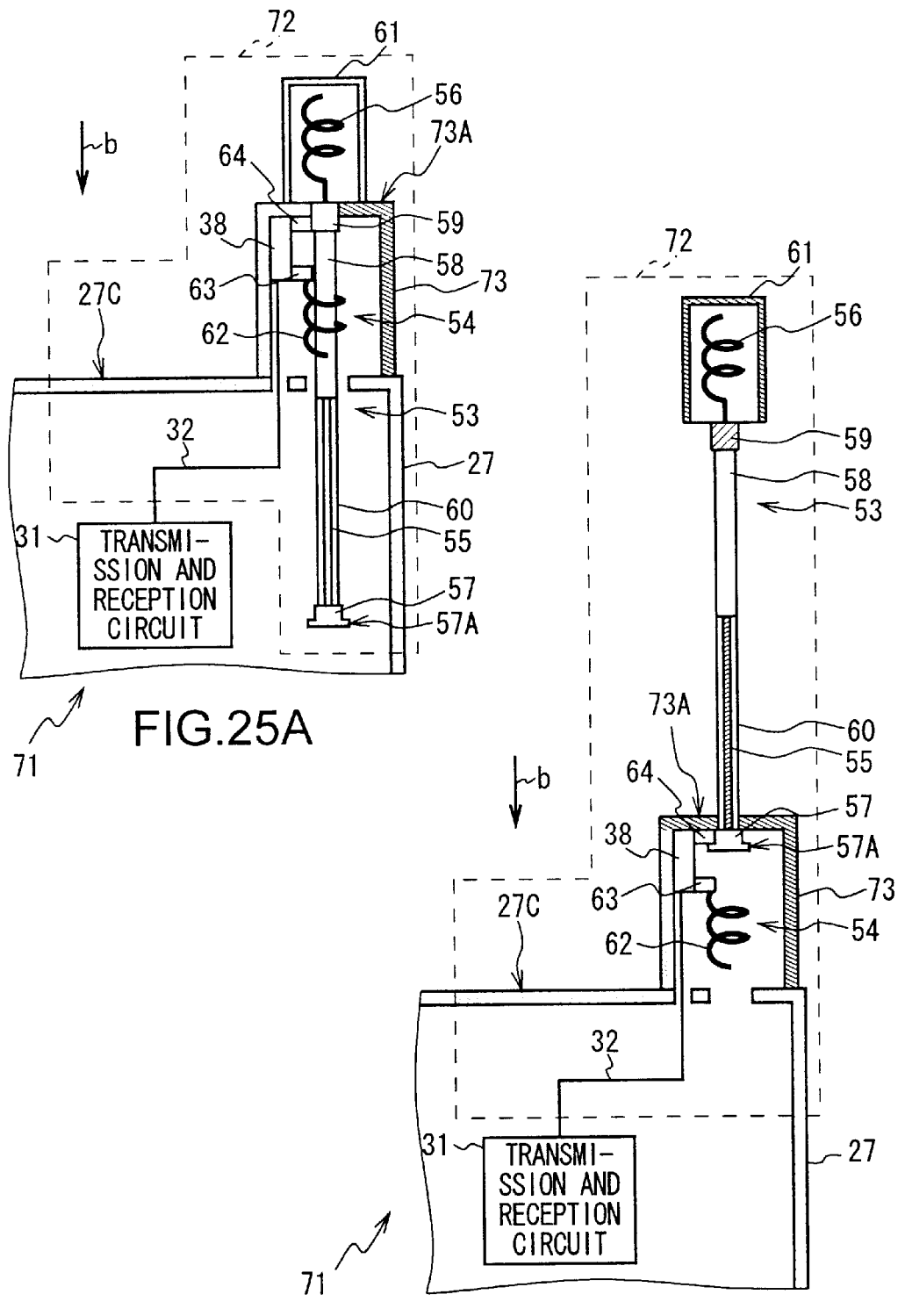
FIGS. 25A and 25B are the block diagrams showing the internal configuration of the cellular telephone according to the fourth embodiment.

In FIGS. 25A and 25B, in which the same numeral is assigned to the part corresponding to the identical part of the FIGS. 21A and 21B, inside the second helical antenna cover 73, the second antenna part 54 is located almost corresponding the second central axis of the second helical antenna 62 to the elongated line of the first central axis of the first helical antenna 56.

Also inside the second helical antenna cover 73, the balun 38 is installed, and in the top end 73A of the second helical antenna cover 73, the antenna feeding terminal 64 is located to keep a distance to prevent capacitive coupling with the third feeding member 63.

And, in the balun 38, the terminal of the balanced side is electrically connected to the antenna feeding terminal 64 and the third feeding member 63.

And, the antenna apparatus 72, at the time of retracting the first antenna part 53, by pushing the first helical antenna cover 61 to the retracting direction, the telescopic antenna 55 and the connecting part 58 are sequentially pushed inside the housing case 27, sequentially passing through the second helical antenna 62 inside the second helical antenna cover 73.

And, the antenna apparatus 72, when the first helical antenna cover 61 is contacted to the top end 73A of the second helical antenna cover 73, the connecting part 58 is located inside the helix of the second helical antenna 62 to house the telescopic antenna 55 in the inside of the housing case 27 to house and the second feeding member 59 is electrically connected to the antenna feeding terminal 64.

In the antenna apparatus 72, in this situation, the first and second helical antennae 56 and 62 are supplied the electric power from the transmission and reception circuit 31 sequentially through the unbalanced transmission line 32 and the balun 38 to work the first and second helical antennae 56 and 62 as the approximately balanced antenna.

In the antenna apparatus 72, here, flow of the leaked current from the second helical antenna 62 to the grounded side (not illustrated) of the unbalanced transmission line 32 is prevented by the balanced-unbalanced converter action of the balun 38 and thus, work of the shield case as the antenna is prevented.

In contrast to this, in pulling the first antenna part 53, in the situation in which the telescopic antenna 55 is retracted inside the housing case 27, by pinching to pull the first helical antenna cover 61 in the pulling direction, the telescopic antenna 55 can be pulled out from the top end 73A of the second helical antenna cover 73.

And, when the telescopic antenna 55 is fully pulled out from the top end 73A of the second helical antenna cover 73, the projected part 57A of the first feeding member 57 is contacted to the antenna feeding terminal 64, and thus, the first feeding member 57 is electrically connected to the antenna feeding terminal 64.

And, in the antenna apparatus 72, in this situation, the telescopic antenna 55 and the second helical antenna 62 are supplied the electric power from the transmission and reception circuit 31 sequentially through the unbalanced transmission line 32 and the balun 38 to work the telescopic antenna 55 and the second helical antenna 62 as the approximately balanced antenna.

In the antenna apparatus 72, also here, flow of the leaked current from the second helical antenna 62 to the grounded side of the unbalanced transmission line 32 is prevented by the balanced-unbalanced converter action of the balun 38 and thus, work of the shield case as the antenna is prevented.

In the cellular telephone 71, even if the housing case 27 is miniaturized according to recent miniaturization trend to become difficult for install the second antenna part 54 and the balun 38 inside the housing case 27, the second antenna part 54 and the balun 38 are installed inside the second helical antenna cover 73 of the top end 27C of the housing case 27 to prevent work of the shield case as the antenna. Thus, deterioration of performances of the antenna around the human body can be greatly decreased.

In the cellular telephone 71, almost whole of the first antenna part 53 is adapted to pull out from the top end 73A of the second helical antenna cover 73 and hence, in this situation, when it is moved to the user's head closely, the first antenna part 53 as well as the second antenna part 54 can be kept a certain distance from the head. Thus, in comparison with the cellular telephone 51 (FIGS. 21A and 21B) according to the first embodiment as described above, deterioration of performances of the antenna can be further decreased.

For reference, in the cellular telephone 71, the very small chip of 1 mm square as described above can be used for the inductive reactance element and the capacitive reactance element that compose the balun 38 and thus, the balun 38 itself can be formed in a very small shape as a whole. Therefore, the second helical antenna cover 73 can be formed in almost same size as the size of the second helical antenna 62 and hence, larger upsizing of the cellular telephone 71 along with the housing length direction can be prevented.

(6) Fifth Embodiment

Figures 26A, 26B:
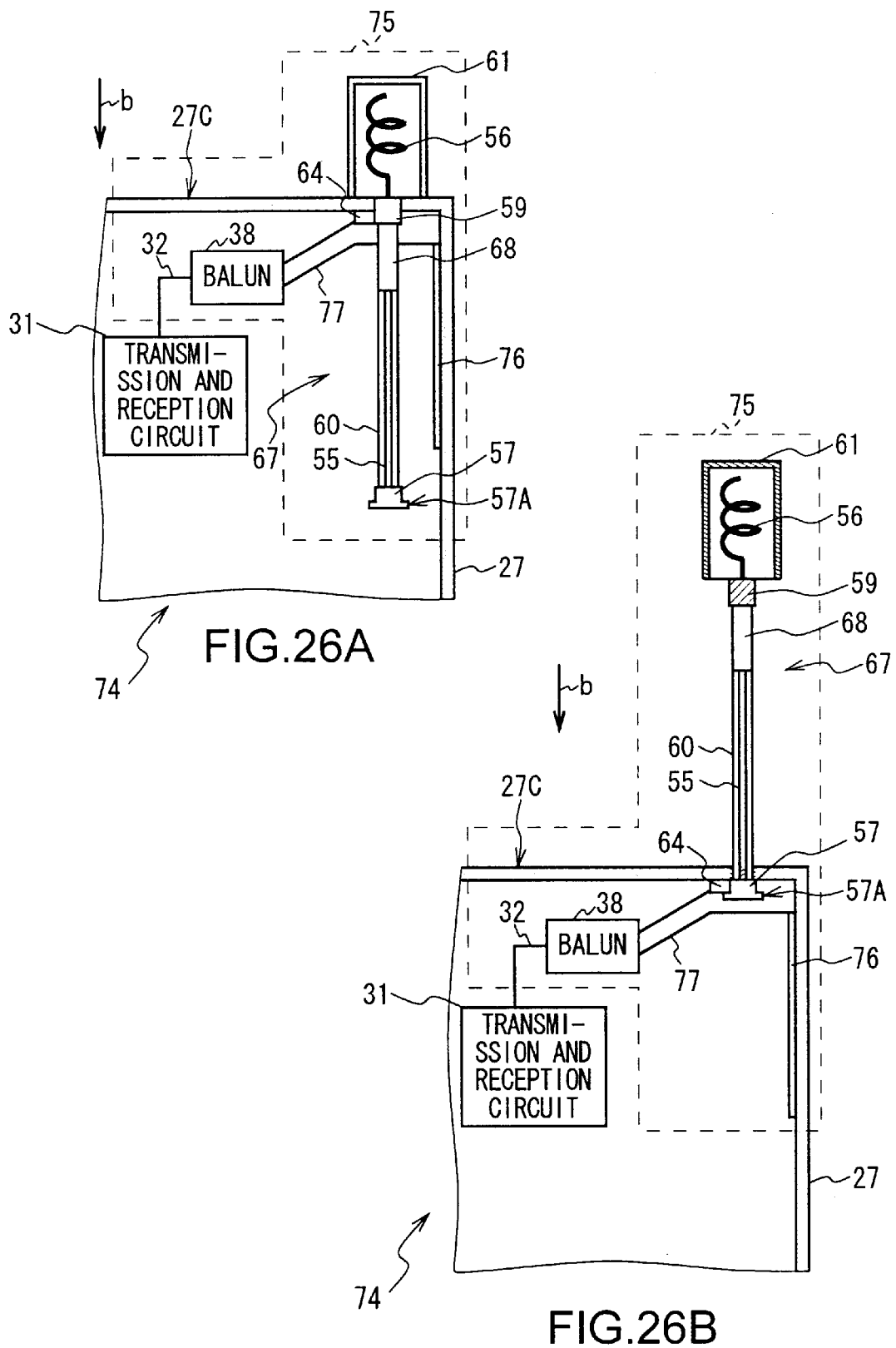
FIGS. 26A and 26B are the block diagrams showing the internal configuration of the cellular telephone according to the fifth embodiment.

FIGS. 26A and 26B, in which a same numeral is assigned to a part corresponding to the identical part of the FIGS. 22A and 22B, show the cellular telephone 74 according to the fifth embodiment, and is configured similar to the cellular telephone 65 (FIGS. 22A and 22B) according to the second embodiment as described above excluding the configuration of the antenna apparatus 75.

Figure 27:
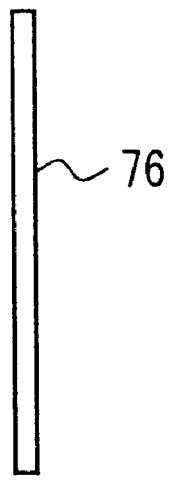
FIG. 27 is a top view showing the thin, linear antenna.

In the antenna apparatus 75, in replacement to the second helical antenna part 54 (FIGS. 22A and 22B) of the cellular telephone 65 according to the second embodiment as described above, the linearly formed antenna (hereafter, thin, linear antenna) 76 using the thin conductive plate shown in FIG. 27 is installed.

The thin, linear antenna 76 has almost equal electric length as that of the telescopic antenna 55 and the first helical antenna 56 and is adhered to an internal wall of the housing case 27 making the length direction of the thin, linear antenna 76 almost parallel to the housing length direction and keeping a certain distance from the shield case to prevent capacitive coupling. The top end of the thin, linear antenna 76 is electrically connected to the terminal of the balanced side of the balun 38.

For reference, the transmission line 77 electrically connecting the terminal of the balanced side of the balun 38 to the top end of the thin, linear antenna 76 is located around the connecting part 68 to prevent capacitive coupling of the telescopic antennae 55, the first helical antenna 56, and the thin, linear antenna 76 in retracting the first antenna part 67, and is located keeping a certain distance from the first feeding member 57 of the bottom terminal of the telescopic antenna 55 to prevent capacitive coupling therewith in pulling the first antenna part 67.

According to this, in the cellular telephone 74, even if the housing case 27 is miniaturized according to recent miniaturization trend to become difficult to install the second antenna part, having the second helical antenna, in the housing case 27, the thin, linear antenna 76 can be easily installed in the housing case 27 replacing to the second helical antenna.

In addition to that the thin, linear antenna 76 is distinctly thin, the very small chip of 1 mm square as described above can be used for the inductive reactance element and the capacitive reactance element that compose the balun 38 and thus, the balun 38 itself can be formed in a very small shape as a whole. Therefore, the thin, linear antenna 76 and the balun 38 can be installed inside thereof without almost any change of size of an existing housing case 27.

(7) Sixth Embodiment

Figures 28A, 28B:
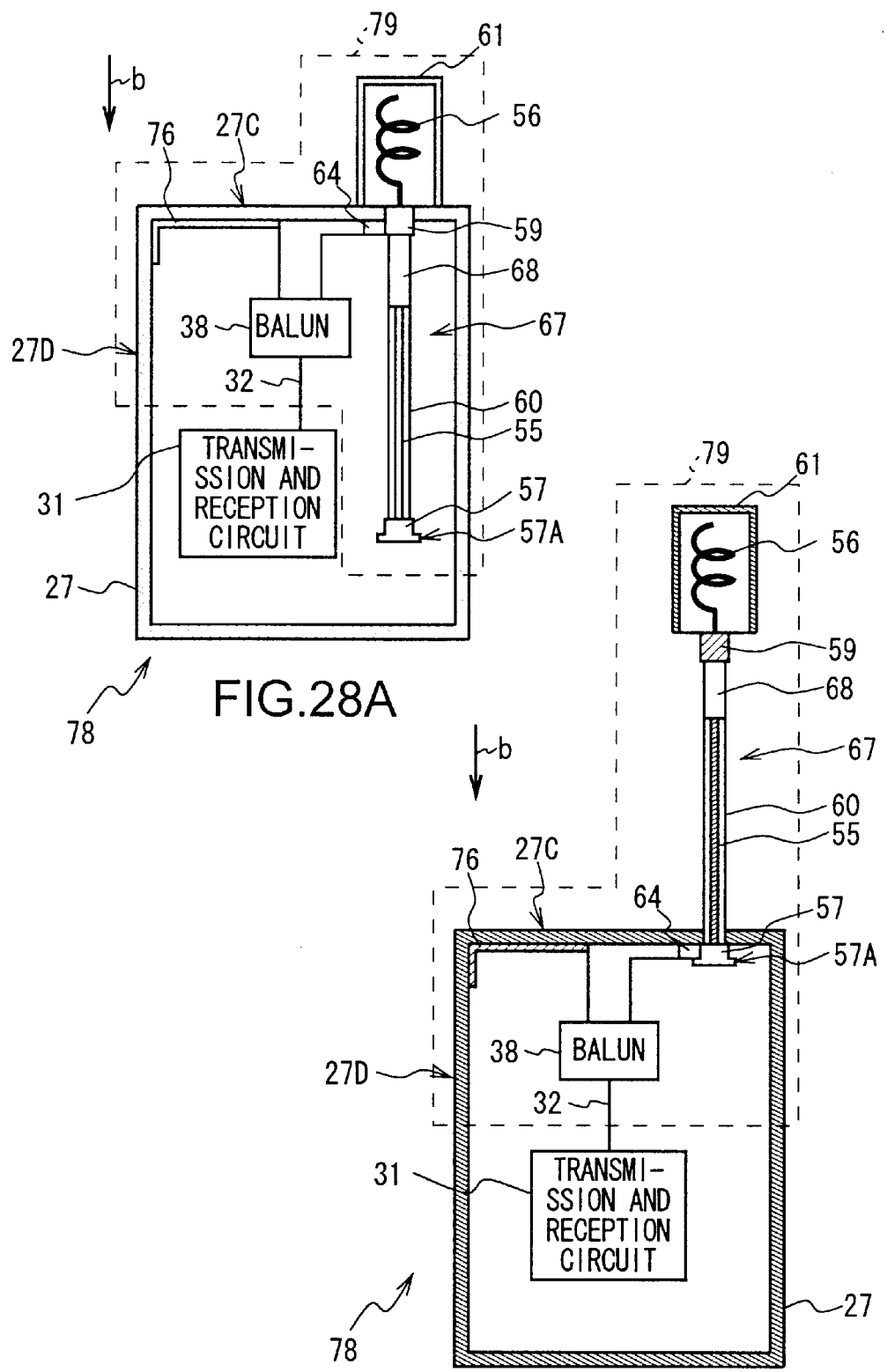
FIGS. 28A and 28B are the block diagrams showing the internal configuration of the cellular telephone according to the sixth embodiment.

FIGS. 28A and 28B, in which a same numeral is assigned to a part corresponding to the identical part of the FIGS. 26A and 26B, shows the cellular telephone 78 according to the sixth embodiment, and is configured similar to the cellular telephone 74 (FIGS. 26A and 26B) according to the fifth embodiment as described above excluding the position of arrangement of the thin, linear antenna 76 in the antenna apparatus 79.

In this case, in the thin, linear antenna 76, the one end thereof is adhered to the inner surface of the top end 27C of the housing case 27 making the length direction thereof almost parallel to the housing orthogonal direction and a small part of the other end thereof, which is insufficiently housed within the inner surface of the top end 27C, is bent to adhere to the inner surface of a side wall 27D of the housing case 27 connected to the inner surface of the top end 27C.

Consequently, in the cellular telephone 78, by adhering almost all parts of the one end of the thin, linear antenna 76 to the inner surface of the top end 27C of the housing case 27, the thin, linear antenna 76 can keep a distance from the user's hand holding the housing case 27. Therefore, when the thin, linear antenna 76 works as the antenna, deterioration of performances of the antenna of the cellular telephone 78 can be decreased.

For reference, in the cellular telephone 78, by making the length direction of the thin, linear antenna 76 almost parallel to the housing orthogonal direction, in performances of the antenna of the cellular telephone 78, as same as the cellular telephone 69 (FIGS. 23A and 23B) according to the third embodiment as described above, the level of the polarized wave in a plane almost parallel to the housing orthogonal direction can be improved and the level of the polarized wave in a plane almost parallel to a predetermined direction across the housing orthogonal direction and the housing length direction can be also improved.

(8) Seventh Embodiment

Figures 29A, 29B:
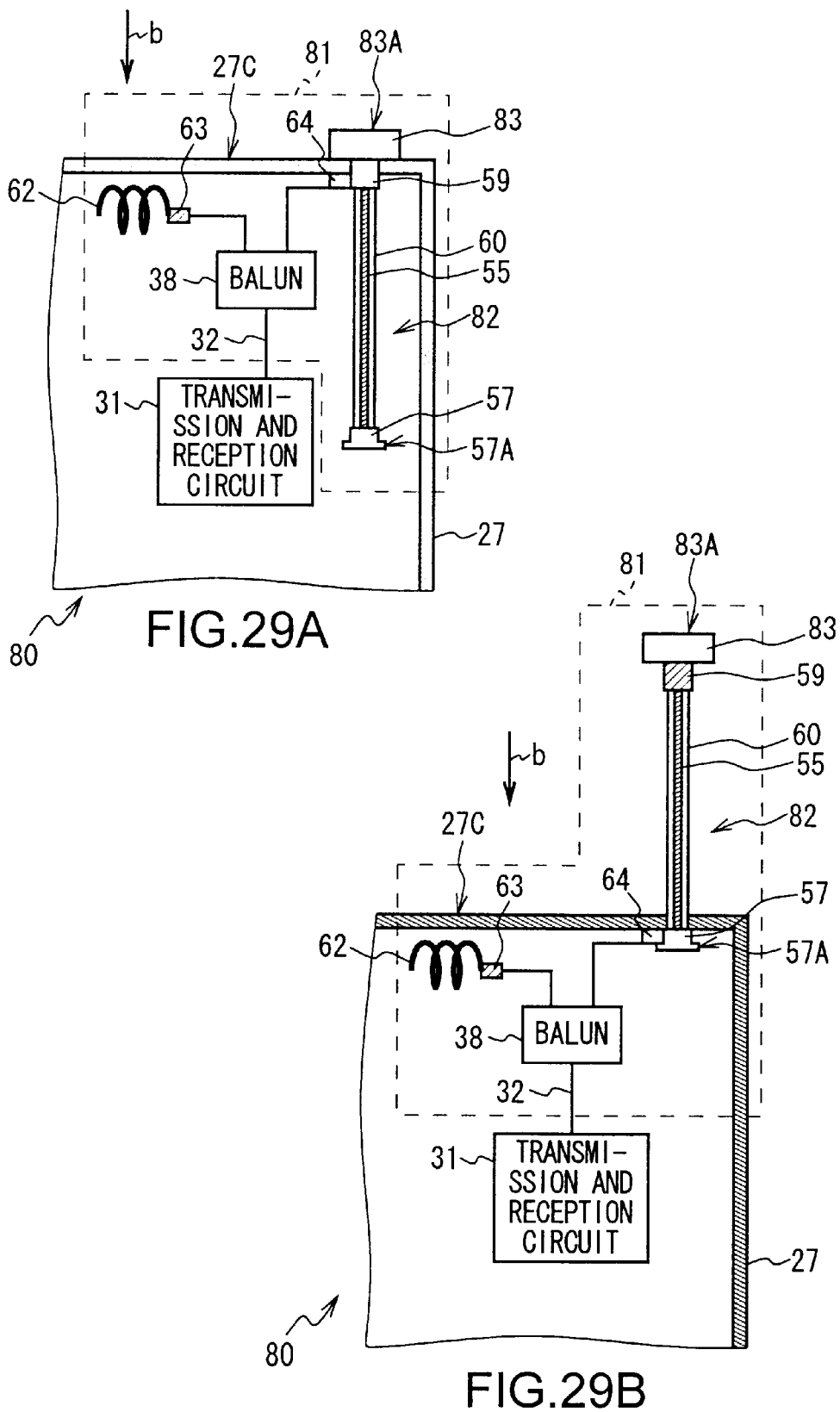
FIGS. 29A and 29B are the block diagrams showing the internal configuration of the cellular telephone according to the seventh embodiment.

FIGS. 29A and 29B, in which a same numeral is assigned to a part corresponding to the identical part of the FIGS. 23A and 23B, shows the cellular telephone 80 according to the seventh embodiment, and is configured similar to the cellular telephone 69 (FIGS. 23A and 23B) according to the third embodiment as described above excluding the configuration of the first antenna part 82 of the antenna apparatus 81.

The first antenna part 82 has the telescopic antenna 55 and is retractably and pullably installed in the top end 27C of the housing case 27 making the telescopic length direction almost parallel to the housing length direction.

And, the top end of the telescopic antenna 55 is electrically and mechanically connected to the second feeding member 59 and the second feeding member 59 is mechanically connected to the antenna pinching part 83 made of the nonconductive material such as a synthetic resin. The antenna pinching part 83 has a predetermined thickness of a degree allowing a touch of a user's finger and is formed thicker than the second feeding member 59.

Practically, in the antenna apparatus 81, in retracting the first antenna part 82, by pushing the one face 83A of the antenna pinching part 83 in the retracting direction, the telescopic antenna 55 can be pushed inside the housing case 27.

In the antenna apparatus 81, when the antenna pinching part 83 is contacted to the top end 27C of the housing case 27, the whole of the telescopic antenna 55 is pushed and retracted inside the housing case 27, and the second feeding member 59 is electrically connected to the antenna feeding terminal 64.

In the antenna apparatus 81, in this situation, the telescopic antenna 55 and the second helical antenna 62 are supplied with the electric power from the transmission and reception circuit 31 sequentially through the unbalanced transmission line 32 and the balun 38 to work the telescopic antenna 55 and the second helical antenna 62 as the approximately balanced antenna, and then, flow of the leaked current from the second helical antenna 62 to the grounded side (not illustrated) of the unbalanced transmission line 32 is prevented by the balanced-unbalanced converter action of the balun 38.

For reference, in the cellular telephone 80, in retracting the first antenna part 82, because the first helical antenna is not installed in the first antenna part 82 differing from the first to sixth embodiments as described above, any antenna element does not project from the top end 27C of the housing case 27, but only the antenna pinching part 83 projects, and thus, the cellular telephone 80 can be greatly miniaturized along with the housing length direction.

In addition to this, in the cellular telephone 80, in retracting the first antenna part 82, all antenna elements (i. e., the telescopic antenna 55 and the second helical antenna 62,) which are installed in the cellular telephone 80, are retracted inside the housing case 27 and thus, even if the cellular telephone 80 is carelessly dropped, break of the antenna elements can be prevented.

In contrast to this, in the antenna apparatus 81, in pulling the first antenna part 82, by that the antenna pinching part 83 is pinched to pull in the pulling direction, the telescopic antenna 55 can be pulled out from the top end 27C of the housing case 27 to outside.

In the antenna apparatus 81, when the telescopic antenna 55 is fully pulled out from the top end 27C of the housing case 27 as described above, the projected part 56A of the first feeding member 57 is contacted to the antenna feeding terminal 64, and thus, the first feeding member 57 is electrically connected to the antenna feeding terminal 64.

In the antenna apparatus 81, in this situation, the telescopic antenna 55 and the second helical antenna 62 are supplied with the electric power from the transmission and reception circuit 31 sequentially through the unbalanced transmission line 32 and the balun 38 to work the telescopic antenna 55 and the second helical antenna 62 as the approximately balanced antenna, and then, flow of the leaked current from the second helical antenna 62 to the grounded side of the unbalanced transmission line 32 is prevented by the balanced-unbalanced converter action of the balun 38.

And, also in pulling the first antenna part 82, because the first helical antenna is not installed in the first antenna part 82 and thus, the cellular telephone 80 can be greatly miniaturized along with the housing length direction.

(9) Eighth Embodiment

Figure 30A:
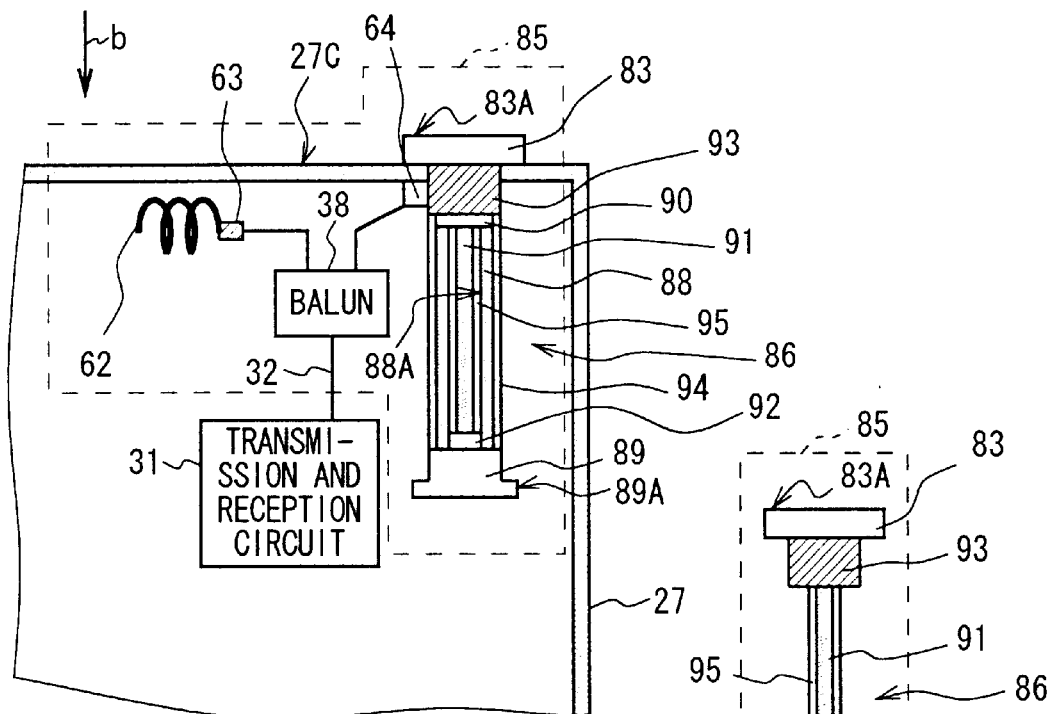
FIGS. 30A and 30B are the block diagrams showing the internal configuration of the cellular telephone according to the eighth embodiment.
Figure 30B:
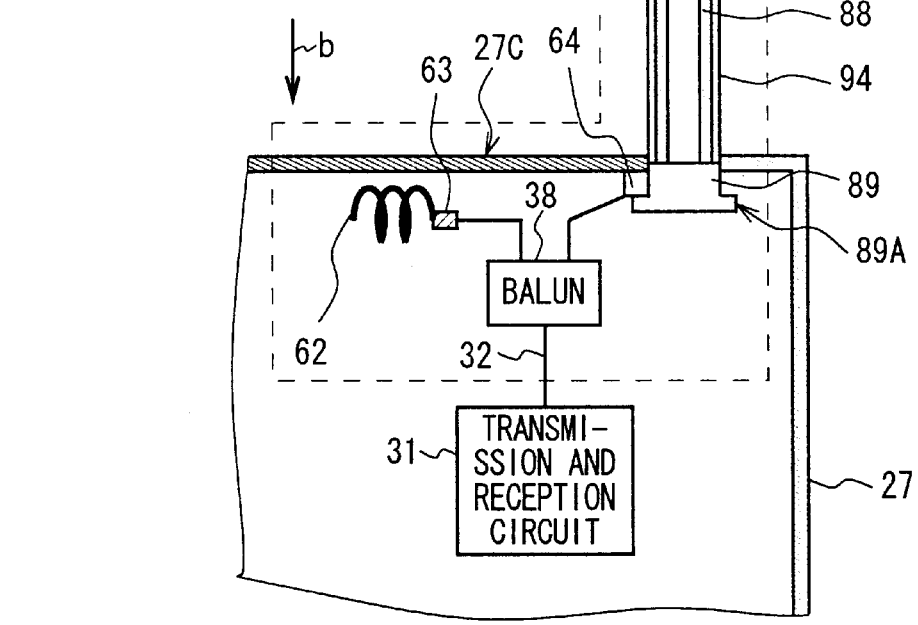

FIGS. 30A and 30B, in which a same numeral is assigned to a part corresponding to the identical part of the FIGS. 29A and 29B, shows the cellular telephone 84 according to the eighth embodiment, and is configured similarly to the cellular telephone 80 (FIGS. 29A and 29B) according to the seventh embodiment as described above excluding the configuration of the first antenna part 86 of the antenna apparatus 85.

The first antenna part 86, making the length direction thereof almost parallel to the housing orthogonal direction, is retractably and pullably installed in the top end 27C of the housing case 27.

In the first antenna part 86 having a first antenna half 88 made of a conductive, cylindrical member, as shown in FIGS. 31A and 31B, the bottom end of the first antenna half 88 is electrically and mechanically connected to the first feeding member 89 made of the conductive material and having a projected part 89A.

The top end of the first antenna half 88 has the stopping part 90 to prevent to pull out and the second antenna half 91 comprising a conductive rod-like member is retractably and pullably installed in a hole part 88A of the first antenna half 88.

A sliding spring 92 made of the conductive material is electrically and mechanically connected to the bottom end of the second antenna half 91 located in the hole part 88A of the first antenna half 88.

To the top end of a second antenna half 91, a second feeding member 93 made of the conductive material is electrically and mechanically connected and the second feeding member 93 has the antenna pinching part 83.

Further, the first and the second antenna halves 88 and 91 are covered with antenna covers 94 and 95, respectively.

And, in the first antenna part 86, when the second antenna half 91 is pushed into or pulled out from the first antenna half 88, the sliding spring 92 slides in the hole part 88A of the first antenna half 88 in the electrically connected condition and thus, the telescopic antenna can be formed to connect the first antenna half 88 electrically to the second antenna half 91 through the sliding spring 92.

Practically, in the antenna apparatus 85 (FIGS. 30A and 30B,) in retracting the first antenna part 86, by pushing the one face 83A of the antenna pinching part 83 in the retracting direction, the first antenna part 86 can be pushed inside the housing case 27 while retracting the second antenna half 91 in the hole part 88A of the second antenna half 88.

On the other hand, in the antenna apparatus 85, the antenna pinching part 83 is contacted to the top end 27C of the housing case 27 and then, the shortened telescopic antenna is formed by retracting almost whole of the second antenna half 91 in the hole part 88A of the first antenna half 88. In this situation, almost whole of the second antenna part 86 is pushed and retracted inside the housing case 27 and the second feeding member 93 is electrically connected to the antenna feeding terminal 64.

And, in the antenna apparatus 85, in this situation, the shortened telescopic antenna and the second helical antenna 62 are supplied with the electric power from the transmission and reception circuit 31 sequentially through the unbalanced transmission line 32 and the balun 38 to work the shortened telescopic antenna and the second helical antenna 62 as the approximately balanced antenna, and then, flow of the leaked current from the second helical antenna 62 to the grounded side of the unbalanced transmission line 32 is prevented by the balanced-unbalanced converter action of the balun 38.

Here in the cellular telephone 84, in retracting the first antenna part 86, the telescopic antenna shortened by the first antenna part 86 is formed and thus, in comparison with the seventh embodiment as described above, a length of the first antenna part 86 to be retracted inside the housing case 27 can be distinctly shortened and for the distance shortened, a part of the first antenna part 86, which is covered by the user's hand holding the housing case, can made small to allow reducing deterioration of antenna performances of the cellular telephone 84.

In the cellular telephone 84, the length of the first antenna part 86 to be retracted inside the housing case 27 can be distinctly shortened as described above and the housing case 27 can be greatly miniaturized along with the housing length direction.

In contrast to this, in the antenna apparatus 85, in pulling the first antenna part 86, by pinching the antenna pinching part 83 to pull in the pulling direction, the first antenna part 86 can be pulled out from the top end 27C of the housing case 27 while pulling out the second antenna half 91 from the hole part 88A of the second antenna half 88.

In the antenna apparatus 85, when the second antenna half 91 is fully pulled out from the top end 27C of the housing case 27 as described above, a elongated telescopic antenna is formed by pulling fully the first antenna half 88 from the hole part 88A of the first antenna half 88, and the projected part 89A of the first feeding member 89 is contacted to the antenna feeding terminal 64, and thus, the first feeding member 89 is electrically connected to the antenna feeding terminal 64.

In the antenna apparatus 85, in this situation, the elongated telescopic antenna and the second helical antenna 62 are supplied with the electric power from the transmission and reception circuit 31 sequentially through the unbalanced transmission line 32 and the balun 38 to work the elongated telescopic antenna and the second helical antenna 62 as the approximately balanced antenna, and then, flow of the leaked current from the second helical antenna 62 to the grounded side of the unbalanced transmission line 32 is prevented by the balanced-unbalanced converter action of the balun 38.

(10) Ninth Embodiment

Figure 32:
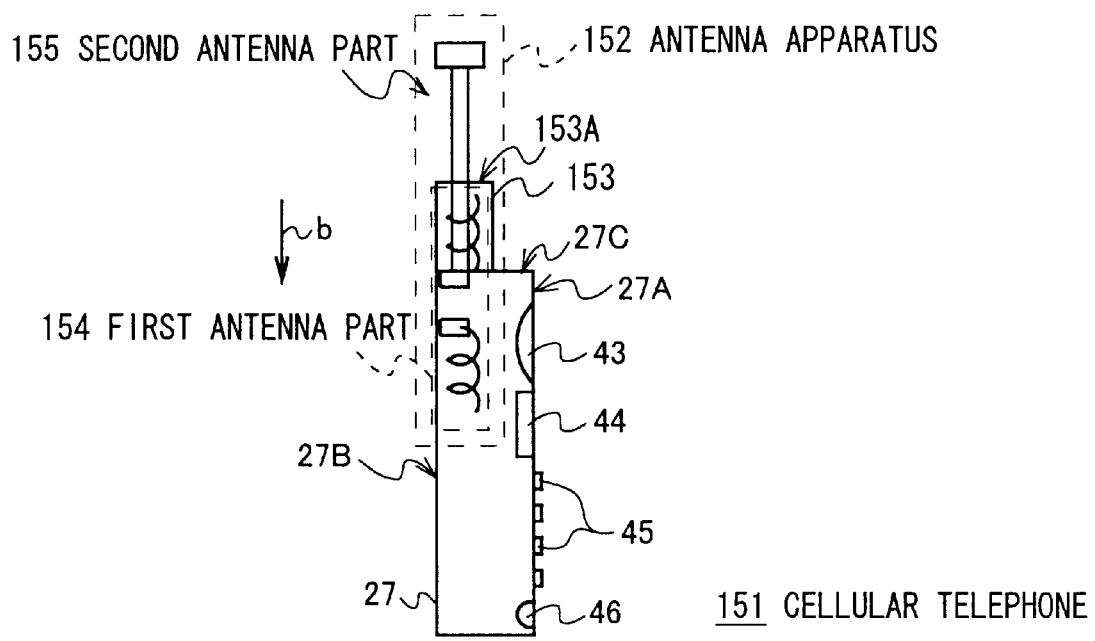
FIG. 32 is the outlined line drawing of a side view showing the ninth embodiment of the configuration of the cellular telephone according to the present invention.

In FIG. 32, in which a same numeral is assigned to a part corresponding to the identical part of the FIG. 16, reference numeral 151 denotes the cellular telephone according to the ninth embodiment as a whole and configured by installing the antenna apparatus 152 in the housing case 27 made of the nonconductive material such as a synthetic resin.

In the antenna apparatus 152, a first antenna cover 153 formed in the cap-shape using the nonconductive material is installed projecting in the back face side 27B of the top end 27C of the housing case 27, the first antenna part 154 of a fixed type is located across the inside of the first antenna cover 153 and the housing case 27, and a second antenna part 155 is retractably and pullably installed in the top end 153A of the first antenna cover 153 along with the retracting direction and on the contrary in a pulling direction shown by the arrow b almost parallel to the length direction (hereafter, housing length direction) of the housing case 27.

Figure 33:
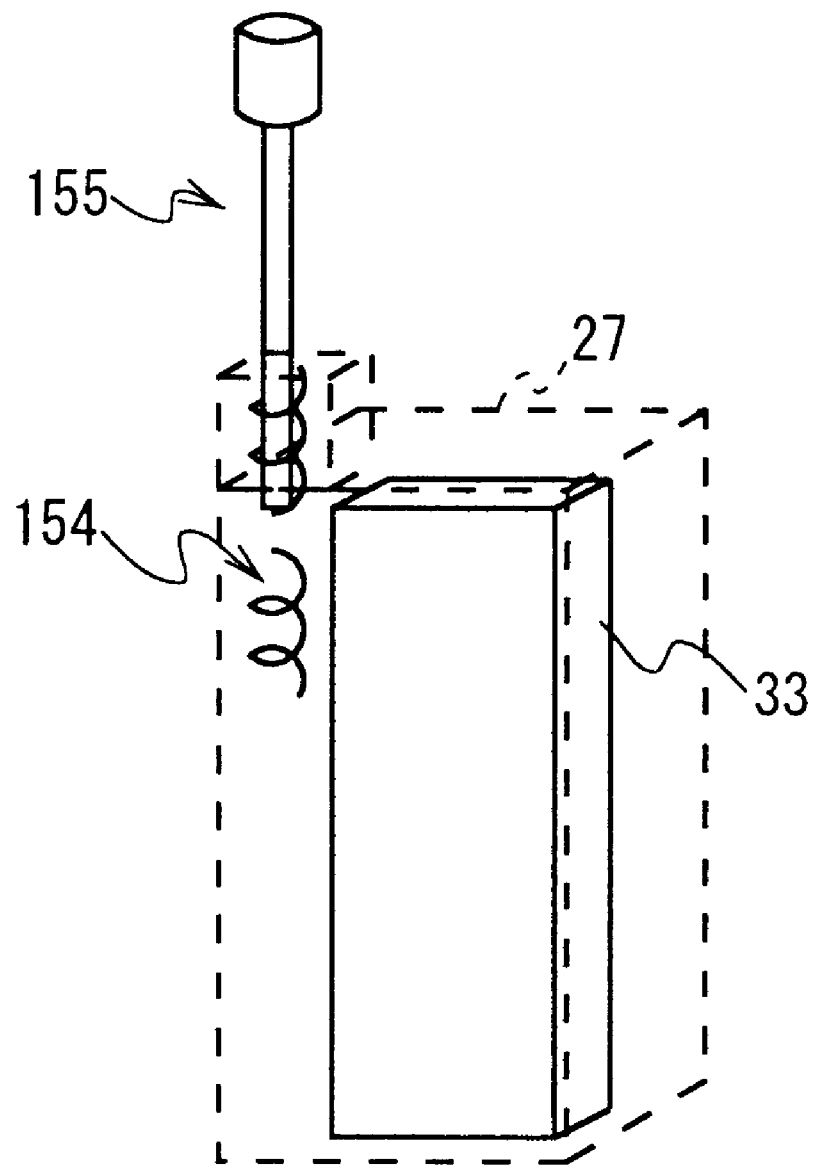
FIG. 33 is the outlined line drawing for explanation of arrangement of a first and second antenna parts of the cellular telephone according to the ninth embodiment, and of the shield case.

For reference, in the cellular telephone 151, as shown in FIG. 33, the first and the second antenna parts 154 and 155 respectively have antenna elements and are located in a distance from the shield case to prevent capacitive coupling.

Figure 34A:
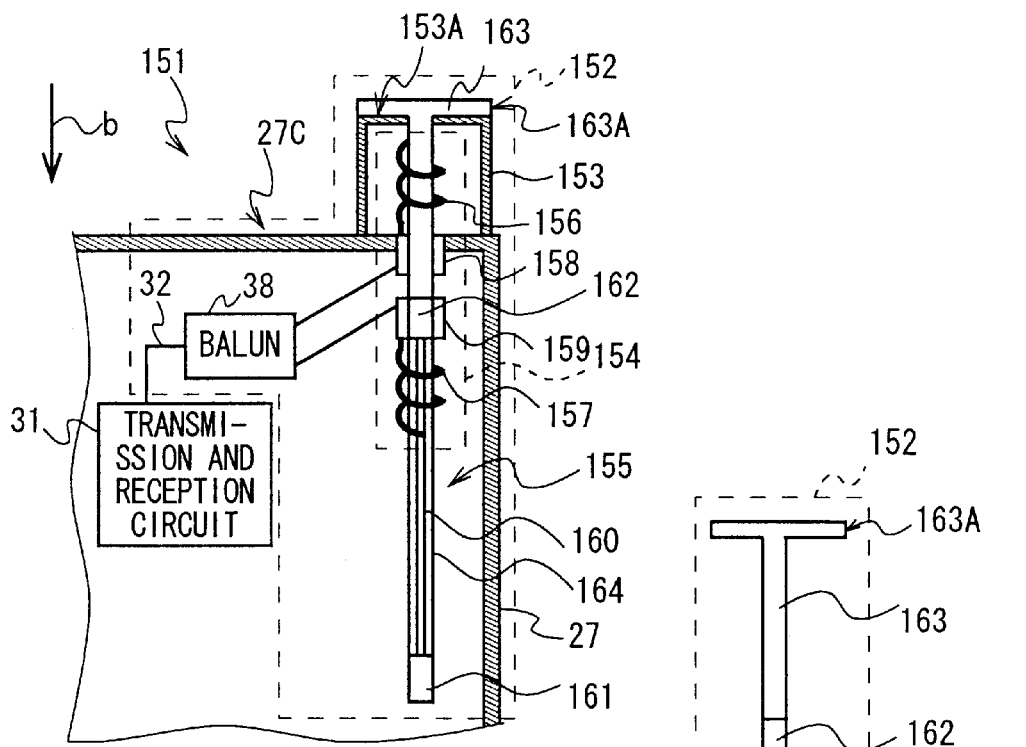
FIGS. 34A and 34B are the block diagrams showing the internal configuration of the cellular telephone according to the ninth embodiment.
Figure 34B:
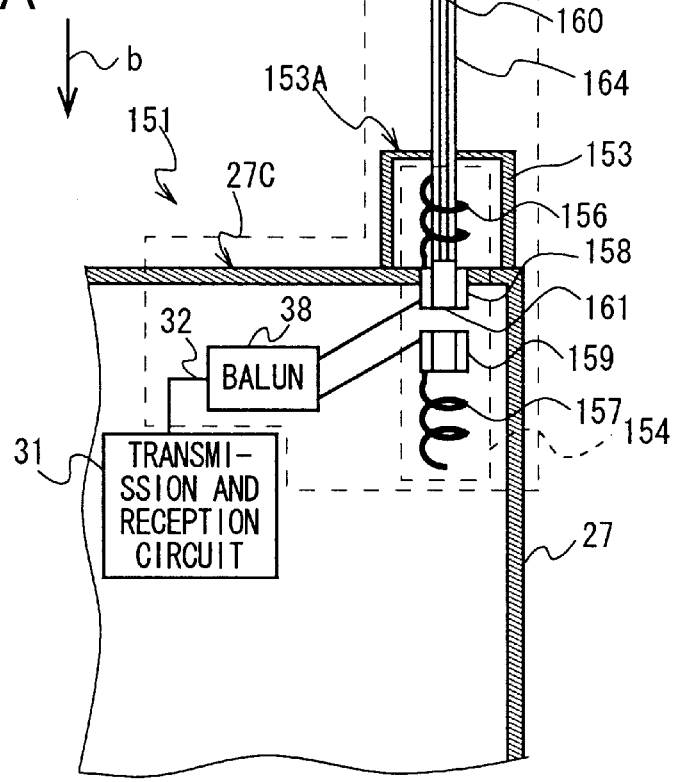

Practically, FIGS. 34A and 34B show the internal configuration of the cellular telephone 151 except the matching circuit and the shield case. The first and the second helical antennae 156 and 157, which is formed by winding helically the conductive wire material as the antenna element, are installed in the first antenna part 154.

In this case, the first helical antenna 156 is located inside the first antenna cover 153 by arranging the central axis (hereafter, the first central axis) of the helix of the first helical antenna 156 almost parallel to the housing length direction.

The second helical antenna 157 is located around the top end 27C inside the back face 27B of the housing case 27 by almost corresponding the central axis of the helix of the second helical antenna 157 (hereafter, the second central axis) to an elongated line of the first central axis.

And, the bottom end and the top end corresponding to the first and the second helical antennae 156 and 157 are electrically and mechanically connected to a first and a second feeding members 158 and 159 which are annularly formed using the conductive material.

On the other hand, the second antenna part 155 has the telescopic antenna 160 made of the conductive, rod-like wire material as the antenna element, a third feeding member 161 made of the conductive material is electrically and mechanically connected to the bottom end of the telescopic antenna 160, the top end of the telescopic antenna 160 is electrically and mechanically connected to a fourth feeding member 162 made of the conductive material, and an antenna pinching part 163, made of the nonconductive material, with a section of a T-shape is installed on the fourth feeding member 162.

The telescopic antenna 160 is covered with the antenna cover 164, made of the nonconductive material, for the telescopic antenna. And, the second antenna part 155 is adapted to retracting or pulling out along with the first and second central axes of the first and the second helical antennae 156 and 157 and here, connecting electrically any one of the third and fourth feeding members 161 and 162 to any one of the first and the second feeding members 158 and 159.

Inside the housing case 27, the circuit substrate (not illustrated,) on which the transmission and reception circuit 31 and various circuit elements such as the balun 38 are implemented, and the shield case made of conductive material and covering the circuit substrate are installed.

The transmission and reception circuit 31 is, for example, electrically connected to the unbalanced side of the balun 38 through the hot side of the unbalanced transmission line 32 made of the microstrip line formed on the circuit substrate, and the balanced side of the balun 38 is electrically connected to the first and the second feeding members 158 and 159.

Practically, in the antenna apparatus 152, when the head part 163A of the antenna pinching part 163 is pushed to the retracting direction, the second antenna part 155 can be pushed from the inside of the first antenna cover 153 to the inside of the housing case 27 sequentially through the first helical antenna 156, the first and the second feeding members 158 and 159, and the second helical antenna 157.

In the antenna apparatus 152, when the head part 163A of the antenna pinching part 163 is contacted to the top end 153A of the first antenna cover 153 through such steps, almost whole of the second antenna part 155 is retracted from the inside of the first antenna cover 153 to the inside of the housing case 27.

In the antenna apparatus 152, here, the second helical antenna 157 and the telescopic antenna 160 are electrically connected by electrically connecting the fourth feeding member 162 to the second feeding members 159 to form a complex antenna comprising the second helical antenna 157 and the telescopic antenna 160.

According to this, in the antenna apparatus 152, in this situation, when a high frequency signal, as it is, is sent from the transmission and reception circuit 31 to the balun 38 through the unbalanced transmission line 32, the balun 38 sends out the high frequency signal to the first helical antenna 156 through the first feeding member 158, and moves the phase of the high frequency signal about 180° C. for the first helical antenna 156 in a frequency band in service to send the high frequency signal, of which phase has been moved, to the complex antenna through the second feeding members 159.

Hence, the antenna apparatus 152 makes the same voltage mode as that of FIGS. 4A and 4B, as described above, in the first helical antenna 156 and the complex antenna, works the first helical antenna 156 and the complex antenna as the approximately balanced antenna, and then, prevent flow of the leaked current from the complex antenna to the grounded side of the unbalanced transmission line 32 by the balanced converter action of the balun 38.

Therefore, the antenna apparatus 152 prevents flow of the leak current from the grounded side of the unbalanced transmission line 32 to the shield case to inhibit a work of the shield case as the antenna and allows functions of the shield case only as the original electric shielding plate and the ground.

According to this, in the antenna apparatus 152, because the shield case is not worked as the antenna, when the user holds the shield case 27 by user's hand and the user moves the housing case 27 close to the user's head to locate the shield case near the human body, the cellular telephone 151 can decrease deterioration of the antenna performances and thus, allows inhibiting the electric power, absorbed by the human body i. e., SAR.

In contrast to this, in the antenna apparatus 152, when the head part 163A of the antenna pinching part 163 is pulled toward the pulling direction, the second antenna part 155 can be pulled out from the top end 153A of the first antenna cover 153 to outside in the situation in which almost whole of the second antenna part 155 is retracted across the inside of the first antenna cover 153 and the inside of the housing case 27.

In the antenna apparatus 152, when the second antenna part 155 is fully pulled out from the top end 27C of the housing case 27, the first helical antenna 156 and the telescopic antenna 160 are electrically connected by electrically connecting the third feeding member 161 to the first feeding members 158 to form a complex antenna comprising the first helical antenna 156 and the telescopic antenna 160.

In the antenna apparatus 152, when the high frequency signal is sent from the transmission and reception circuit 31 to the balun 38 through the unbalanced transmission line 32 in this situation, the balun 38 send out the high frequency signal, as it is, to the complex antenna through the first feeding members 158, and moves the phase of the high frequency signal about 180° C. for the complex antenna 56 in the frequency band in service to send the yielded high frequency signal, of which phase has been moved, to the second helical antenna 157 through the second feeding members 159.

According to this, the antenna apparatus 152 makes the same voltage mode as that of FIGS. 4A and 4B, as described above, in the complex antenna and the second helical antenna 157, works the second helical antenna 157 and the complex antenna as the approximately balanced antenna, and then, prevent flow of the leaked current from the second helical antenna 157 to the grounded side of the unbalanced transmission line 32 by the balanced converter action of the balun 38.

Therefore, the antenna apparatus 152 prevents flow of the leak current from the grounded side of the unbalanced transmission line 32 to the shield case to inhibit a work of the shield case as the antenna and allows functions of the shield case only as the original electric shielding plate and the ground.

And, in the antenna apparatus 152, in pulling the second antenna part 155 similar to retracting it as described above, because the shield case is not worked as the antenna, when the user holds the shield case 27 by user's hand and the user moves the housing case 27 close to the user's head to locate-the shield case near the human body, the cellular telephone 151 can decrease deterioration of the antenna performances and thus, allows inhibiting the electric power absorbed by the human body, i. e., SAR.

Here in the cellular telephone 151, comparison of a physical length of the first and the second helical antennae 156 and 157 with that of the telescopic antenna 160 shows that the telescopic antenna 160 can be kept the frequency band relatively wider than that of the first and the second helical antennae 156 and 157, because it is physically longer than the first and the second helical antennae 156 and 157.

And, in the cellular telephone 151, in both retracting and pulling the second antenna part 155, the relatively wider frequency band can be always kept by working the telescopic antenna 160 as the antenna.

(11) Tenth Embodiment

Figure 35:
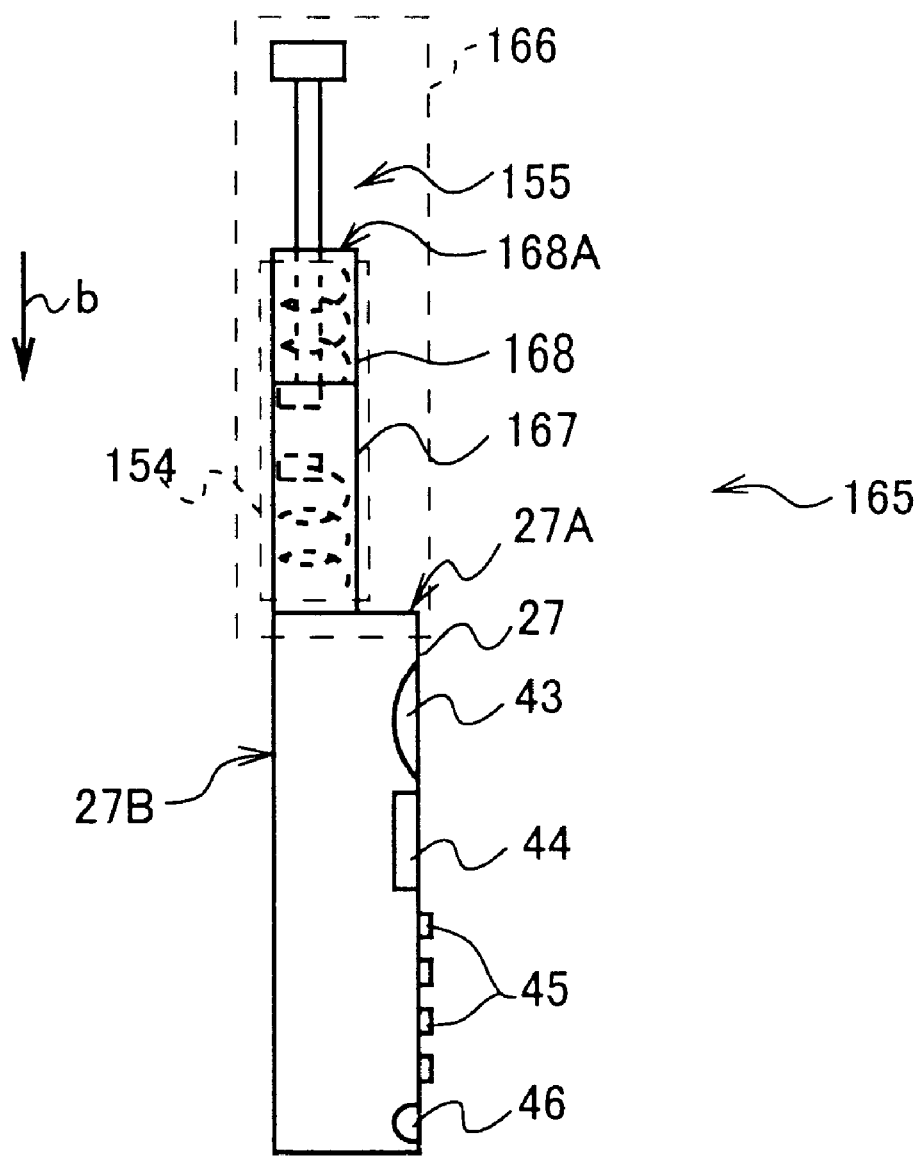
FIG. 35 is the outlined line drawing of a side view showing the configuration of the cellular telephone according to the tenth embodiment.

FIG. 35, in which the same numeral is assigned to a part corresponding to the identical part of the FIG. 32, shows the cellular telephone 165 according to the tenth embodiment, and configuration thereof is same as that of the cellular telephone 151 (FIG. 32) according to the ninth embodiment as described above excluding the configuration of the antenna apparatus 166.

The antenna apparatus 166 has the cap-shaped first and second antenna covers 167 and 168 arranged by sequentially layering on the back face 27B of the top end 27A of the housing case 27, the second helical antenna 157 is located inside the first antenna cover 167, and the first helical antenna 156 is located inside the second antenna cover 168.

In the antenna apparatus 166, the second antenna part 155 is retractably and pullably installed along with the retracting direction and the pulling direction in the top end 168A of the second antenna cover 168.

Therefore, in the cellular telephone 165, a part, in which the second antenna part 155 is pushed, can be shortened in the inside of the housing case 27 in comparison with the cellular telephone 151 according to the ninth embodiment, as described above, in pushing the second antenna part 155 in the inside of the housing case 27 sequentially through the inside of the second and the first antenna covers 168 and 167.

In addition to this, in the cellular telephone 165, locating the first antenna part 154 outside of the top end 27C of the housing case 27 allows keep a distance of the first and the second antenna parts 154 and 155 from the user's hand, which holds the housing case 27, and the user's head, to which the housing case 27 is moved closely, and thus, deterioration of the antenna performances of the cellular telephone 165 near the human body can be further reduced.

And, in the cellular telephone 165, the electric power, which is emitted from the first and the second antenna parts 154 and 155 and absorbed by the human body, can be reduced.

Figure 36:
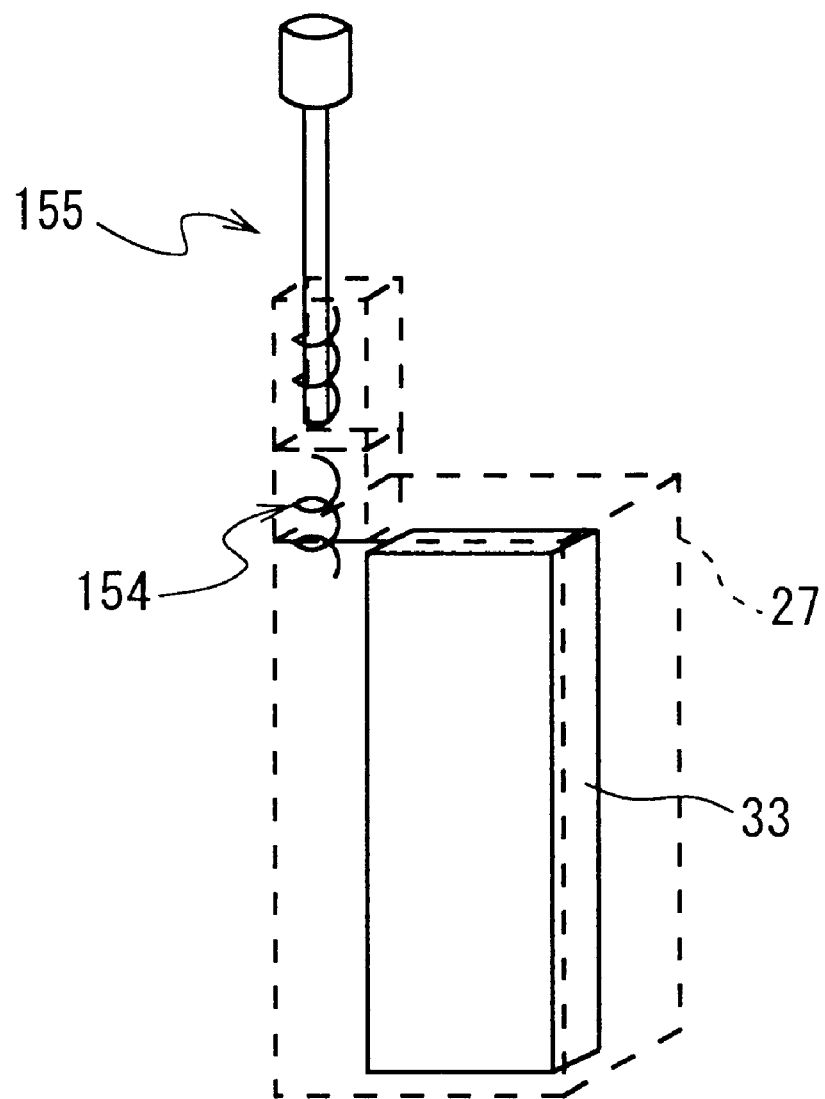
FIG. 36 is the outlined line drawing for explanation of arrangement of a first and second antenna parts of the cellular telephone according to the ninth embodiment, and of the shield case.

For reference, in the cellular telephone 165, as shown in FIG. 36, the first and the second antenna parts 154 and 155 are adapted to be located in a distance from the shield case inhibiting a capacitive coupling to prevent work of the shield case as the antenna.

Figure 37A:
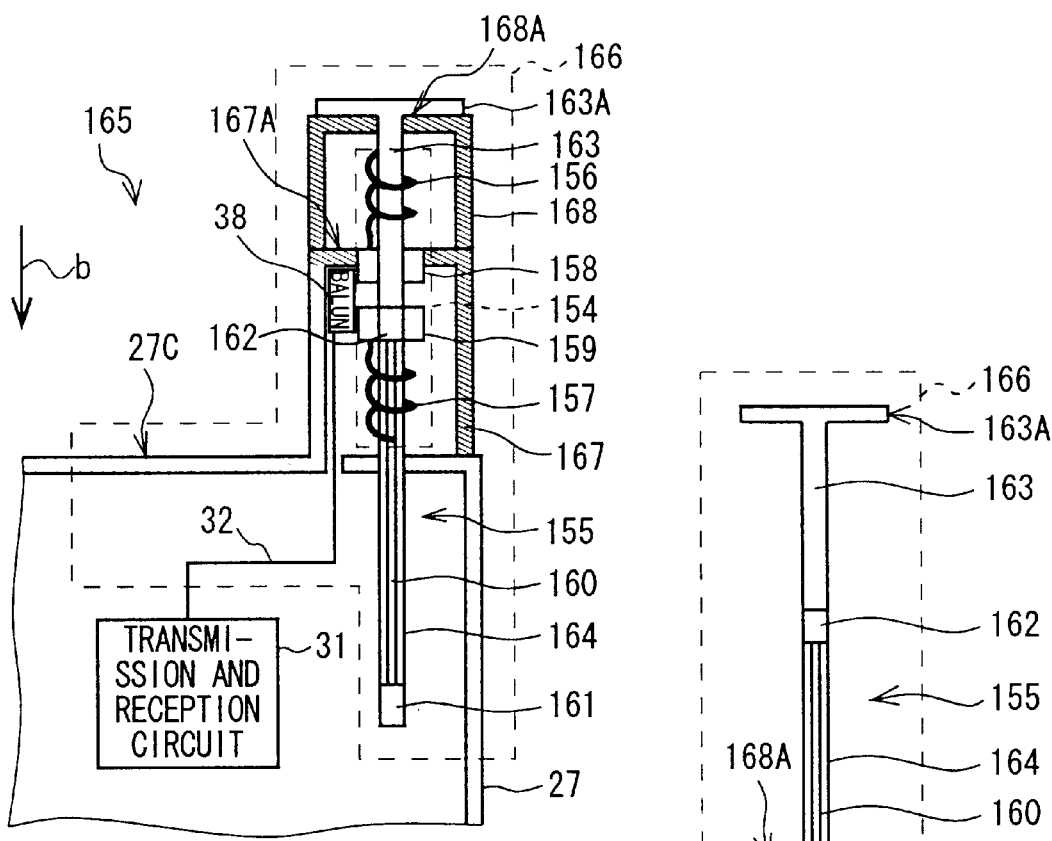
FIGS. 37A and 37B are the block diagrams showing the internal configuration of the cellular telephone according to the tenth embodiment.
Figure 37B:
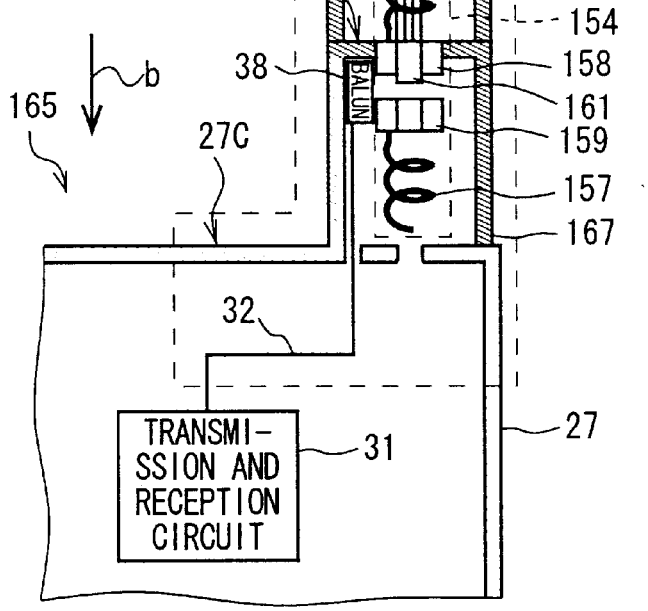

Practically, In FIGS. 37A and 37B, in which a same numeral is assigned to a part corresponding to the identical part of the FIGS. 34A and 34B, in the first antenna part 154, the first helical antenna 156, of which first central axis is almost corresponding to the elongated line of the second central axis, is located in the second antenna cover 168, and the first feeding member 158 is fitted to a hole part made in the top end 167A of the first antenna cover 167.

In the first antenna part 154, the second helical antenna 157, of which second central axis is almost parallel to the housing length direction, is located in the inside of the first antenna cover 167 together with the second feeding members 159.

Further, the balun 38 is installed inside the first antenna cover 167 and a balanced side of the balun 38 is electrically connected to the first and the second feeding members 158 and 159.

And, in the antenna apparatus 166, in retracting the second antenna part 155, the head part 163A of the antenna pinching part 163 is contacted to the top end 168A of the second antenna cover 168 to push the second antenna part 155 from the inside of the second antenna cover 168 to the inside of the housing case 27, and the fourth feeding member 162 is electrically connected to the second feeding members 159 in the inside of the first antenna cover 167.

According to this, in the antenna apparatus 166, the telescopic antenna 160 can be pushed from the inside of the first antenna cover 167 to the inside of the housing case 27 and thus, a part, in which the telescopic antenna 160 is pushed in the inside of the housing case 27, can be shortened.

In addition, in the antenna apparatus 166, in pulling the second antenna part 155, the third feeding member 161 is electrically connected to the first feeding member 158 inside the first antenna cover 167 in pulling out almost whole of the telescopic antenna 160 from the top end 167A of the first antenna cover 167.

According to this, in the antenna apparatus 166, the second antenna part 155 can be located keeping a distance from the top end 27C of the housing case 27.

Therefore, in the cellular telephone 165, in retracting the second antenna part 155, the telescopic antenna 160 can keep further distance from the user's hand, which holds the housing case 27, and the user's head, to which the housing case 27 is moved closely, in comparison with the cellular telephone 151 (FIGS. 34A and 34B) according to the ninth embodiment.

On the other hand, in the cellular telephone 165, in pulling the second antenna part 155, the telescopic antenna 60 can greatly keep a distance from the user's hand, which holds the housing case 27, and the user's head, to which the housing case 27 is moved closely, in comparison with the cellular telephone 151 according to the ninth embodiment.

Thus, in comparison with the first embodiment, deterioration of the antenna performances of the cellular telephone 165 near the human body can be further reduced and the electric power absorbed by the human body, i. e., SAR, can be further lowered.

In addition to this, in the cellular telephone 165, in the inside of the housing case 27, the first and the second antenna parts 154 and 155 can be easily installed according to a space occupied by such as a battery, even in the case where the first antenna part 54 is difficult to locate and the case where the second antenna part 155 is difficult to push in as a whole.

For reference, in the cellular telephone 165, although the first and second antenna covers 167 and 168 are installed, the first antenna cover 167 having the same size as the size of the second helical antenna 157 can be used, because the balun 38, as described above, can be formed as the very small chip. On the other hand, only the first helical antenna 156 is located inside the second antenna cover 168, and hence, one with approximately same size as that of the first helical antenna 156 can be used. Therefore, it can be prevented to increase greatly the size of the cellular telephone 165 along the housing length direction.

(12) Eleventh Embodiment

Figures 38A, 38B:
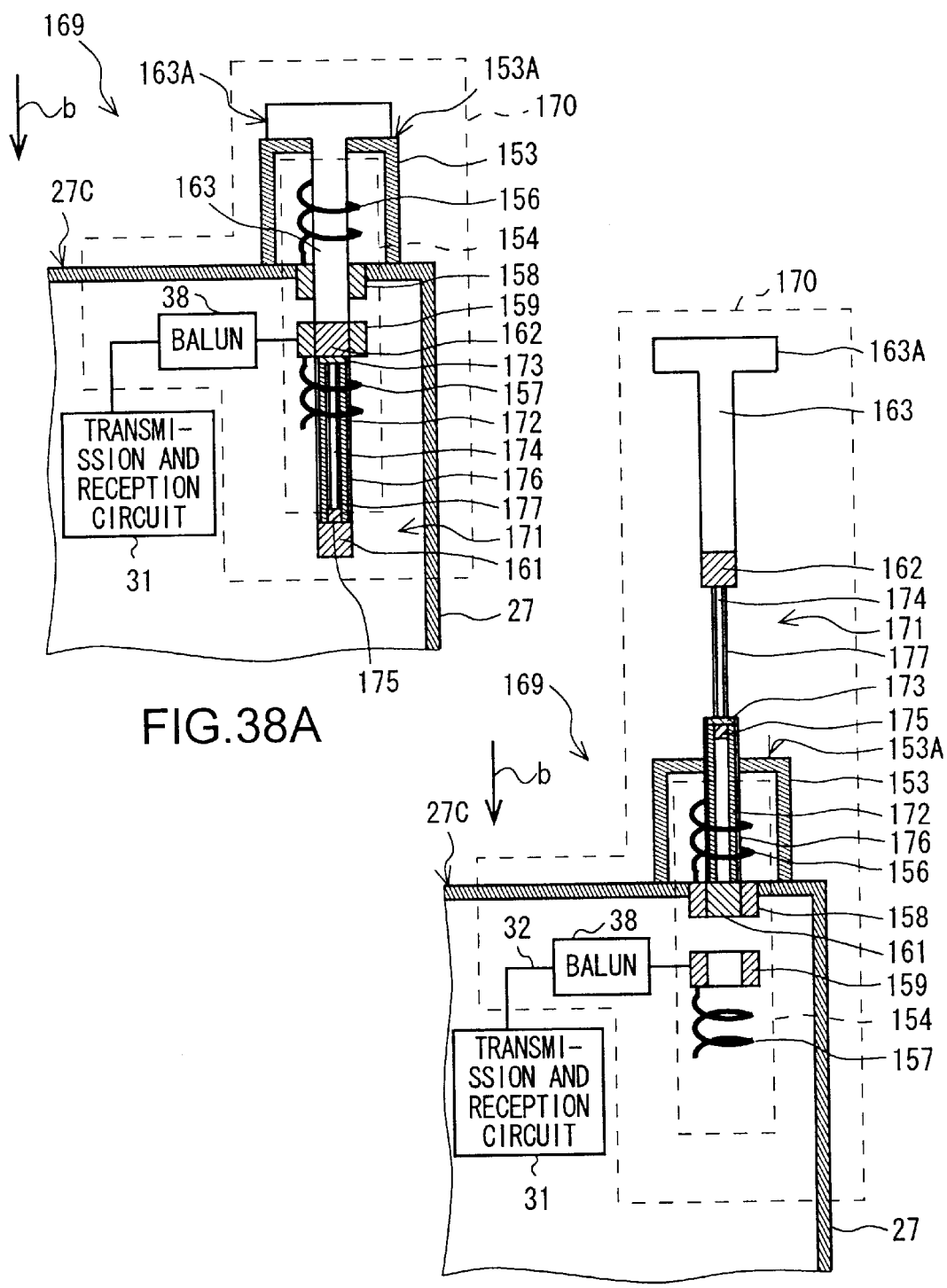
FIGS. 38A and 38B are the block diagrams showing the internal configuration of the cellular telephone according to the eleventh embodiment.

FIGS. 38A and 38B, in which a same numeral is assigned to a part corresponding to the identical part of the FIGS. 34A and 34B, shows the cellular telephone 169 according to the eleventh embodiment, and is configured similar to the cellular telephone 151 (FIGS. 34A and 34B) according to the ninth embodiment as described above excluding the configuration of the second antenna part 171 of the antenna apparatus 170.

Figures 39A, 39B:
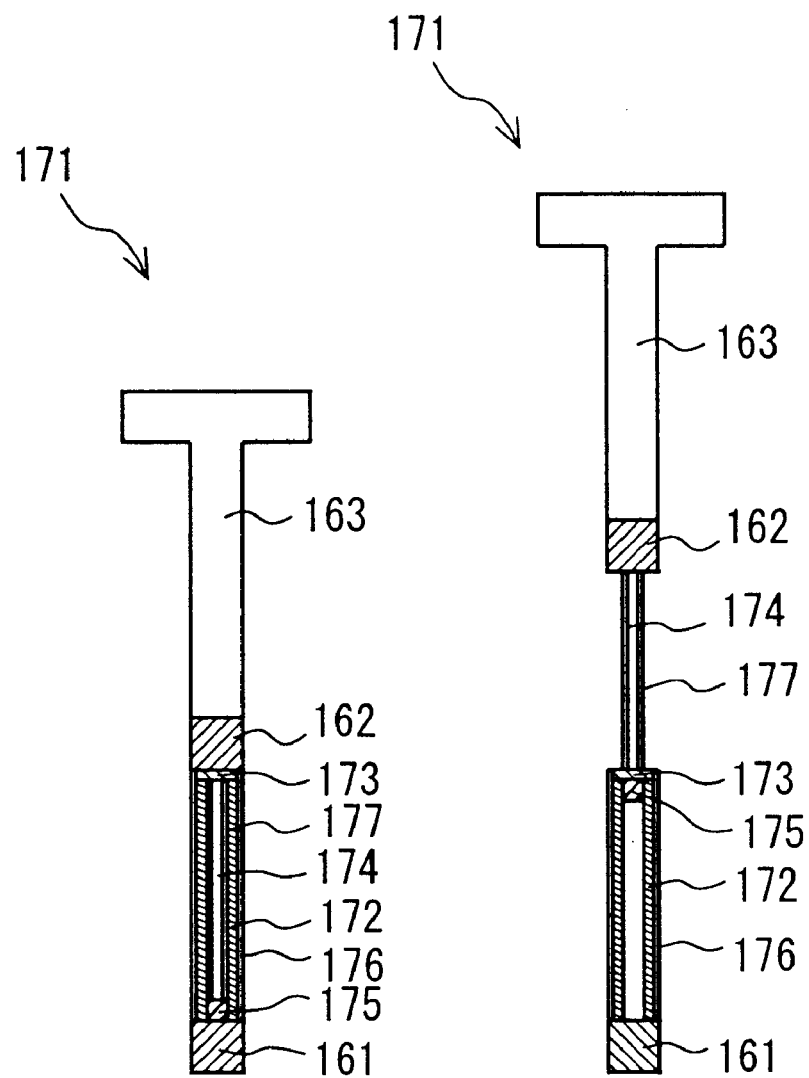
FIGS. 39A and 39B are the outlined line drawings of a side view showing the configuration of the second antenna part of the cellular telephone according to the eleventh embodiment.

In the second antenna part 171, as shown in FIGS. 39A and 39B, the third feeding member 161 is electrically and mechanically connected to the bottom end of a first antenna half 172 made of a conductive, cylindrical member, and a stopper for pulling 173 is installed in the top end of the first antenna half 172, and the second antenna half 174 comprising a conductive bar-like member is retractably and pushably installed by passing through a hole of the first antenna half 172.

A sliding spring 175 made of the conductive material is electrically and mechanically connected to the bottom end of the second antenna half 174 located in the hole of the first antenna half 172, and the fourth feeding member 162 is electrically and mechanically connected to the top end of the second antenna half 174, the antenna pinching part 163 is installed in the fourth feeding member 162.

Further, the first antenna half 172 and the second antenna half 174 are covered with antenna covers 176 and 177, respectively.

According to this, in the second antenna part 171, when the second antenna half 174 is pushed or pulled for the first antenna half 172, the sliding spring 75 slides in the hole of the first antenna half 172, and the telescopic antenna is formed by electrically connecting the first antenna half 172 to the second antenna half 174 through the sliding spring 175.

Practically, in the antenna apparatus 170, in retracting the second antenna part 171, when the head part 163A of the antenna pinching part 163 is pushed to the retracting direction, the second antenna part 171 is pushed from the inside of the first antenna cover 153 to the inside of the housing case 27, pushing the second antenna half 174 into the first antenna half 172.

And, in the antenna apparatus 170, when the head part 163A of the antenna pinching part 163 is contacted to the top end 153A of the first antenna cover 153, a shortened telescopic antenna is formed in pushing the whole of the second antenna half 174 into the first antenna half 172 and the fourth feeding member 162 is electrically connected to the second feeding members 159 to electrically connect the shortened telescopic antenna to the second helical antenna 157 to form the complex antenna.

According to this, in the antenna apparatus 170, forming the telescopic antenna shortened by the second antenna part 171 allows distinctly shorten a part which is pushed inside the housing case 27 of the telescopic antenna in comparison with the cellular telephone 151 (FIGS. 34A and 34B) according to the first embodiment as described above.

Therefore, in the cellular telephone 169, in pushing the second antenna part 171, the shortened telescopic antenna can keep a large distance from the user's hand, which holds the housing case 27, and the user's head, to which the housing case 27 is moved closely. Thus, in the situation in which the first antenna part 171 has been pulled, deterioration of the performances of antenna around the human body can be further reduced and here the electric power radiated from the telescopic antenna and absorbed by the human body can be further reduced.

For reference, in the antenna apparatus 170, in pulling the second antenna part 171, when the head part 163A of the antenna pinching part 163 is pulled toward the pulling direction, the second antenna part 171 is pulled out from the top end 153A of the first antenna cover 153 to the outside pulling the second antenna half 174 from the first antenna half 172.

And in the antenna apparatus 170, when the second antenna half 174 is fully pulled out from the first antenna half 172, the first antenna half 172 and the second antenna half 174 form the elongated telescopic antenna, and the elongated telescopic antenna is electrically connected to the first helical antenna 156 by electrically connecting the third feeding member 161 to the first feeding members 158 to make the complex antenna.

According to this, in the cellular telephone 169, the relatively wider frequency band can be kept with the telescopic antenna by using the telescopic antenna in both retracting and pulling of the second antenna part 171.

(13) Twelfth Embodiment

Figure 40A:
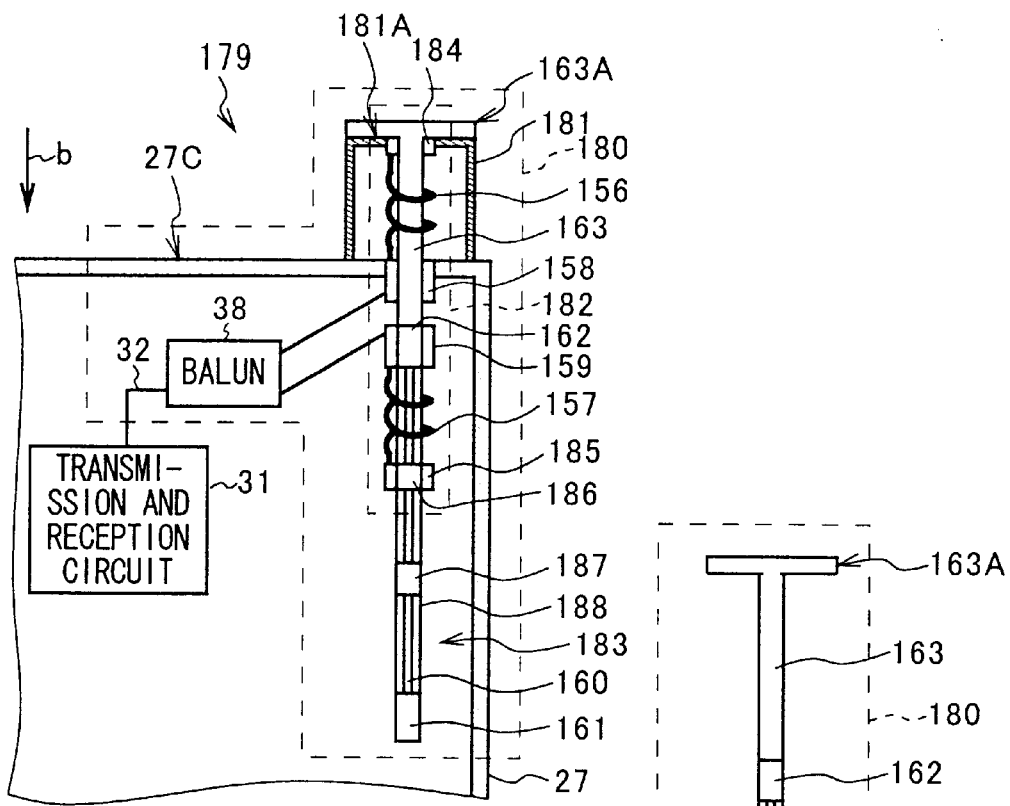
FIGS. 40A and 40B are the block diagrams showing the internal configuration of the cellular telephone according to the twelfth embodiment.
Figure 40B:
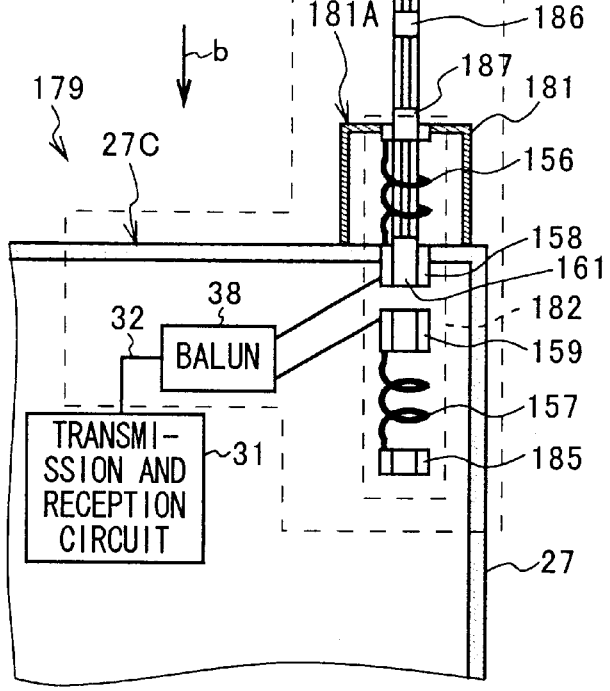

FIGS. 40A and 40B, in which a same numeral is assigned to a part corresponding to the identical part of the FIGS. 34A and 34B, shows the cellular telephone 179 according to the twelfth embodiment, and is configured similar to the cellular telephone 151 (FIGS. 34A and 34B) according to the ninth embodiment as described above excluding the configuration of the antenna apparatus 180.

In the antenna apparatus 180, the first antenna cover 181 is installed in the back face side 27B of the top end 27C of the housing case 27, the first antenna part 182 of the fixed type is located across the inside of the first antenna cover 181 and the housing case 27, and a second antenna part 183 is retractably and pullably installed in the top end 181A of the first antenna cover 181.

In the first antenna part 182, the first helical antenna 156 is located inside the first antenna cover 181 by arranging the first central axis of the helix almost parallel to the housing length direction, and the second helical antenna 157 is located around the top end 27C inside the back face 27B of the housing case 27 by almost corresponding the second central axis of the second helical antenna 157 to the elongated line of the first central axis.

And, the top end and the bottom end of respective the first and the second helical antennae 156 and 157 are electrically and mechanically connected to a fifth and a sixth feeding members 184 and 185 which are annularly formed using the conductive material.

On the other hand, the second antenna part 183 has a first and a second shorting members 186 and 187, which are made of the conductive material, by connecting to the telescopic antenna 160 electrically and mechanically in a predetermined site along with the length direction of the telescopic antenna 160, and the telescopic antenna 160 is covered with a cover 188, made of the nonconductive material, for the telescopic antenna to expose a circumferential side face of the first and the second shorting members 186 and 187.

And, the second antenna part 183 is adapted to retract or pull along with the first and second central axes of the first and the second helical antennae 156 and 157.

According to this, in the antenna apparatus 180, when the head part 163A of the antenna pinching part 163 is pushed to the retracting direction, the second antenna part 183 is pushed across the inside of the first antenna cover 181 and the inside of the housing case 27, and when the head part 163A of the antenna pinching part 163 is contacted to the top end 181A of the first antenna cover 181, almost whole of the second antenna part 183 is retracted across the inside of the first antenna cover 181 and the inside of the housing case 27.

And, in the antenna apparatus 180, the top end and the bottom end of the second helical antenna 157 is shorted to the telescopic antenna 160 to form the complex antenna by electrically connecting the fourth feeding member 162 to the second feeding members 159 and electrically connecting the first shorting member 186 to the sixth feeding member 185.

Here, in the antenna apparatus 180, when the first helical antenna 156 is supplied the electric power from the transmission and reception circuit 31 sequentially through the unbalanced transmission line 32 and the balun 38, the first helical antenna 156 is worked as the antenna.

In addition to this, in the antenna apparatus 180, the complex antenna is also supplied the electric power from the transmission and reception circuit 31 sequentially through the unbalanced transmission line 32 and the balun 38, in the complex antenna the second helical antenna 157 is not worked as the antenna by shorting the telescopic antenna 160, but only the telescopic antenna is 160 worked as the antenna.

And, here in the antenna apparatus 180, flow of the leaked current from the telescopic antenna 160 composing the complex antenna to the grounded side of the unbalanced transmission line 32 is prevented by the balanced converter action of this balun 38. Hence, it is prevented that the shield case works as the antenna by the leaked current running from the grounded side of the unbalanced transmission line 32 to the shield case.

On the contrary, in the antenna apparatus 180, when the head part 163A of the antenna pinching part 163 is pulled toward the pulling direction, the second antenna part 183 can be pulled out from the inside of the housing case 27 to the outside through the inside of the first antenna cover 181.

And, in the antenna apparatus 180, when the second antenna part 183 is fully pulled out from the top end 27C of the housing case 27, the top end and the bottom end of the first helical antenna 156 are shorted with the telescopic antenna 160 by electrically connecting the third feeding member 161 to the first feeding members 158 and electrically connecting the second shorting member 187 to the fifth feeding member 184 to form the complex antenna.

According to this, in the antenna apparatus 180, when the complex antenna is supplied the electric power from the transmission and reception circuit 31 sequentially through the unbalanced transmission line 32 and the balun 38, in the complex antenna the first helical antenna 156 is not worked as the antenna by shorting the telescopic antenna 160, but only the telescopic antenna 160 is worked as the antenna.

In addition to this, in the antenna apparatus 180, the second helical antenna 157 is supplied the electric power from the transmission and reception circuit 31 sequentially through the unbalanced transmission line 32 and the balun 38 to work the second helical antenna 157 as the antenna.

Therefore, in the cellular telephone 179, flow of the leaked current from the second helical antenna 157 to the grounded side of the unbalanced transmission line 32 is prevented by the balanced converter action of this balun 38, and also, it is prevented that the shield case works as the antenna by the leaked current running from the grounded side of the unbalanced transmission line 32 to the shield case.

According to this, in the cellular telephone 179, in both retracting and pulling the second antenna part 183, the relatively wider frequency band can be always kept by working the telescopic antenna 160 as the antenna.

(14) Thirteenth Embodiment

Figure 41A:
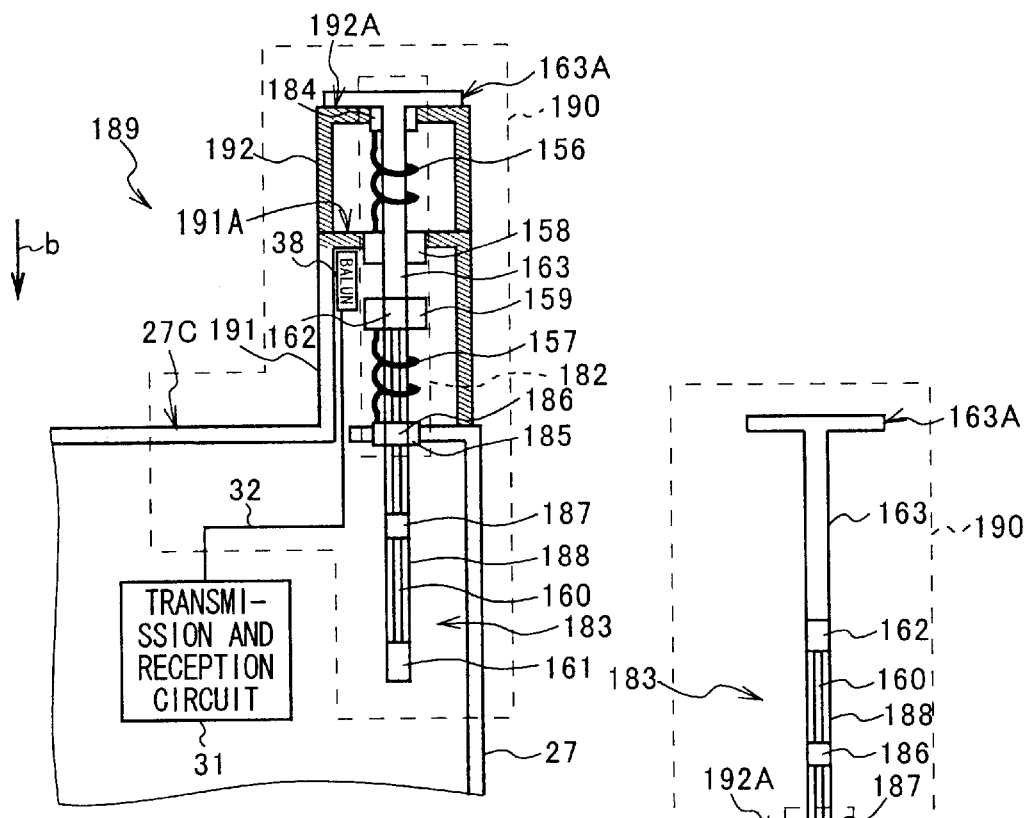
FIGS. 41A and 41B are the block diagrams showing the internal configuration of the cellular telephone according to the thirteenth embodiment.
Figure 41B:
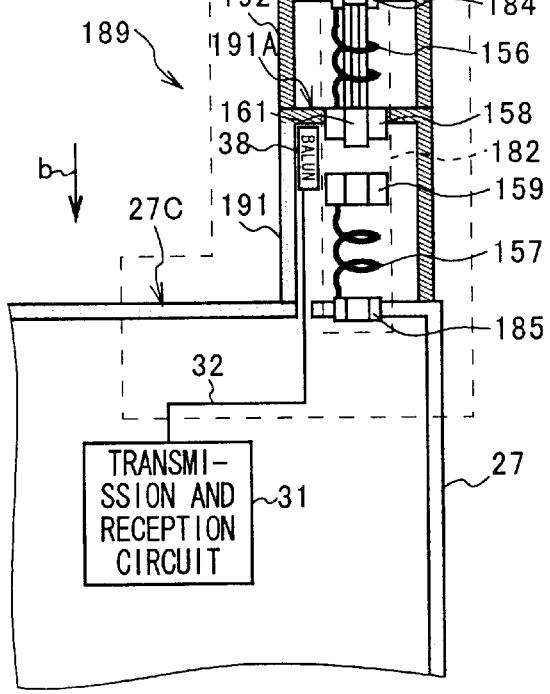

FIGS. 41A and 41B, in which a same numeral is assigned to a part corresponding to the identical part of the FIGS. 40A and 40B, shows the cellular telephone 189 according to the thirteenth embodiment, and is configured similar to the cellular telephone 179 (FIGS. 40A and 40B) according to the twelfth embodiment as described above excluding the configuration of the antenna apparatus 190.

In the antenna apparatus 190, which has the cap-like first and second antenna cover 191 and 192 located by sequentially layering in the back face side 27B of the top end 27C of the housing case 27, the second helical antenna 157, of which second central axis is almost parallel to the housing length direction, of the first antenna part 182 is located in the inside of the first antenna cover 191 together with the second feeding members 159, and the first helical antenna 156 is located inside the second antenna cover 192 by coinciding the first central axis with the elongated line of the second central axis.

A hole part is made in the top end 192A of the second antenna cover 192, the fifth feeding member 184 is fitted to this hole part, and the hole is made in the top end 191A of the first antenna cover 191, the first feeding member 158 is fitted to the hole part.

Furthermore, the hole is also made in the back face side 27B of the top end 27C of the housing case 27 and the sixth feeding member 185 is fitted to this hole part.

And, the balun 38 is installed inside the first antenna cover 191, and the first and the second feeding members 158 and 159 are electrically connected to the balanced side of the balun 38.

On the other hand, the second antenna part 183 is retractably and pullably installed in the top end 192A of the second antenna cover 192, and adapted to pass through the fifth feeding member 184, the first helical antenna 156, the first feeding member 158, the second feeding member 159, and the second helical antenna 157, and the sixth feeding member 185 along with the first and the second central axes of the first and the second helical antennae 156 and 157 in retracting and pulling.

And, in the antenna apparatus 190, the head part 163A of the antenna pinching part 163 is contacted to the top end 192A of the second antenna cover 192 to push the second antenna part 183 from the inside of the second antenna cover 192 to the inside of the housing case 27, and the fourth feeding member 162 is electrically connected to the second feeding members 159 in the inside of the first antenna cover 191, and the first shorting member 186 is electrically connected to the sixth feeding member 185 to short the top end and the bottom ends of the second helical antenna 157 with the telescopic antenna 160 finally resulting in forming the complex antenna.

Hence, in the antenna apparatus 190, a part, which is pushed inside the housing case 27 of the second antenna part 183, can be shorten in pushing the second antenna part 183 from the inside of the second antenna cover 192 to the housing case 27 through the inside of the first antenna cover 191.

Further, in the antenna apparatus 190, the third feeding member 161 is electrically connected to the first feeding member 158 inside the first antenna cover 191 in pulling out almost whole of the second antenna part 183 from the top end 191A of the first antenna cover 191, and the top end and the bottom end of the first helical antenna 156 are shorted with the telescopic antenna 160 by electrically connecting the third feeding member 161 to the first feeding member 158 and also electrically connecting the second feeding member 187 to the fifth feeding members 184 to form the complex antenna inside the first antenna cover 191.

According to this, here in the antenna apparatus 190, the second antenna part 183 can be located in a distance from the top end 27C of the housing case 27.

Consequently, in the cellular telephone 189, in pushing in the second antenna part 183, in comparison with the cellular telephone 179 (FIGS. 40A and 40B) according to the twelfth embodiment as described above, the telescope antenna 160 of the second antenna part 183 can keep a distance from the user's hand, which holds the housing case 27, and the user's head, to which the housing case 27 is moved closely.

On the other hand, in the cellular telephone 189, in pulling out the second antenna part 183, locating the telescope antenna 160 to keep a distance from the top end 27C of the housing case 27 allows the telescope antenna 160 to keep a distance from the user's hand, which holds the housing case 27, and the user's head, to which the housing case 27 is moved closely.

Therefore, in the cellular telephone 189, in comparison with the cellular telephone 179 according to the twelfth embodiment, deterioration of the performances of the antenna near the human body can be further reduced.

In addition to this, in the cellular telephone 189, in the inside of housing case 27, even in the case where the space occupied by the battery or the like inhibits to locate the first antenna part 182 and the case where the whole of the second antenna part 183 is difficult to push in, the first and the second antenna parts 182 and 183 can be easily installed.

For reference, in the cellular telephone 189, the first and second antenna covers 191 and 192 are installed in the housing case 27. However, the very small chip can be used as the inductive reactance element and the capacitive reactance element composing the balun 38 to make the balun 38 small as a whole. Therefore, the first antenna cover 191 having approximately same size as that of the second helical antenna 157 can be used.

Besides, also for the second antenna cover 192, locating only the first helical antenna 156 inside allows use for one having approximately same size as the size of the first helical antenna 156. Thus, it can be prevented to maximize greatly the cellular telephone 189 along with the housing longitudinal direction.

(15) Fourteenth Embodiment

Figure 42A:
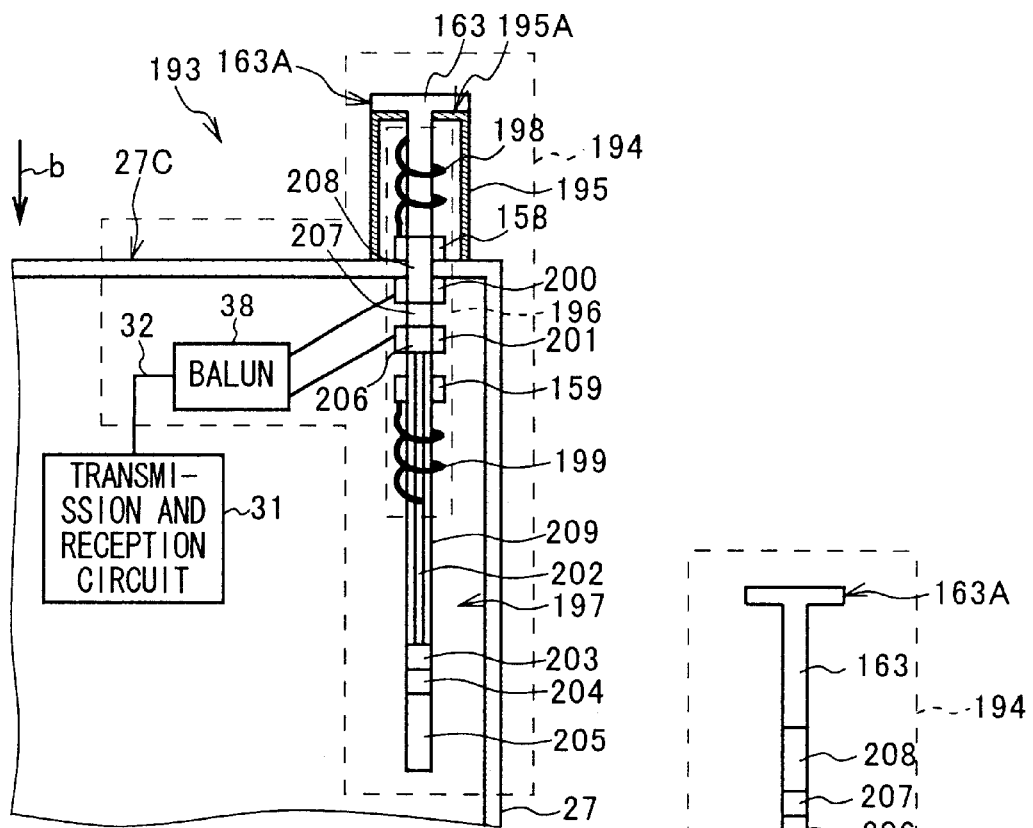
FIGS. 42A and 42B are the block diagrams showing the internal configuration of the cellular telephone according to the fourteenth embodiment.
Figure 42B:
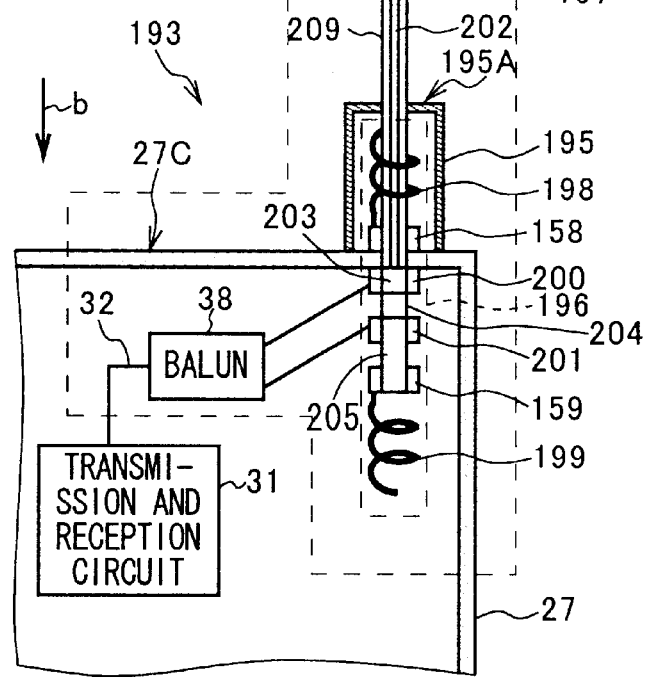

FIGS. 42A and 42B, in which a same numeral is assigned to a part corresponding to the identical part of the FIGS. 34A and 34B, shows the cellular telephone 193 according to the fourteenth embodiment, and is configured similar to the cellular telephone 151 (FIGS. 34A and 34B) according to the ninth embodiment as described above excluding the configuration of the antenna apparatus 194.

In the antenna apparatus 194, which has the first antenna cover 195 located in the back face side 27B of the top end 27C of the housing case 27, the first antenna part 196 is located across the inside of the first antenna cover 195 and the inside of the housing case 27, and the second antenna part 197 is retractably and pullably installed in the top end 195A of the first antenna cover 195.

In the first antenna part 196, a first and a second helical antennae 198 and 199 is installed as the antenna elements, the first helical antennae 198 is located inside the first antenna cover 195 making the first central axis parallel to the housing longitudinal direction, and the second helical antenna 19 9 is located inside the housing case 27 making the second central axis coincide with the elongated line of the first central axis.

A seventh and eighth feeding members 200 and 201, which is formed in the annular shape with the conductive material, are installed between the first and the second feeding members 158 and 159 installed in the opposite top and bottom ends of the first and second helical antennae 198 and 199 to keep a distance to prevent capacitive coupling each other, and to keep a distance to prevent capacitive coupling with the first and the second feeding members 158 and 159.

On the other hand, in the second antenna part 197, a first feeding terminal 203 made of the conductive material is electrically and mechanically connected to the bottom end of the telescopic antenna 202, and a first connecting part 204 made of the nonconductive material is mechanically connected to the first feeding terminal 203. The first connecting part 204 is electrically and mechanically connected to a rod-like first antenna member 205 made of conductive material, and thus, the first antenna member 205 is electrically separated from the first feeding terminal 203.

The top end of the telescopic antenna 202 is electrically and mechanically connected to a second feeding terminal 206 made of conductive material, and the second feeding terminal 206 is mechanically connected to a second connecting part 207 made of the nonconductive material.

The second connecting part 207 is electrically and mechanically connected to a rod-like second antenna member 208 made of conductive material, and in the second antenna member 208, the antenna pinching part 163 made of the nonconductive material and having the T-shaped section. According to this, the second antenna member 208 is electrically separated from the second feeding terminal 206.

Furthermore, the telescopic antenna 202 is covered with a telescopic antenna cover 209 made of nonconductive material.

On the other hand, in the antenna apparatus 194, the balanced side of the balun 38 is electrically connected to the seventh and eighth feeding members 200 and 201.

And, in the antenna apparatus 194, when the second antenna part 197 is push to contact the head part 163A of the antenna pinching part 163 with the top end 195A of the first antenna cover 195, the second antenna part 197 is housed from the inside of the first antenna cover 195 to the inside of the housing case 27, the second antenna member 208 is electrically connected to the first feeding members 158 and the seventh feeding member 200, and the second feeding terminal 206 is electrically connected to the eighth feeding member 201.

According to this, in the antenna apparatus 194, the second antenna member 208 and the first helical antennae 198 are electrically connected to the complex antenna, and in this condition, when the complex antenna and the telescopic antenna 202 are supplied the electric power from the transmission and reception circuit 31 sequentially through the unbalanced transmission line 32 and the balun 38, the complex antenna and the telescopic antenna 202 are worked as the approximately balanced type antenna.

In addition to this, here in the antenna apparatus 194, the flow of the leaked current from the telescopic antenna 202 to the grounded side of the unbalanced transmission line 32 is prevented by the balanced converter action of the balun 38 to prevent the work of the shield case as the antenna by the leaked current.

On the other hand, in the antenna apparatus 194, when the second antenna part 197 is pulled out from the inside of the housing case 27 through the inside of the first antenna cover 195, the seventh feeding member 200 is electrically connected to the first feeding terminal 203, and the first antenna member 205 is electrically connected to the second and the eighth feeding members 159 and 201.

According to this, in the antenna apparatus 194, the first antenna member 205 and the second helical antenna 199 are electrically connected to make the second complex antenna, and in this condition, when the telescopic antenna 202 and the complex antenna are supplied the electric power from the transmission and reception circuit 31 sequentially through the unbalanced transmission line 32 and the balun 38, the telescopic antenna 202 and the complex antenna are worked as the approximately balanced type antenna.

In addition to this, here in the antenna apparatus 194, the flow of the leaked current from the complex antenna comprising the first antenna member 205 and the second helical antenna 199 to the grounded side of the unbalanced transmission line 32 is prevented by the balanced converter action of the balun 38 to prevent the work of the shield case as the antenna by the leaked current.

Consequently, in the cellular telephone 193, as same as the ninth embodiment as described above, in pushing in and pulling out the second antenna part 197, because the shield case is not worked as the antenna, even if the housing case 27 is held by the user's hand and the housing case 27 is moved closely to the user's head to locate the shield case near the human body, the performance deterioration of the antenna of the cellular telephone 193 near the human body can be greatly reduced.

For reference, in the cellular telephone 193, in both retracting and pulling the second antenna part 197, the relatively wider frequency band can be always kept by working the telescopic antenna 202 as the antenna.

(16) Fifteenth Embodiment

Figure 43A:
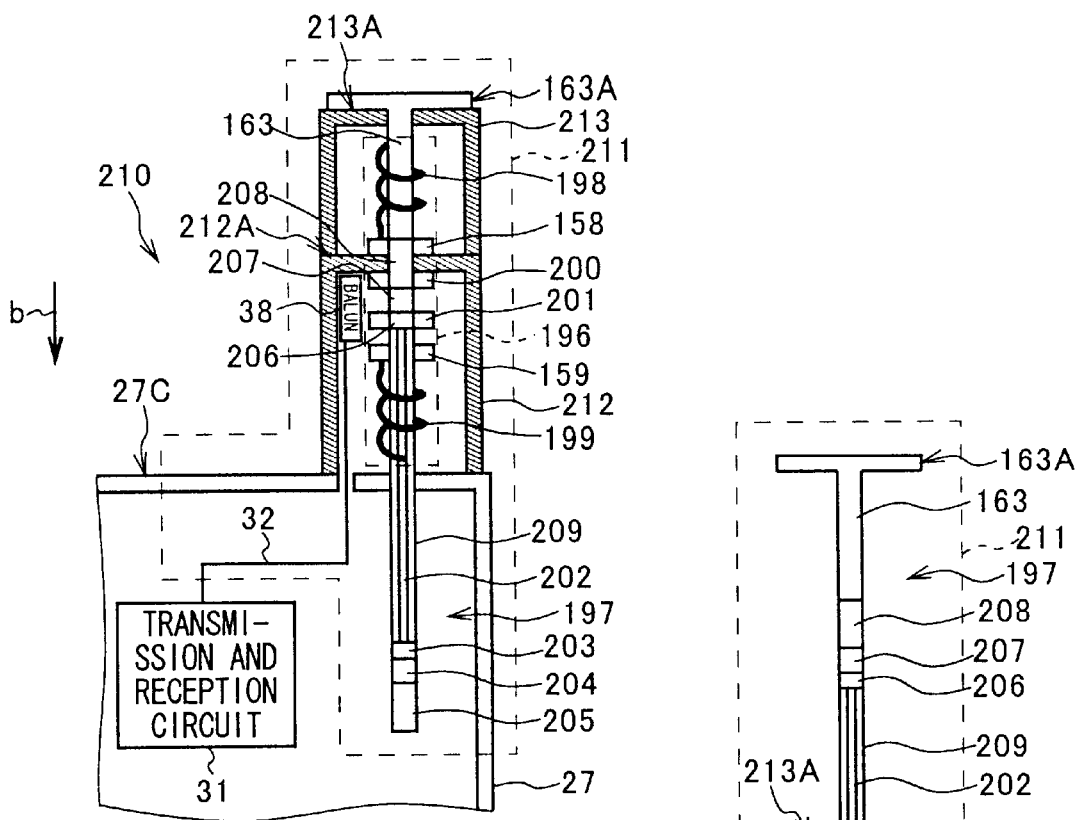
FIGS. 43A and 43B are the block diagrams showing the internal configuration of the cellular telephone according to the fifteenth embodiment.
Figure 43B:
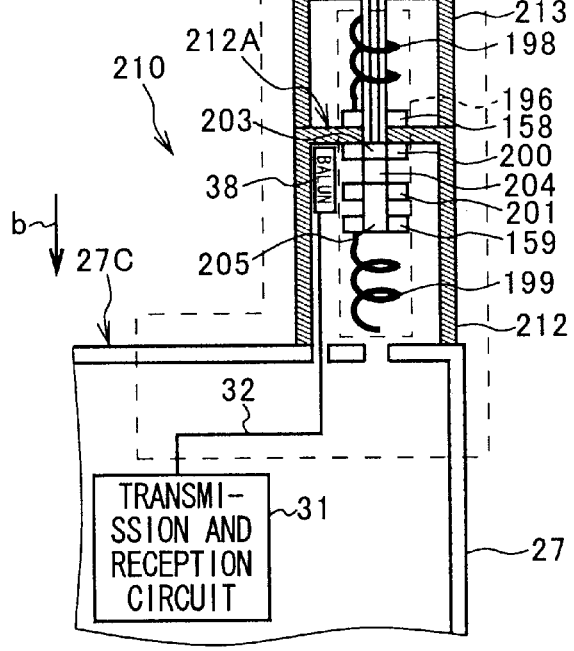

FIGS. 43A and 43B, in which a same numeral is assigned to a part corresponding to the identical part of the FIGS. 42A and 42B, shows the cellular telephone 210 according to the fifteenth embodiment, and is configured similar to the cellular telephone 193 (FIGS. 42A and 42B) according to the fourteenth embodiment as described above excluding the configuration of the antenna apparatus 211.

In the antenna apparatus 211, which has cap-like first and second antenna covers 212 and 213 located in the back face side 27B of the top end 27C of the housing case 27 by sequential layering, the second helical antenna 199, of which second central axis is almost parallel to the housing length direction, is located in and the second feeding member 159 and the seventh and the eighth feeding members 200 and 201 are located in the inside of the first antenna cover 212.

The first helical antenna 198 is located inside the second antenna cover 213 by approximately coinciding the first central axis with the elongated line of the second central axis, and the first feeding member 158 is located. In addition to this, the balun 38 is installed inside the first antenna cover 212 to connect electrically to the first and the second feeding members 158 and 159 in the balanced side of the balun 38.

On the other hand, the second antenna part 197 is installed retractably and pullably in the top end 213A of the second antenna cover 213 to adapt to be pushed or pulled along with the first and second central axes of the first and the second helical antennae 198 and 199.

And, in the antenna apparatus 211, in retracting the second antenna part 197, when the second antenna part 197 is pushed from the inside the second antenna cover 213 to the inside of the housing case 27 to contact the head part 163A of the antenna pinching part 163 with the top end 213A of the second antenna cover 213, the second antenna member 208 is electrically connected to the first and the seventh feeding members 158 and 200 inside and outside of the top end 212A of the first antenna cover 212, and the eighth feeding member 201 is electrically connected to the second feeding terminal 206 in the top side of the inside of the first antenna cover 212.

Thus, in the antenna apparatus 211, a part, which is retracted inside the housing case 27, of the second antenna part 197 can be distinctly shorten.

On the other hand, in the antenna apparatus 211, in pulling the second antenna part 197, when the second antenna part 197 is pulled out from the top end 213A of the second antenna cover 213 to outside, the seventh feeding members 200 is electrically connected to the first feeding terminal 203 inside the first antenna cover 212 and the first antenna member 205 is electrically connected to the second feeding member 159 and the eighth feeding member 201.

According to this, in the antenna apparatus 211, the second antenna part 197 can keep a distance from the top end 27C of the housing case 27 to locate the bottom end of the second antenna part 197 in the top side of the inside of the first antenna cover 212 by pulling out the second antenna part 97 completely from the housing case 27.

Therefore, in the cellular telephone 210, in retracting the second antenna part 197, in comparison with the fourteenth embodiment as described above, by shortening the part, to which the second antenna part 197 is pushed in, inside the housing case 27, the second antenna part 197 can keep a further distance from the user's hand, which holds the housing case 27, and the user's head, to which the housing case 27 is moved closely.

On the other hand, in the cellular telephone 210, in pulling the second antenna part 197, by pulling out completely the second antenna part 197 from the housing case 27, the second antenna part 197 can keep the further distance from the user's hand, which holds the housing case 27, and the user's head, to which the housing case 27 is moved closely.

Besides, in the cellular telephone 210, locating the first antenna part 196 in the top side of the top end 27C of the housing case 27 allows the first antenna part 196 to keep the distance from the user's hand and head.

According to this, in the cellular telephone 110, the performance deterioration of the antenna near the human body can be further reduced. In addition, the electric power radiated from the first and second antenna parts 196 and 197 and absorbed by the human body can be further reduced.

In the cellular telephone 210, on the basis of the structure in which the first and second antenna parts 196 and 197 keep the distance from the human body, inside the housing case 27, even in the case where the first antenna part 196 can be not easily installed due to the space occupied by the battery or the like and even in the case where the second antenna part 197 is difficult to push in as a whole, the first and second antenna parts 196 and 197 are easily installed.

(17) Sixteenth embodiment

Figures 44A, 44B:
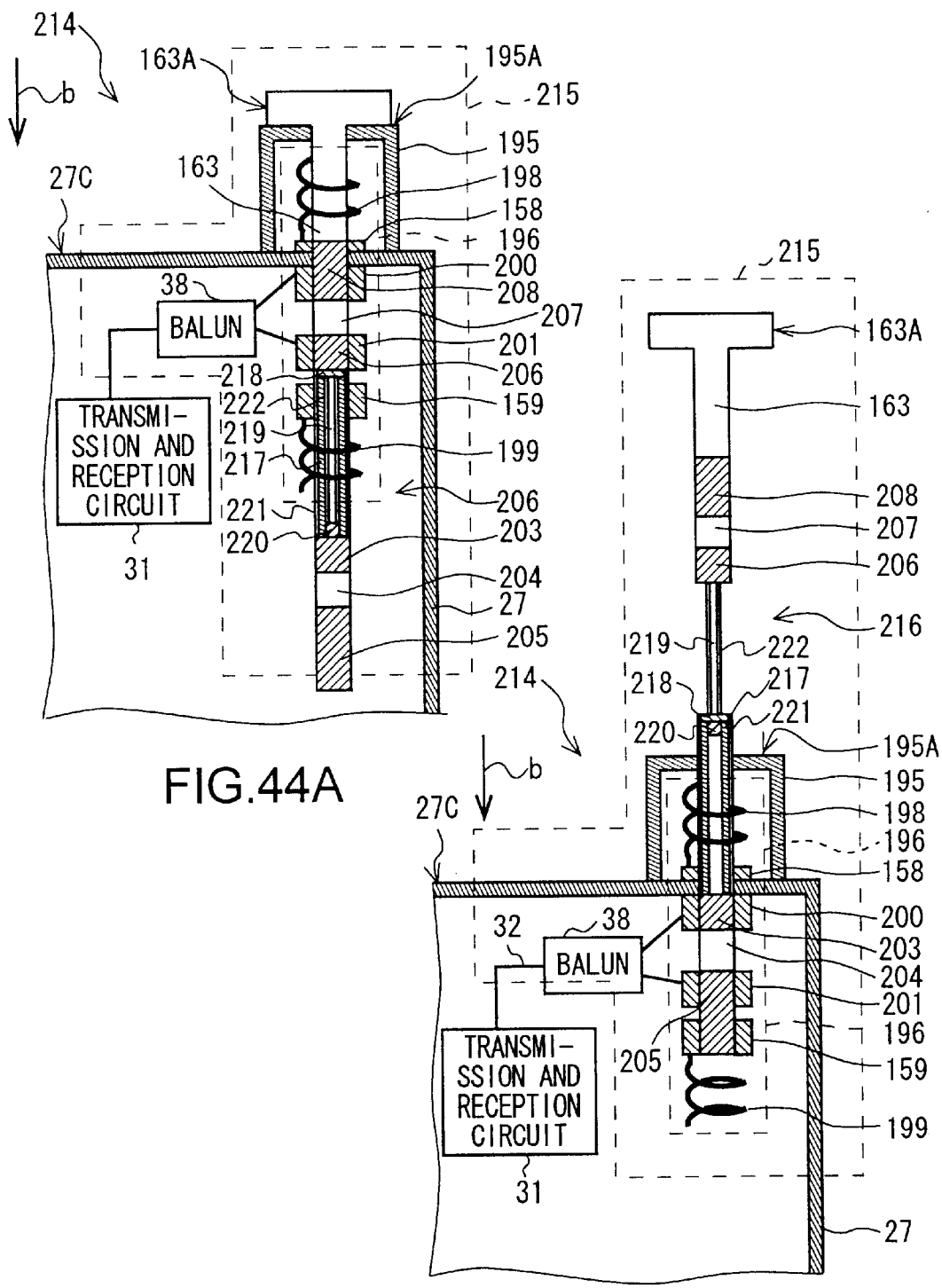
FIGS. 44A and 44B are the block diagrams showing the internal configuration of the cellular telephone according to the sixteenth embodiment.

FIGS. 44A and 44B, in which a same numeral is assigned to a part corresponding to the identical part of the FIGS. 42A and 42B, shows the cellular telephone 214 according to the sixteenth embodiment, and is configured similarly to the cellular telephone 193 (FIGS. 42A and 42B) according to the fourteenth embodiment as described above excluding the configuration of the second antenna part 216 of the antenna apparatus 215.

Figures 45A, 45B:
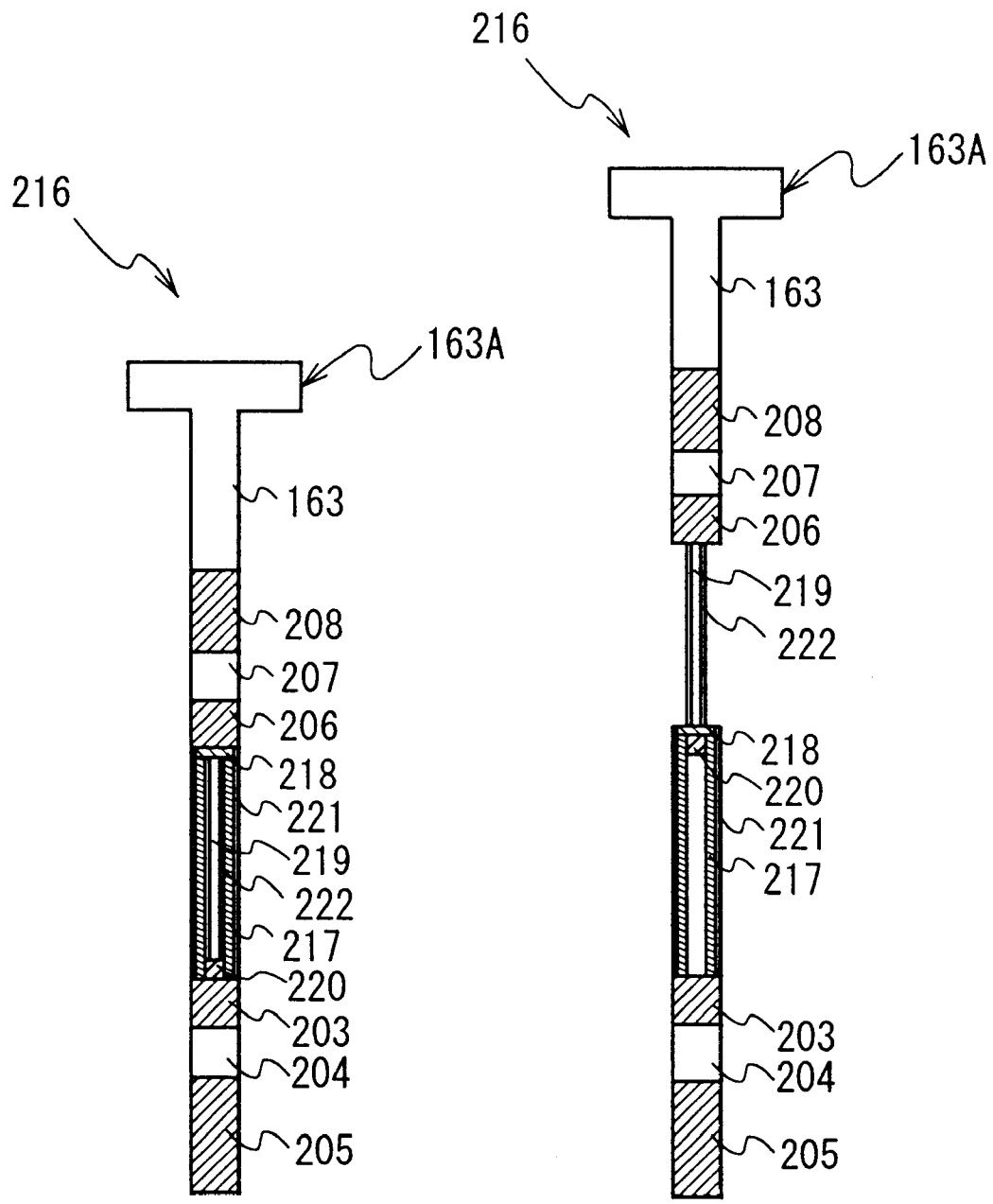
FIGS. 45A and 45B are the outlined line drawings of a side view showing the configuration of the second antenna part of the cellular telephone according to the sixteenth embodiment.

In the first antenna part 216, as shown in FIGS. 45A and 45B, the first feeding terminal 203 is electrically and mechanically connected to the bottom end of a first antenna half 217 made of a conductive, cylindrical member, and the stopper 218 for pulling is installed in the top end of the first antenna half 217, and the second antenna half 219 comprising a conductive bar-like member is pullably and retractably installed by passing through a hole of the first antenna half 217.

The sliding spring 220 made of the conductive material is electrically and mechanically connected to the bottom end of the second antenna half 219 located in the hole part of the first antenna half 217, and the second feeding terminal 206 is electrically and mechanically connected to the top end of the second antenna half 219.

Further, the first and the second antenna halves 217 and 219 are covered with antenna covers 221 and 222, respectively.

According to this, in the second antenna part 216, when the second antenna half 219 is pushed or pulled for the first antenna half 217, the sliding spring 220 slides in the hole part of the first antenna half 217, and the telescopic antenna is formed by electrically connecting the first antenna half 217 to the second antenna half 219 through the sliding spring 220.

Practically, in the antenna apparatus 215 (FIGS. 44A and 44B,) when the head part 163A of the antenna pinching part 163 is pushed to the retracting direction, the second antenna part 216 is pushed from the inside of the first antenna cover 195 to the inside of the housing case 27, while pushing the second antenna half 219 in the first antenna half 217.

And, in the antenna apparatus 215, when the head part 163A of the antenna pinching part 163 is contacted to the top end 195A of the first antenna cover 195, a shortened telescopic antenna is formed by pushing the whole of the second antenna half 219 in the first antenna half 217 and the second antenna member 208 is electrically connected to the first and the seventh feeding members 158 and 200 to connect electrically the eighth feeding member 201 to the second feeding terminal 206.

According to this, in the antenna apparatus 215, forming the telescopic antenna shortened by the second antenna part 216 allows distinctly shortening a part, which is pushed inside the housing case 27 of the second antenna part 216.

Therefore, in the cellular telephone 214, because a part, which is pushed into the housing case 27 to be shorten, of the second antenna part 216 can keep a large distance from the user's hand, which holds the housing case 27, and the user's head, to which the housing case 27 is moved closely. Thus, deterioration of the performances of antenna around the human body can be further reduced.

Because the second antenna part 216 keeps a distance from the human body, the electric power radiated from the shortened telescopic antenna and absorbed by the human body can be reduced.

For reference, in the antenna apparatus 215, when the head part 163A of the antenna pinching part 163 is pulled to the pulling direction, the second antenna part 216 is pulled from the top end 195A of the first antenna cover 195 to outside, while pulling out the second antenna half 219 from the first antenna half 217.

And in the antenna apparatus 215, when the second antenna half 219 is fully pulled out from the first antenna half 217, the first and the second antenna halves 217 and 219 form the elongated telescopic antenna, and the first feeding terminal 203 is electrically connected to the seventh feeding member 200, and the first antenna member 205 is electrically connected to the second and eight feeding members 159 and 201.

According to this, in the cellular telephone 214, the relatively wider frequency band can be kept by using the telescopic antenna in both retracting and pulling of the second antenna part 216.

(18) Seventeenth embodiment

Figure 46A:
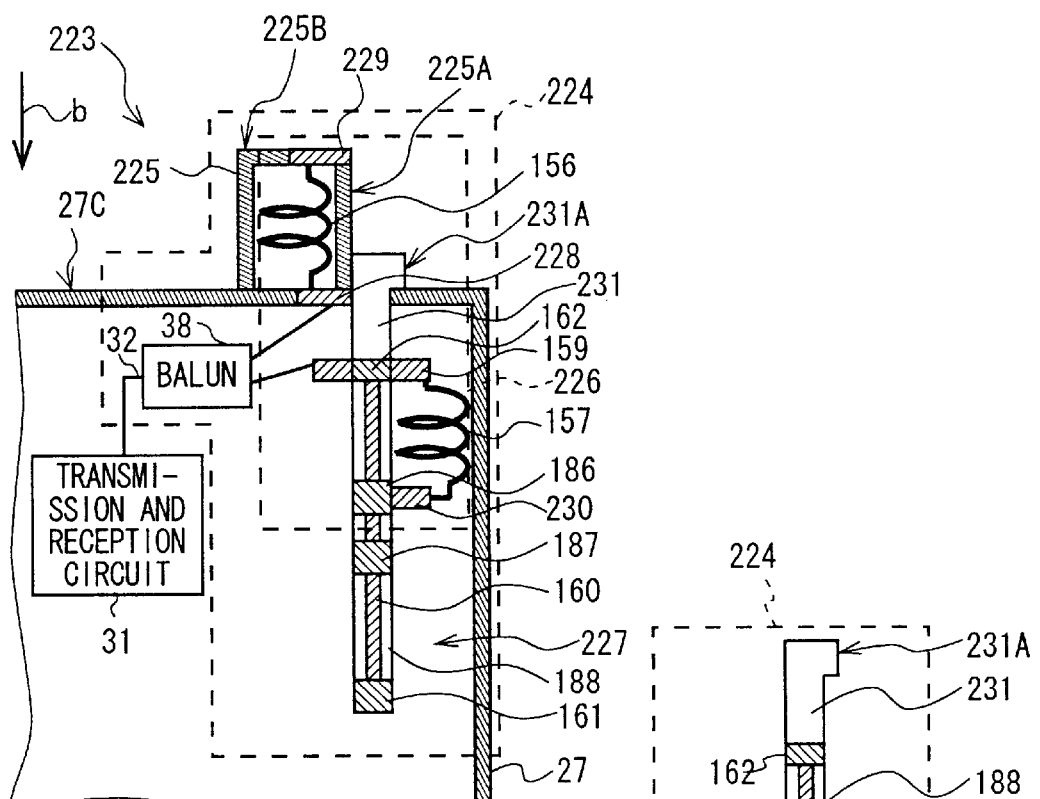
FIGS. 46A and 46B are the block diagrams showing the internal configuration of the cellular telephone according to the seventeenth embodiment.
Figure 46B:
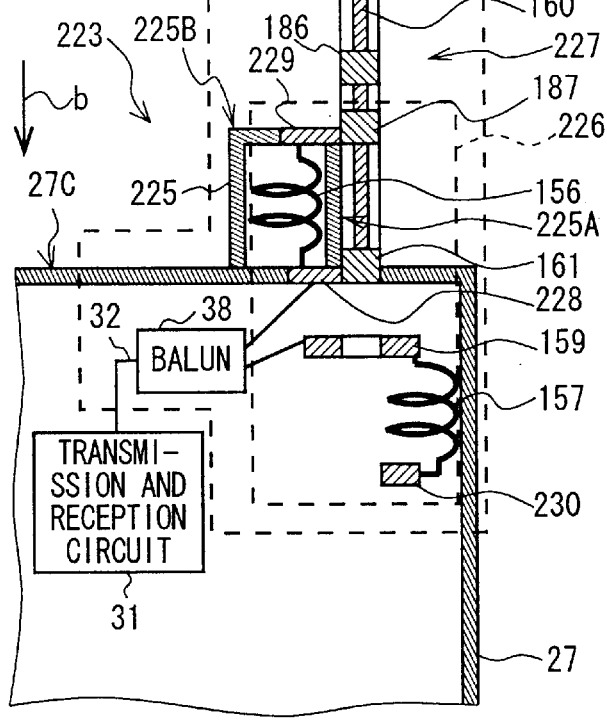

FIGS. 46A and 46B, in which a same numeral is assigned to a part corresponding to the identical part of the FIGS. 40A and 40B, shows the cellular telephone 223 according to the seventeenth embodiment, and is configured similarly to the cellular telephone 179 (FIGS. 26A and B) according to the twelfth embodiment as described above excluding the configuration of the antenna apparatus 224.

In the antenna apparatus 224, which has the first antenna covers 225 installed in the back face 27B of the top end 27C of the housing case 27, the first helical antenna 156 of the first antenna part 226 is located in the inside of the first antenna cover 225 making the central axis thereof almost parallel to the housing length direction.

And, the first feeding member 228 made of the conductive material is electrically and mechanically connected to the bottom end of the first helical antenna 156, and the fifth feeding member 229 made of the conductive material is electrically and mechanically connected to the top end of the first helical antenna 156.

The first and fifth feeding members 228 and 229 are installed in the top end 27C of the housing case 27 and the top end 225B of the first antenna cover 225 to interpose on the top and bottom of a predetermined side face (hereafter, antenna adjacent face) 225A of the first antenna cover 225.

The second helical antenna 157, of which the second central axis has been made parallel to the housing length direction and has been moved from the elongated line of the first central axis, is located in the inside of the housing case 27. And, a sixth feeding member 230 made of the conductive material is electrically and mechanically connected to the bottom end of the second helical antenna 157.

A second antenna part 227 is retractably and pullably installed in the predetermined site of the top end 27C of the housing case 27.

In the second antenna part 227, the antenna pinching part 231 made of the nonconductive material and having the L-shaped section is installed on the top end of the telescopic antenna 160 through the fourth feeding member 162, the antenna pinching part 231 is pushed to the retracting direction or pulled in the pulling direction, and hence, the second antenna part 227 is adapted to push or pull along with the antenna adjacent face 225A of the first antenna cover 225.

The balun 38 installed inside the housing case 27 is electrically connected to the first and the second feeding members 159 and 228 at the balanced side thereof.

Therefore, in the antenna apparatus 224, the head 231A of the antenna pinching part 231 is pushed in the retracting direction to contact the head 231A to the top end 27C of the housing case 27 and then, the fourth feeding member 162 is electrically connected to the second feeding member 159 and the first shorting member 186 is electrically connected to the sixth feeding member 230 to short the top end and the bottom ends of the second helical antenna 157 with the telescopic antenna 160 finally resulting in forming the complex antenna.

In contrast to this, in the antenna apparatus 224, at the time of pulling the second antenna part 227, when the head 231A of the antenna pinching part 231 is pulled in the pulling direction, the second antenna part 227 pulls the antenna adjacent face 225A of the first antenna cover 225 toward the outside of the housing case 27 by sliding it.

And, in the antenna apparatus 224, when almost whole of the second antenna part 227 is pulled out from the top end 27C of the housing case 27, the second shorting member 187 is electrically connected to the fifth feeding member 229 and the third feeding member 161 is electrically connected to the first feeding member 228 and the top end and the bottom end of the first helical antenna 156 are shorted with the telescopic antenna 160 to make the complex antenna.

Consequently, in the cellular telephone 223, because the second antenna part 227 is not passed through the first helical antenna 156 and the second helical antenna 157, the first and fifth and sixth feeding members 228 and 229 and 230 need not to make in the annular shape and, for example, the shape of them can be simplified, for example, as making in the rod-like shape or the like.

And, in the cellular telephone 223, because the second antenna part 227 can be installed unnecessary of a complicated positioning for passing through the first and the second helical antennae 156 and 157 and the feeding member. Therefore, the configuration of the antenna apparatus 224 can be simplified.

For reference, in the cellular telephone 223, in both retracting and pulling the second antenna part 227, the relatively wider frequency band can be always kept by working the telescopic antenna 160 as the antenna.

(19) Other embodiments

Figure 47:
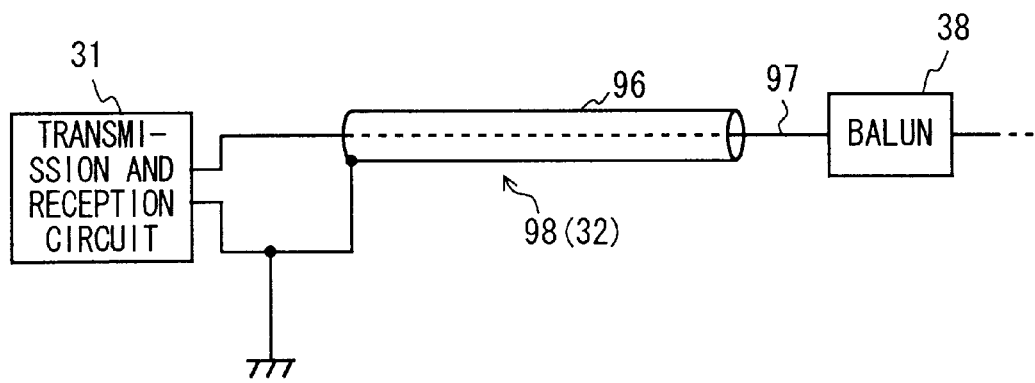
FIG. 47 is the outlined line drawing showing the configuration of the unbalanced transmission line comprising a coaxial cable according to another embodiment.

In the first to seventeenth embodiments as described above, the case, where the microstrip line 34 is applied as the unbalanced transmission line 32 shown in the FIG. 10, has been described. However, the present invention is not restricted to this. Other various unbalanced transmission lines can be applied, for example, a coaxial cable 98 or the like made by insulating a cylindrical external conductor 96 (i. e., a grounded side) shown in FIG. 47 and a linear central conductor 97 passed through the external conductor 96 (i. e., a hot side) each other.

Figure 48A:
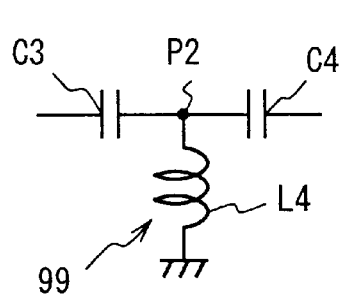
FIGS. 48A to 48C are the block diagrams showing the configuration of the phase circuit according to another embodiment.
Figure 48B:
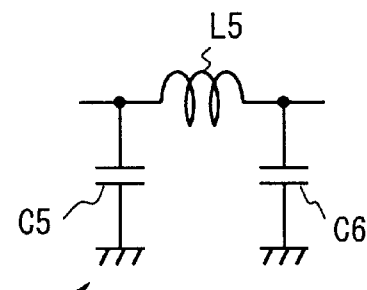
Figure 48C:
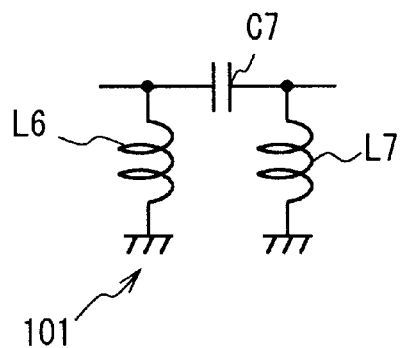

The first to seventeenth embodiments as described above describes a case adapted to use a phaser 41 configured by combining the balun 38 shown in FIG. 13 with a plurality of the phase circuit 42 shown in FIG. 14. However, the present invention is not restricted to this. If the phase of the high frequency signal can be moved about 180° in the frequency band in service, the phaser comprising other various configurations can be used, if the phasers, as shown in FIGS. 48A to 48C, can be exemplified by that configured by combination of a plurality of the T-shaped phase circuit 99 with a symmetric structure made by that two capacitive reactance elements C3 and C4 are serially connected, a center point P2 of the connection is connected to the one end of the inductive reactance element L4 with continuity , and the other end of the inductive reactance element L4 is grounded, that configured by combination of a plurality of the π-shaped phase circuit 100 with the symmetric structure made by that the one and the other ends of the inductive reactance element L5 are connected to respective one ends of capacitive reactance elements C5 and C6 with continuity and the other ends of the capacitive reactance elements C5 and C6 are grounded, and that configured by combination of a plurality of the π-shaped phase circuit 101 with the symmetric structure made by that the one and the other end of a capacitive reactance element C7 is connected to respective one ends of inductive reactance elements L6 and L7 with continuity, and the other ends of the inductive reactance elements L6 and L7 are grounded.

Furthermore, in the first to seventeenth embodiments, a case using the balun 38 shown in the FIG. 13 was described. However, the present invention is not restricted to this. The balun comprising other various configurations can be used, if flow of the leaked current from the approximately balanced type antenna to the grounded side of the unbalanced transmission line 32 can be prevented.

Figure 49:
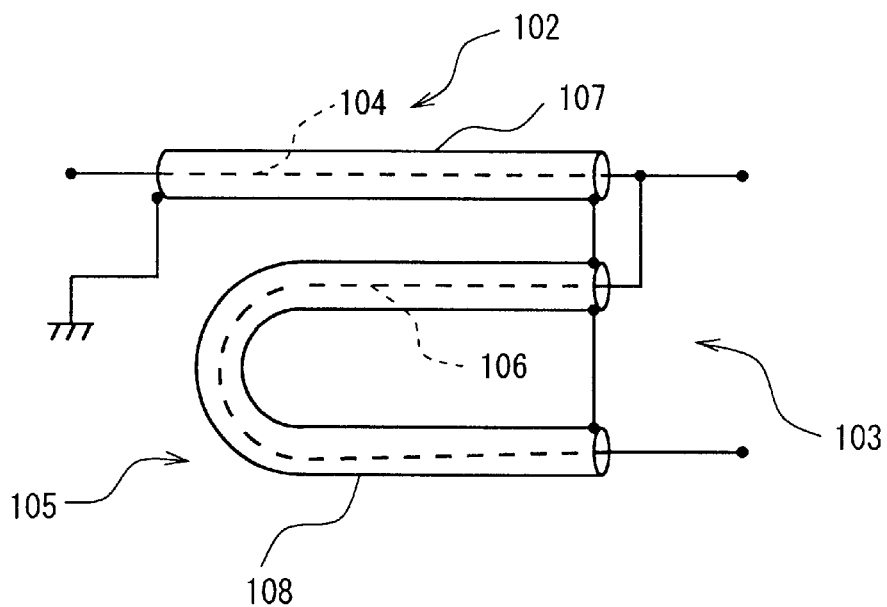
FIG. 49 is the outlined line drawing of showing the configuration of the balun according to another embodiment.

Practically, as the balun of this kind, FIG. 49 is the balun 103 of other configuration using the unbalanced transmission line 102 comprising the coaxial cable, and it is configured by that the one end of the hot side 104 of the unbalanced transmission line 102 is electrically connected to the one end of the hot side 106 of the coaxial cable (hereafter, detour line) 105 having the electric length of ½ wavelength in the frequency in service, and the one end of the grounded side 107 of the unbalanced transmission line 102 is electrically connected to the one end of the grounded side 108 of the detour line 105. The balun 103 of such configuration is that using the detour line 105 having the electric length of ½ wavelength by replacing to the phaser 41 of the balun 38 shown in the FIG. 13.

In the balun 103 of such configuration, the one end of the hot side 104 of the unbalanced transmission line 102 is electrically connected to the first antenna element of the approximately balanced type antenna and the other end of the hot side 106 of the detour line 105 is electrically connected to the second antenna element of the approximately balanced type antenna, the high frequency signal to be sent to the first antenna element through the hot side 104 of the unbalanced transmission line 102 is also sent to the second antenna element by moving the phase about 180° for the first antenna element through the hot side 106 of the detour line 105, and thus, flow of the leaked current from the second antenna element to the grounded side 108 of the unbalanced transmission line 102 is prevented.

Figure 50:
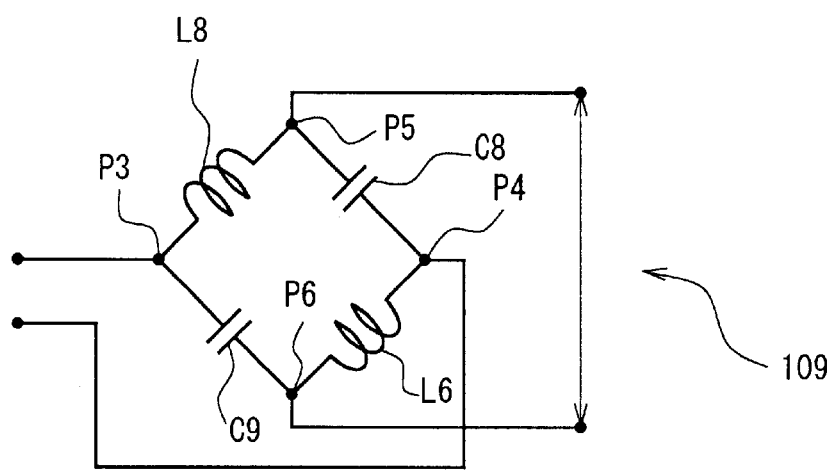
FIG. 50 is the outlined line drawing of showing the configuration of the balun according to another embodiment.

As the balun of this kind, as shown in FIG. 50, there is a so-called the LC-bridge balun configured by a serial, alternating, annular connection of the first and the second inductive reactance elements L8 and L9 to the first and the second capacitive reactance elements C8 and C9, the electric connection of the hot side of the unbalanced transmission line, not illustrated, to the center point P3 between the first inductive reactance elements L8 and the second capacitive reactance elements C9, and the electric connection of the grounded side of the unbalanced transmission line to the center point P4 between the first capacitive reactance elements C8 and the second inductive reactance elements L9, and the electric connection of the center point P5 between the first inductive reactance elements Lb the first capacitive reactance elements C8 to the first antenna element of the approximately balanced type antenna not illustrated, and the electric connection of the center point P6 between the second inductive reactance elements L8 and the second capacitive reactance elements C8 to the second antenna element of the approximately balanced type antenna.

In the balun 109 of such configuration, the values of inductance L of the first and the second inductive reactance elements L8 and L9 are respectively equalized and the values of capacitance C of the first and the second capacitive reactance elements C7 and C8 are also respectively equalized. By selecting inductance L and capacitance C to satisfy the following equation, $$(2\pi f)^2 LC = 1 \quad (1)$$

and the following equation $$L/C = Z1Z2 \quad (2)$$

The high frequency signal given from the hot side of the unbalanced transmission line, as it is, is sent from the connecting center point P5 to the first antenna element, and the phase of the high frequency is moved about 180° for the first antenna element in the frequency band in service, the high frequency signal generated by moving the phase is sent from the connecting center point P6 to the second antenna element. Z1 represents impedance across the hot side and the grounded side of the unbalanced transmission line, and Z2 represents impedance across the connecting center points P5 and P6. In addition, f represents the frequency in service.

And, the balun 109 of such configuration, as same as the phaser 41 of the balun 38 shown in the FIG. 13 as described above, can be prepared as the very small, chip-shaped, 1 mm square, and therefore, for example, as the inside of the second helical antenna cover 73 (FIGS. 25A and 25B) of the fourth embodiment as described above, can be easily installed even if there is a limitation in a space for arrangement.

Figure 51A:
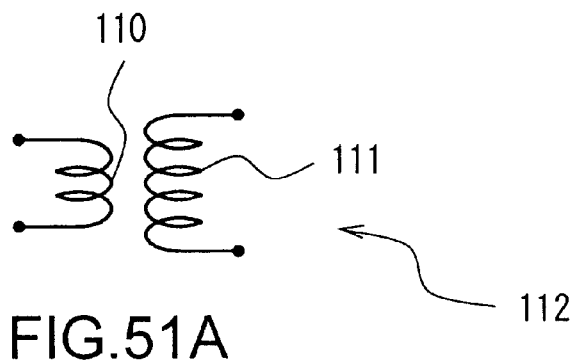
FIGS. 51A and 51B are the outlined line drawings of showing the configuration of the balun according to another embodiment.
Figure 51B:
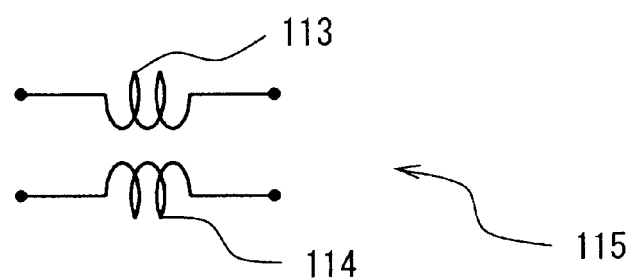

Besides, as the balun of this kind, as shown in FIGS. 51A and 51B, there are a transfer type balun 112, in which an air-core coil 110 formed across the hot side and the grounded side of the unbalanced transmission line, not illustrated, is oppositely arranged to the air-core coil 111 formed across the first and the second antenna elements of the approximately balanced type antenna and the transfer type balun 115, in which the air-core coil 113 formed across the hot side of the unbalanced transmission line and the first antenna elements of the approximately balanced type antenna is oppositely arranged to the air-core coil 114 formed across the grounded side of the unbalanced transmission line and the second antenna elements of the approximately balanced type antenna.

Figure 52:
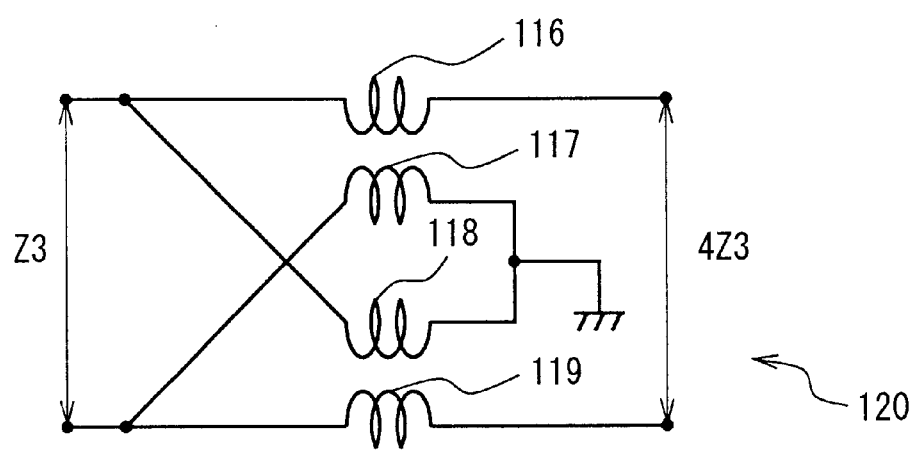
FIG. 52 is the outlined line drawing of showing the configuration of the balun according to another embodiment.

In addition to this, as the balun of this kind, as shown in FIG. 52, there is a transfer type balun 120, in which the air-core coil 116 formed across the hot side of the unbalanced transmission line, not illustrated, and the first antenna elements of the approximately balanced type antenna is oppositely arranged to the air-core coil 117 formed across the grounded side of the unbalanced transmission line and a ground, and the air-core coil 118 formed across the grounded side and the second antenna element of the approximately balanced type antenna is oppositely arranged to the air-core coil 119 formed across the hot side and the ground.

For reference, in the transfer type balun 120 of such configuration, in comparison with impedance Z3 across the hot side and the grounded side of the unbalanced transmission line, impedance across the connecting terminals of the first and the second antenna elements becomes a magnitude of about four times (4Z3.)

Figure 53:
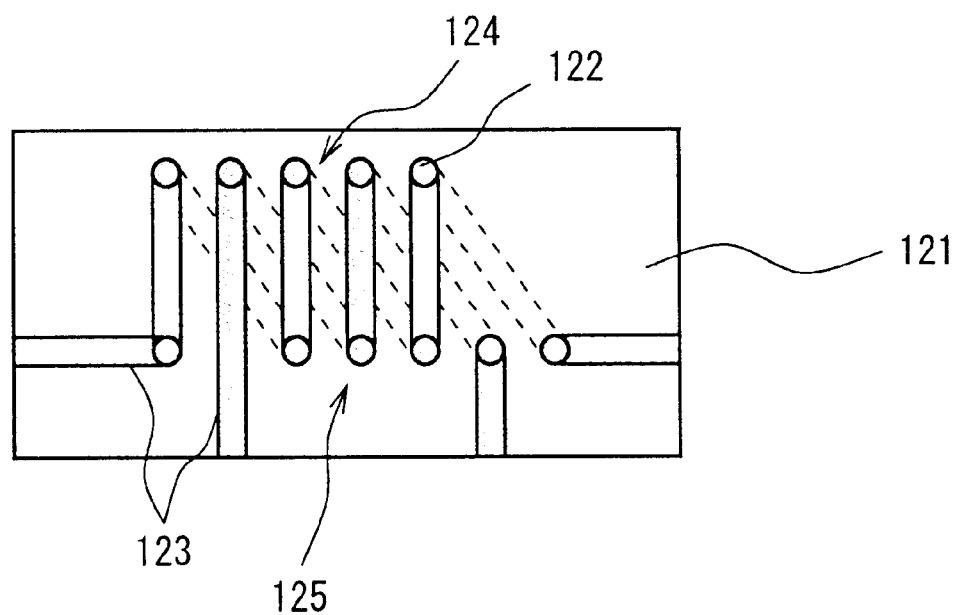
FIG. 53 is a top view showing a coil used for a transfer type balun.

Besides, in the transfer type baluns 112, 115, and 120 shown in FIGS. 51A and 51B and FIG. 52, in replacement to the air-core coils 110, 111, 113, 114, 116, 117, 118, and 119, as shown in FIG. 53, a pair of coils 124 and 125 comprising a through hole 122 and a conductor pattern 123 made on a multilayer wiring substrate 121 can be used.

And, the transfer type baluns 112, 115, and 120 can be made with the very small, chip-shaped, about 1 to 3 mm square as a whole, when a coil prepared by integration of the conductor pattern is used as described above, and therefore, it can be easily installed even if there is a limitation in a space for arrangement, as same as the LC-bridge balun 109 (FIG. 50) as described above.

Figure 54A:
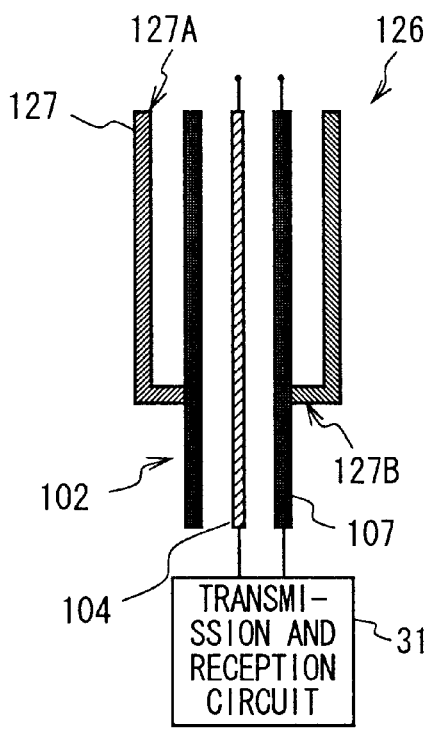
FIGS. 54A and 54B are the outlined line drawings of a sectional view and the outlined line drawing showing the configuration of the Sperrtopf balun using the coaxial cable, according to another embodiment.
Figure 54B:
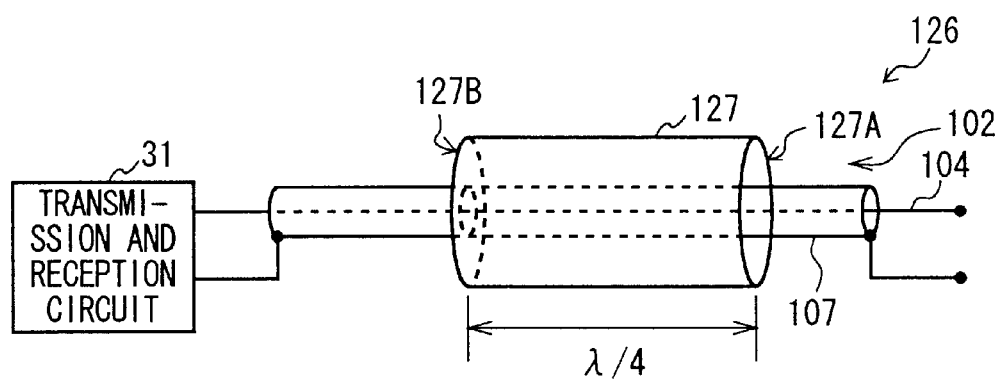

As the balun of this kind, FIGS. 54A and 54B are balun 126 of other configuration using the unbalanced transmission line 102 comprising the coaxial cable and is called a Sperrtopf balun or a Bazooka balun, in which the unbalanced transmission line 102 is passed through a cylindrical conductor 127, the one end 127A of the cylindrical conductor 127 is opened, and the other end 127B is shorted with the grounded side 107 of the unbalanced transmission line 102.

In the balun 126 of such configuration, in the opened side (balanced side) of the cylindrical conductor 127, the hot side 104 of the unbalanced transmission line 102 is electrically connected to the first antenna elements of the approximately balanced type antenna and the grounded side 107 of the unbalanced transmission line 102 is electrically connected to the second antenna elements of the approximately balanced type antenna, and in the shorted side (unbalanced side) of the cylindrical conductor 127, the hot side 104 and the grounded side 107 of the unbalanced transmission line 102 are electrically connected to the transmission and reception circuit 31.

And, in the balun 126, the electric length of the cylindrical conductor 127 is selected to ¼ wavelength of the frequency in service and thus, in viewing unbalanced side from balanced side, the whole can be regarded as the transmission line with the electric length of the ¼ wavelength on the basis of that the unbalanced transmission line 102 becomes an internal conductor and the cylindrical conductor 127 becomes an external conductor to short the one. Therefore, impedance becomes infinite to the leaked current and thus, flow of the leaked current in the grounded side 107 of the unbalanced transmission line 102 can be prevented.

Figure 55:
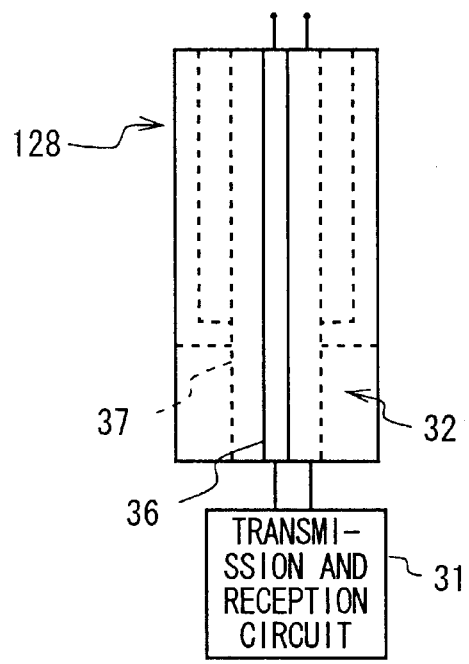
FIG. 55 is the outlined line drawing of showing the configuration of the Sperrtopf balun using the microstrip line, according to another embodiment.

For reference, FIG. 55 is that showing the Sperrtopf balun 128 using the unbalanced transmission line 32 comprising microstrip line, and by forming a linear shape with the hot side 36 regarded as the central conductor of the coaxial cable and forming a sectional shape of the cylindrical conductor with the grounded side 37 regarded as the external conductor of the coaxial cable, becomes equivalent to the Sperrtopf balun 126 shown in FIGS. 54A and 54B to work similarly.

Figure 56:
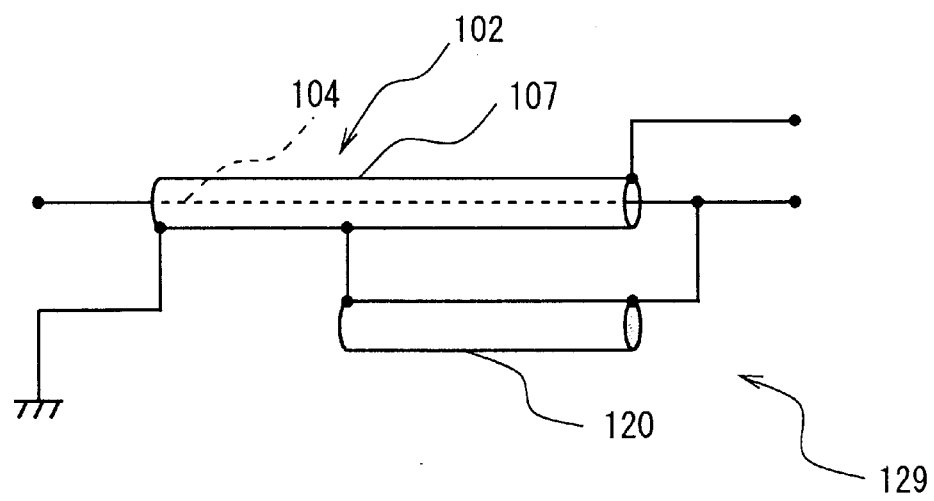
FIG. 56 is the outlined line drawing of showing the configuration of the balun according to another embodiment.

As the balun of this kind, FIGS. 56A and 56B are the balun 129 of other configuration using the unbalanced transmission line 102 comprising the coaxial cable and are configured by locating the unbalanced transmission line 102 and a conductor 130 (hereafter, a branched conductor) having the electric length of ¼ wavelength in the frequency in service by abutting the other ends each other, electrically connecting the one end of the branched conductor 130 to the one end of the hot side 104 of the unbalanced transmission line 102, and electrically connecting the other end of the branched conductor 130 to the opposite site of the grounded side 107 of the unbalanced transmission line 102.

The balun 129 of such configuration becomes the equivalent circuit to the baluns 126 and 128 shown in FIGS. 54A and 54B and FIG. 55 as described above by electric connection of the other end of the hot side 104 of the unbalanced transmission line 102 to the first antenna element and electric connection of the other end of the grounded side 107 of the unbalanced transmission line 102 to the second antenna element and thus, similar to these baluns 126 and 128, impedance of the other end of the grounded side 107 of the unbalanced transmission line 102 becomes infinite to prevent the leaked current.

In addition, the first to eighth embodiments as described above describe cases adapted to use the approximately balanced type antenna. However, the present invention is not restricted to this. Balanced type antennae showing structurally and electrically perfect symmetry and intermediate driven mode antennae showing structurally and electrically perfect asymmetry can be used. For reference, in the case where the intermediate driven mode antenna is used, the voltage modes differ between the first and second antenna elements and therefore, if baluns 126, 128, and 129 shown in FIG. 54A to FIG. 56 as described above are adapted to use, the flow of the leaked current from the first and second antenna elements to the grounded side of the unbalanced transmission line can be prevented.

Figure 57A:
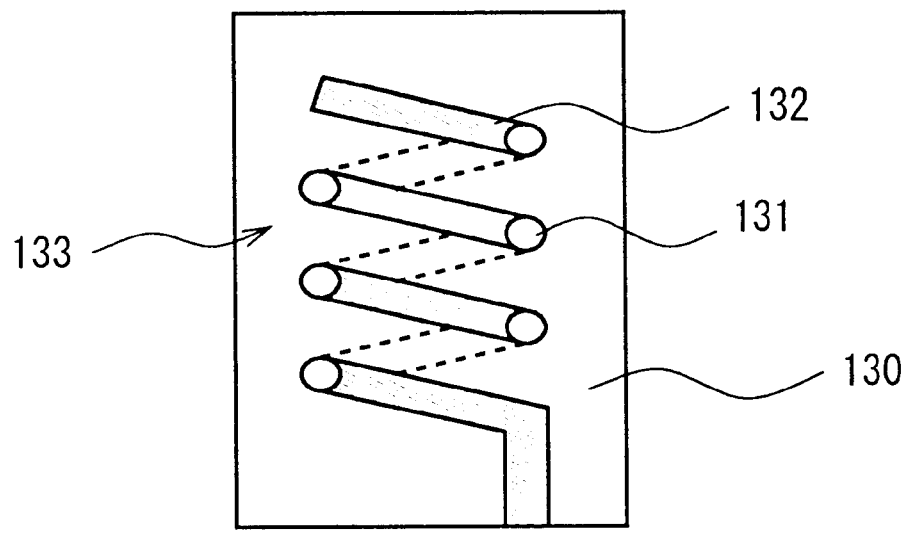
FIGS. 57A and 57B are the outlined line drawings of top view showing the configuration of the antenna element replacing to the first and the second helical antennae, according to another embodiment.
Figure 57B:
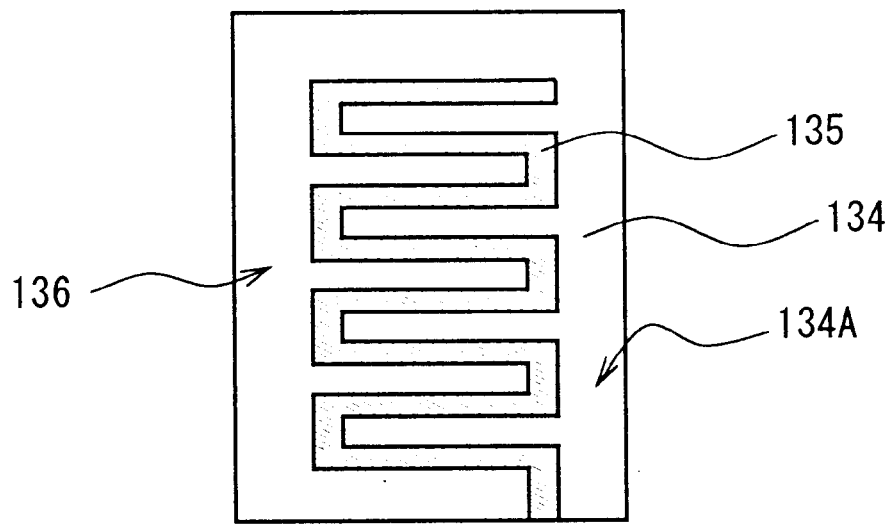

Further, the first to eighth embodiments as described above describe cases adapted to use the first and the second helical antennae 56 and/or 62 prepared by winding helically the conductive line material. However, the present invention is not restricted to this. As shown in FIGS. 57A and 57B, other various antenna elements can be adapted to use, exemplified by the helical antenna 133 comprising the through hole 131 and the conductor pattern 132 on the multilayer wiring substrate 130 and the antenna element 136 made by forming a meander-like conductor pattern 135 on the one face 134A of the circuit substrate 134, or the like.

Figure 58A:
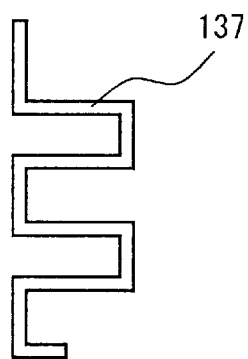
FIGS. 58A and 58B are the outlined line drawings of top view showing the configuration of the thin antenna element, according to another embodiment.
Figure 58B:
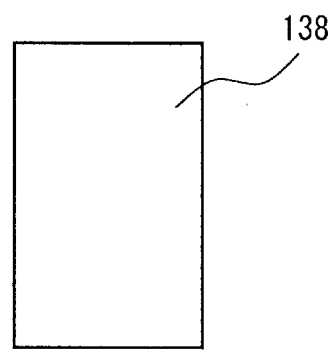

And, as shown in FIGS. 27, the thin, linear antenna 76 can be used in replacement to the second helical antenna 62, or, as shown in FIGS. 58A and 58B, in replacement to the second helical antenna 62 and the thin, linear antenna 76, the antenna element 137 formed like a meander with the thin conductive plate and the antenna element, made of a thin, plate-like material, such as the antenna element 138 formed in the squared shape with the thin conductive plate can be used. If such antenna element is used, upsizing of the housing case 27 can be prevented.

The fifth and sixth embodiments as described above describe cases adapted to install the thin, linear antenna 76 inside the housing case 27. However, the present invention is not restricted to this and can be adapted to install outside the housing case 27.

Figure 59:
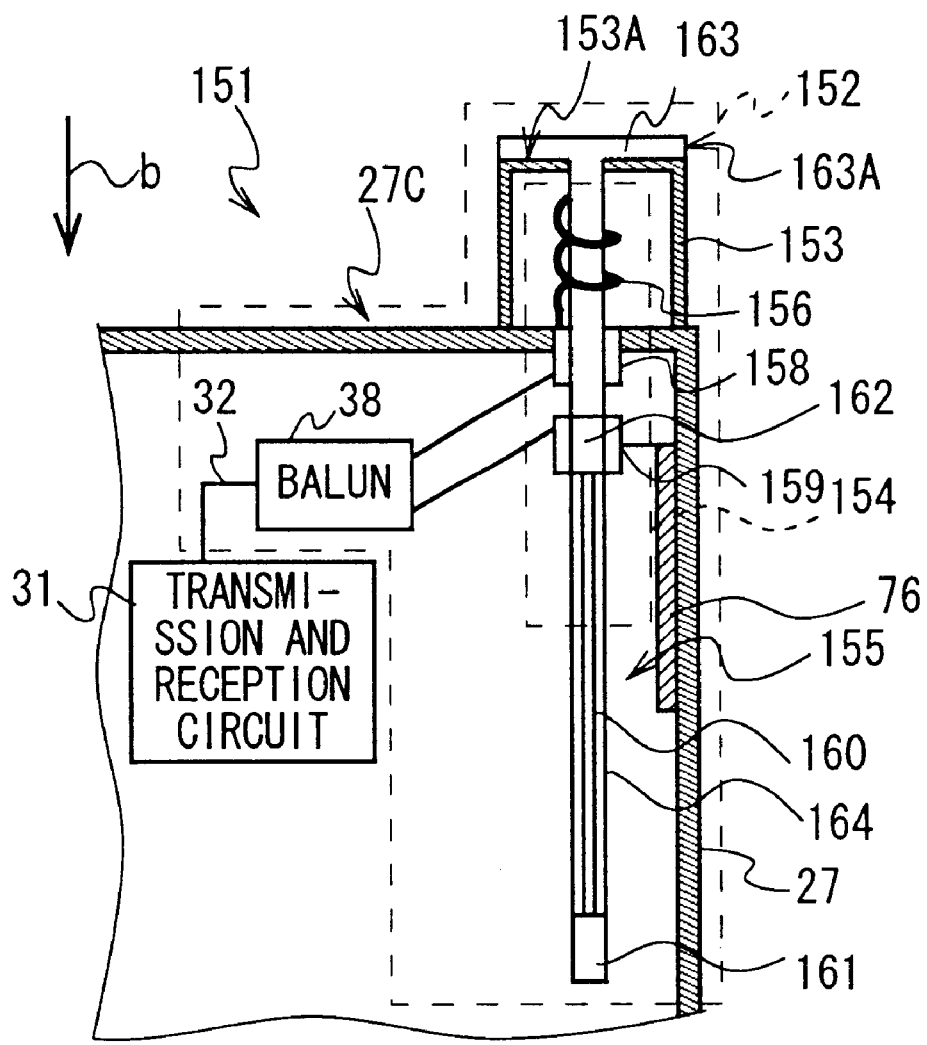
FIG. 59 is the block diagram showing the internal configuration of the cellular telephone using the thin, linear antenna, according to another embodiment.

In the case where the thin linear antenna 76 is practically used for the cellular telephone, other than explained in FIGS. 26 and 28, for example as FIG. 59 in which a same numeral is assigned to a part corresponding to the identical part of the FIGS. 34A and 34B, it is realized by that the thin linear antenna 76 is adhered to an inner wall of the housing case 27 and the one end of the thin linear antenna 76 is electrically connected to the second feeding member 159.

Figure 60:
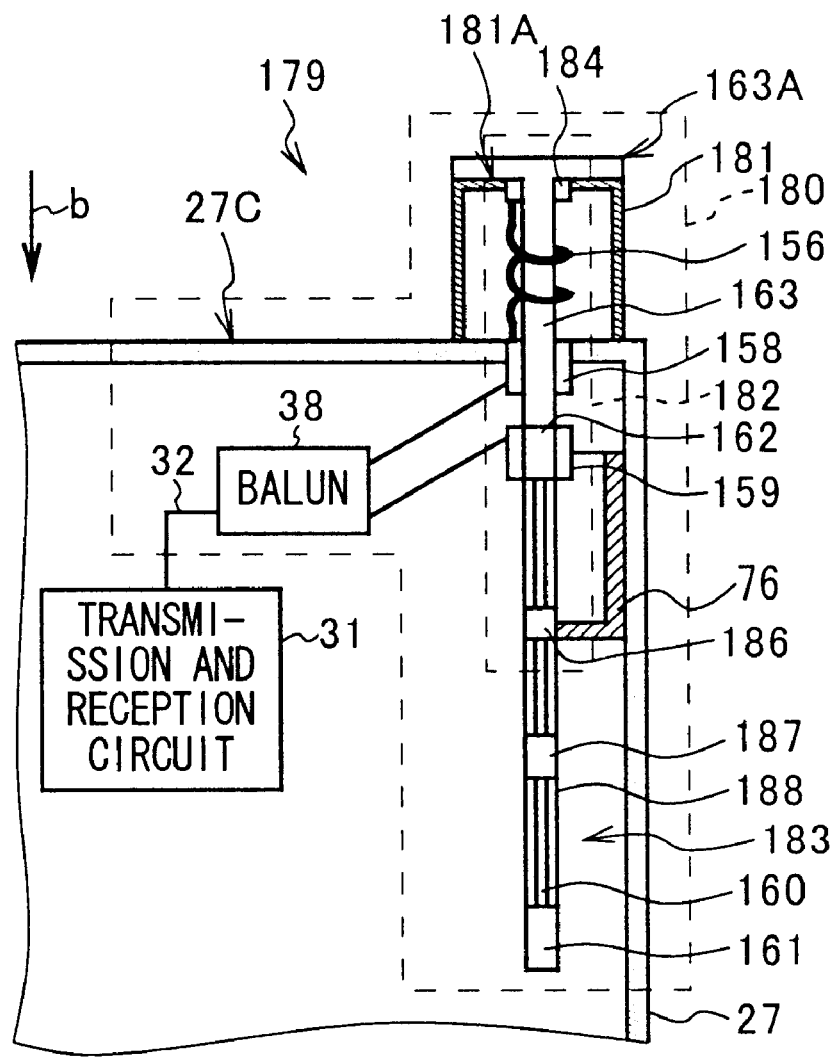
FIG. 60 is the block diagram showing the internal configuration of the cellular telephone using the thin, linear antenna, according to another embodiment.

As FIG. 60 in which a same numeral is assigned to a part corresponding to the identical part of the FIGS. 40, it is realized by that the thin linear antenna 76 is adhered to an inner wall of the housing case 27 and the one end of the thin linear antenna 76 is electrically connected to the second feeding member 159, and the other end is bent to connect electrically to the second shorting member 187 in pushing the second antenna part 183.

Figure 61:
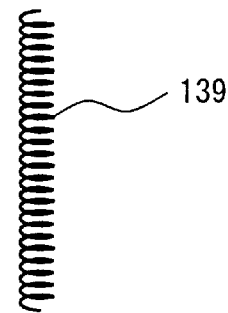
FIG. 61 is the outlined line drawing of showing the configuration of the antenna element replacing to the telescopic antenna.

Besides, in the first to the seventh embodiments, the ninth and tenth embodiments, the twelfth to the fifteenth embodiments, and the seventeenth embodiments as described above, the cases, where the telescopic antenna 55, 160 and 202 made from the conductive rod-like line material are adapted to use, have been described. However, the present invention is not restricted to this. As shown in FIG. 61, a densely wound coil 139, which is prepared by winding densely the conductive line material spirally to make the cylindrical conductor electrically, can be used as the antenna element. If this densely wound coil 139 is used as the antenna element, break of the first antenna parts 53, 67, and 82, or of the second antenna parts 155, 183, 197 and 227 can be prevented in pulling them to bent.

For reference, this densely wound coil 139 can be used as the first antenna halves 88 of the first antenna parts 86 in the eighth embodiment or as the first antenna halves 172 and 217 of the second antenna parts 171 and 216 in the eleventh and the sixteenth embodiments as described above and if used as the first antenna halves 172 and 217, as same as that described above, break of the second antenna parts 171 and 216 can be prevented in pulling them to bent.

Further, the first to sixth embodiments as described above describe cases adapted to use the first antenna parts 53 and 67 in which the telescopic antenna 55 is installed. However, the present invention is not restricted to this. Antenna parts 140 and 141, in which the telescopic antenna shown in FIGS. 62A and 62B, in which a same numeral is assigned to a part corresponding to the identical part of the FIGS. 31A and 31B and also FIGS. 63A and 63B, in which a same numeral is assigned to a part corresponding to the identical part of the FIGS. 31A and 31B, shows the cellular telephone 78 according to the sixth embodiment, can be adapted to use. Thus, when these antenna parts 140 and 141 are pushed inside the housing case 27, the part, in which these antenna parts 140 and 141 are pushed in, can be greatly shortened to reduce the part, which is covered by the user's hand.

Figure 62A:
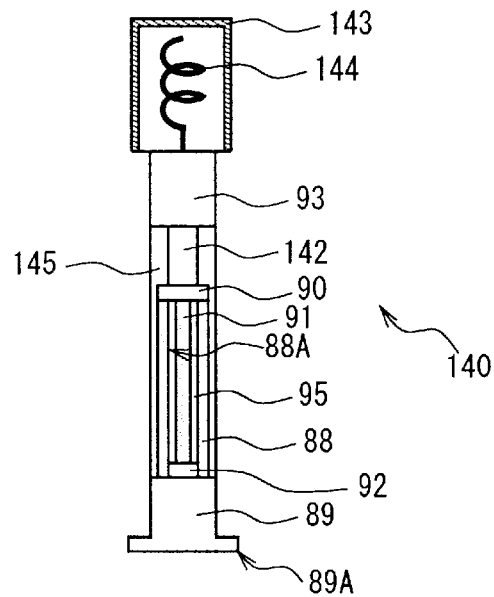
FIGS. 62A and 62B are the outlined line drawings of a sectional view showing the configuration of the antenna part, in which the telescopic antenna has been installed, according to another embodiment.
Figure 62B:
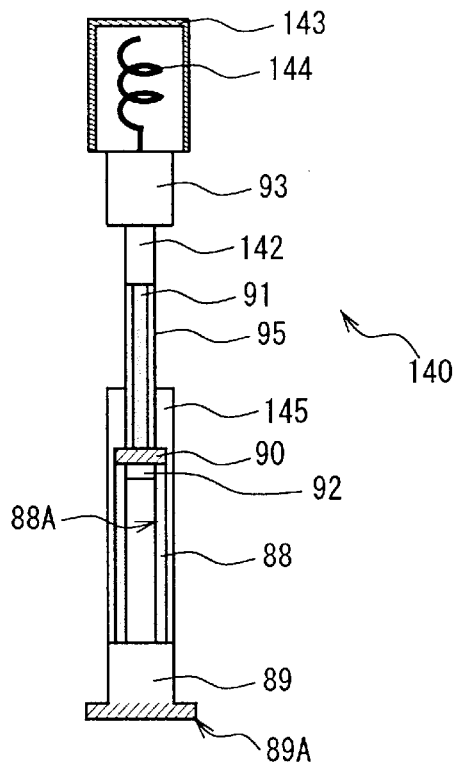

Practically, in FIGS. 62A and 62B, in the antenna part 140, the second feeding member 93 is installed in the top end of a second antenna half 91 through the connecting part 142 made of the nonconductive material, and the second feeding member 93 is electrically and mechanically connected to the bottom end of the helical antenna 144 housed in the cap-like helical antenna cover 143.

In the antenna part 140, in the situation in which the second antenna half 91 is pushed into a hole part 88A of the first antenna half 88, the first antenna half 88 and the connecting part 142 are covered with a telescopic antenna cover 145. Thus, in the antenna part 140 according to such configuration, the telescopic antenna is formed by the first and the second antenna halves 88 and 91.

Figure 63A:
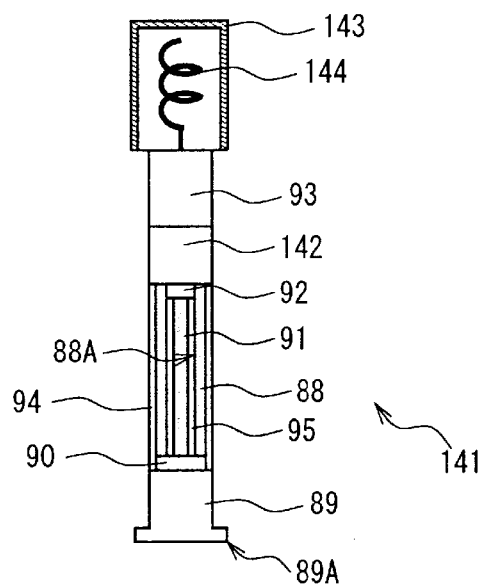
FIGS. 63A and 63B are the outlined line drawings of a sectional view showing the configuration of the antenna part, in which the telescopic antenna has been installed, according to another embodiment.
Figure 63B:
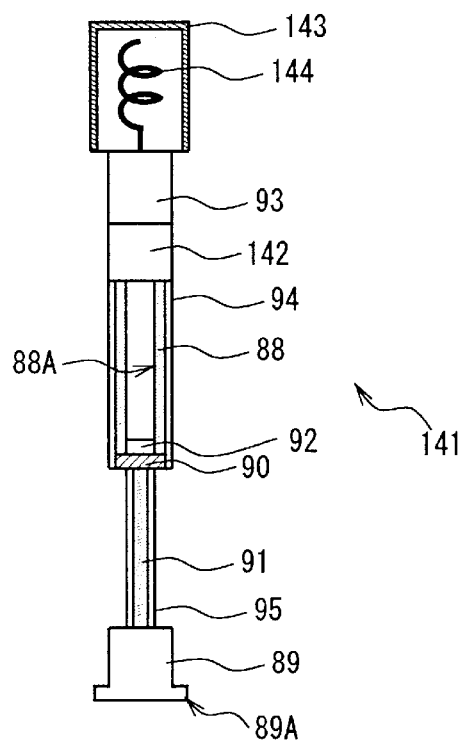

In the FIGS. 63A and 63B, in the antenna part 141, the bottom end of the second antenna half 91 is electrically and mechanically connected to the first feeding member 89, and the top end of the first antenna half 88 has the second feeding member 93 through the connecting part 142 made of the nonconductive material.

And, in the antenna part 141 of such configuration, similar to the antenna part 140 (FIGS. 62A and 62B) as described above, the telescopic antenna is formed by the first and the second antenna halves 88 and 91.

Further, the eighth embodiment as described above describes cases adapted to install the first antenna part 86 shown in FIGS. 31A and 31B. However, the present invention is not restricted to this. It can be adapted to install that the antenna part having only the helical antenna in spiral form and the antenna part 146 forming the telescopic antenna shown in FIGS. 64A and 64B, in which a same numeral is assigned to a part corresponding to the identical part of the FIGS. 31A and 31B. Also in this case, the effect same as that of the eighth embodiment as described above can be easily yielded.

Figure 64A:
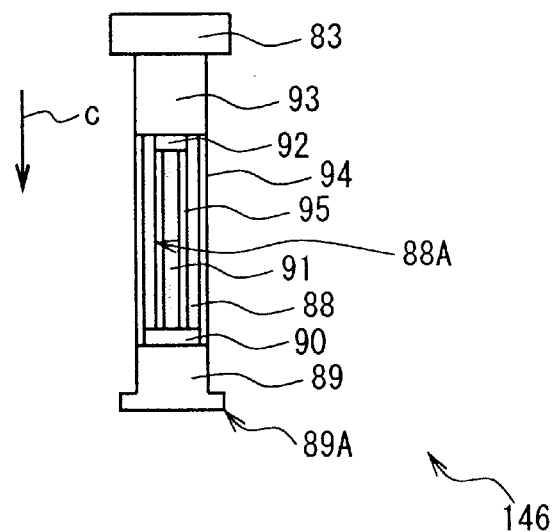
FIGS. 64A and 64B are the outlined line drawings of a sectional view showing the configuration of the antenna part, in which the telescopic antenna has been installed, according to another embodiment.
Figure 64B:
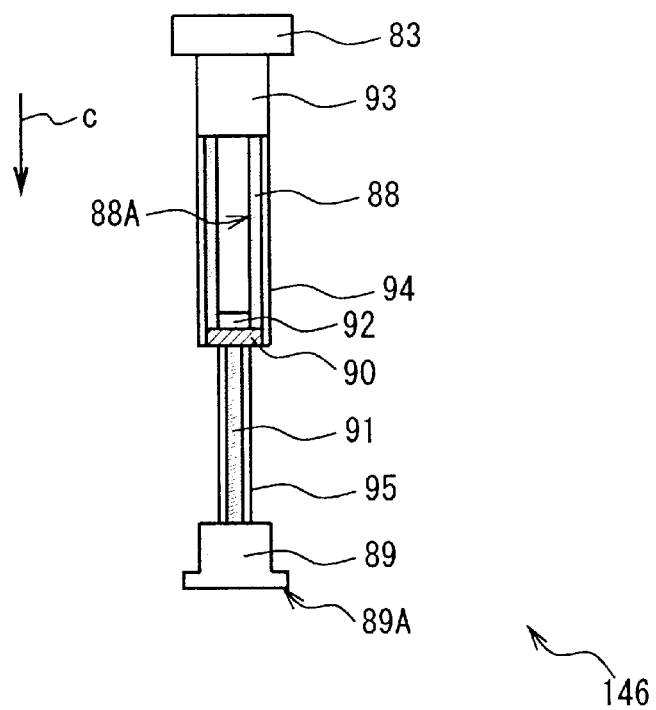

For reference, in FIGS. 64A and 64B, in the antenna part 146, the bottom end of the second antenna half 91 is electrically and mechanically connected to the first feeding member 89, and the top end of the first antenna half 88 has the antenna pinching part 83 through the second feeding member 93. And, in the antenna part 146 of such configuration, similar to the first antenna part 86 (FIGS. 31A and 31B) as described above, the telescopic antenna is formed by the first and the second antenna halves 88 and 91.

Furthermore, the eleventh and sixteenth embodiments as described above, the case, where the second antenna parts 171 and 216, in which the telescopic antenna shown in the FIGS. 39A and 39B and FIGS. 45A and 45B is installed, are adapted to use, has been described. However, the present invention is not restricted to this. It can be adapted to use the second antenna part 181, in which the telescopic antenna, which is configured as FIG. 65 in which a same numeral is assigned to a part corresponding to the identical part of the FIGS. 39A and 39B, is installed, and the second antenna part 182, in which the telescopic antenna, which is configured as FIGS. 66A and 66B in which a same numeral is assigned to a part corresponding to the identical part of the FIGS. 45A and 45B, is installed.

Figures 65A, 65B:
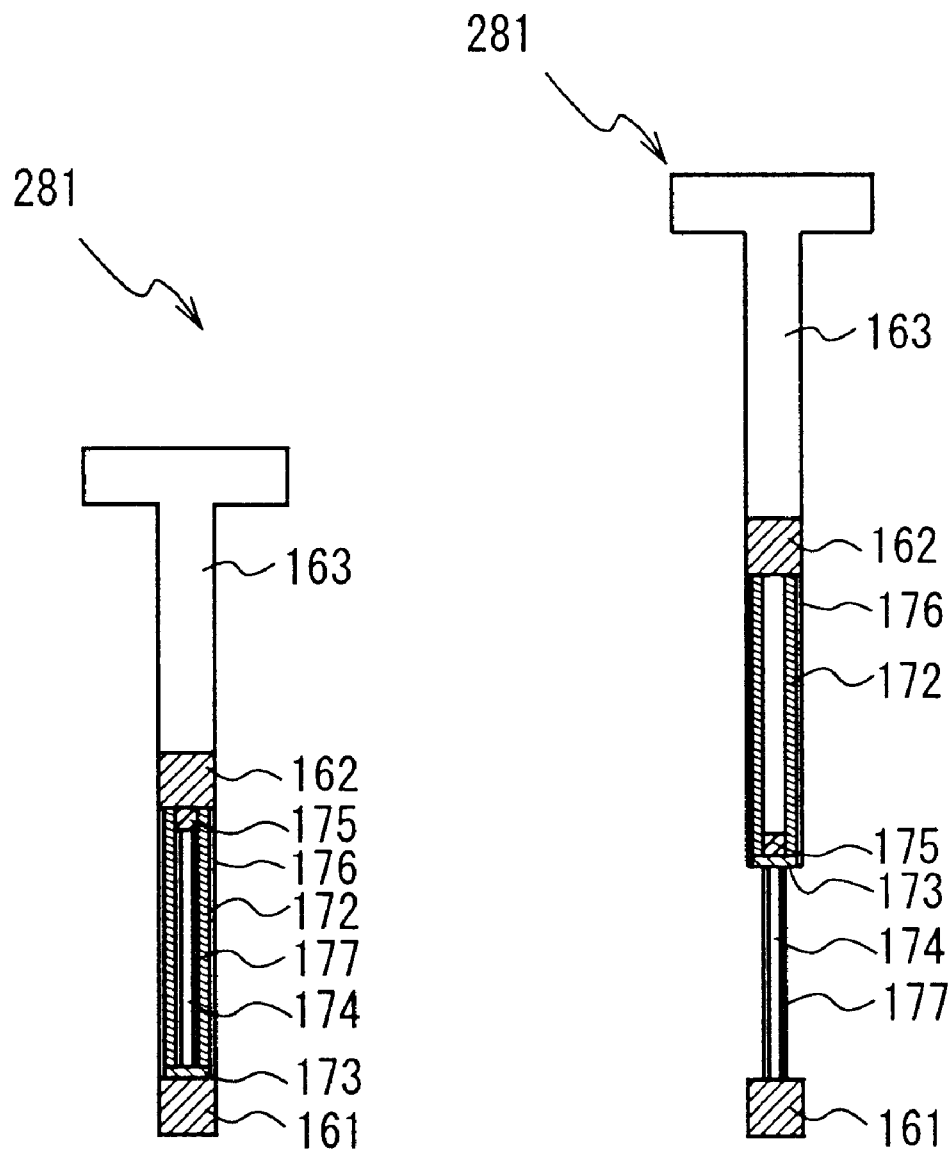
FIGS. 65A and 65B are the outlined line drawings of a sectional view showing the configuration of the antenna part, in which the telescopic antenna has been installed, according to another embodiment.

Practically, in the second antenna part 281 shown in FIGS. 65A and 65B, the bottom end of the second antenna half 174 is electrically and mechanically connected to the third feeding member 161 and the top end is passed through the hole part of the first antenna half 172 and electrically and mechanically connected to the sliding spring 175. And, the bottom end of the first antenna half 172 has the stopper 173 for pulling and the top end is electrically and mechanically connected to the fourth feeding member 162. According to this, in the second antenna part 281, the telescopic antenna can be made from the first and the second antenna halves 172 and 174 similar to the second antenna parts 171 described above.

Figures 66A, 66B:
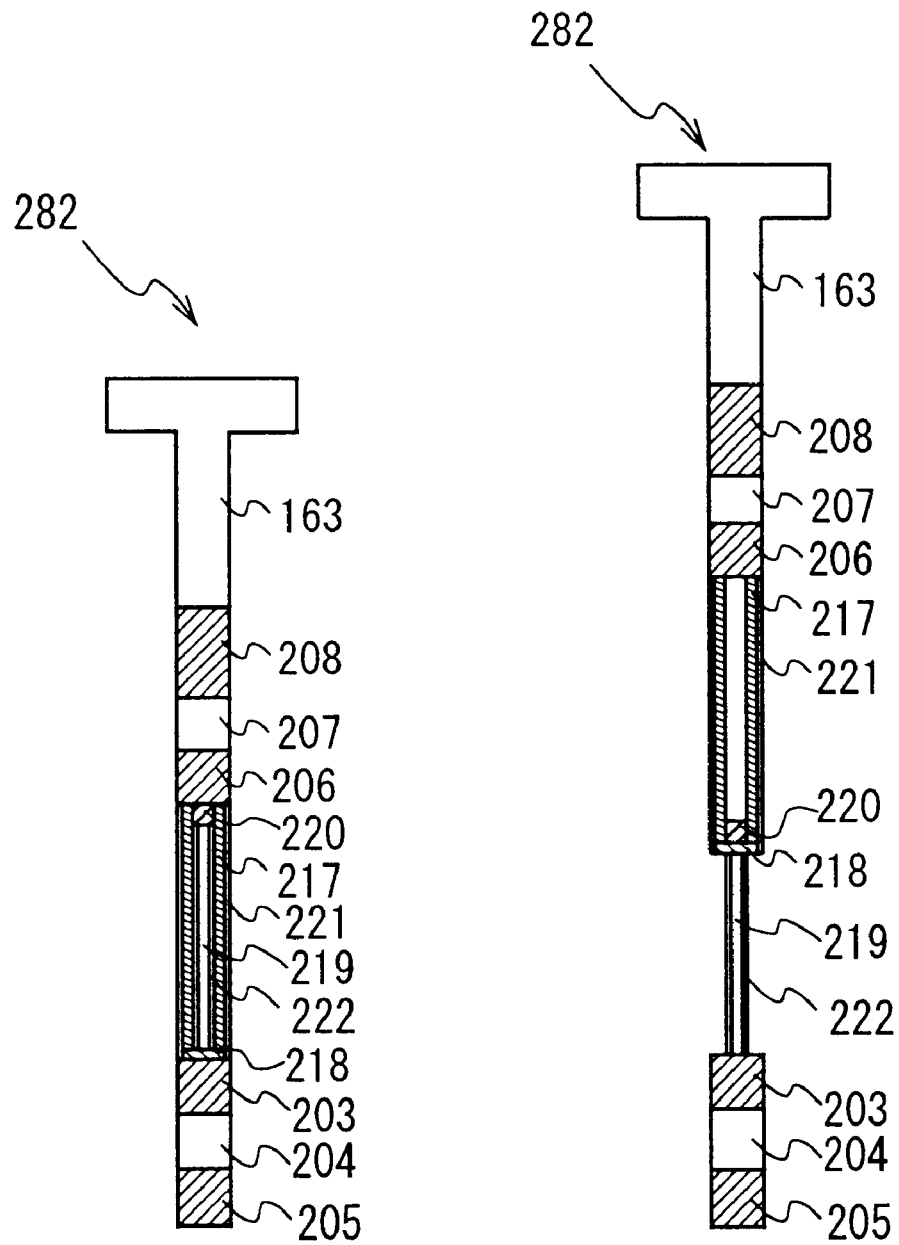
FIGS. 66A and 66B are the outlined line drawings of a sectional view showing the configuration of the antenna part, in which the telescopic antenna has been installed, according to another embodiment.

In the second antenna part 282 shown in FIGS. 66A and 66B, the bottom end of the second antenna half 219 is electrically and mechanically connected to the first feeding terminal 203 and the top end is passed through the hole part of the first antenna half 217 and electrically and mechanically connected to the sliding spring 175. And, the bottom end of the first antenna half 217 has the stopper 218 for pulling and the top end is electrically and mechanically connected to the second feeding terminal 206. According to this, in the second antenna part 282, the telescopic antenna can be made from the first and the second antenna halves 217 and 219 similar to the second antenna parts 216 described above.

Further, the first to eighth embodiments as described above describe cases adapted to install retractably and pullably the first antenna parts 53, 67, 82, and 86 in the top end 27C of the housing case 27 along with the retracting direction almost parallel to the housing length direction and reversal pulling direction. However, the present invention is not restricted to this. As FIGS. 67A to 67C, in which a same numeral is assigned to a part corresponding to the identical parts of the FIG. 20 and FIG. 24, the first antenna parts 53, 67, 82, and 86 are adapted to install retractably and pullably along with the direction sloping from the back face 27B of the top end 27C of the housing case 27 to the housing length direction of the front face 27A of the bottom end 27E.

According to this, when the first antenna parts 53, 67, 82, and 86 are pulled out to move the cellular telephone closely to the user's head, the first antenna parts 53, 67, 82, and 86 can further keep a distance from the head, and thus, deterioration of performances of the antenna of the cellular telephone around the human body can be further decreased.

Figure 68A:
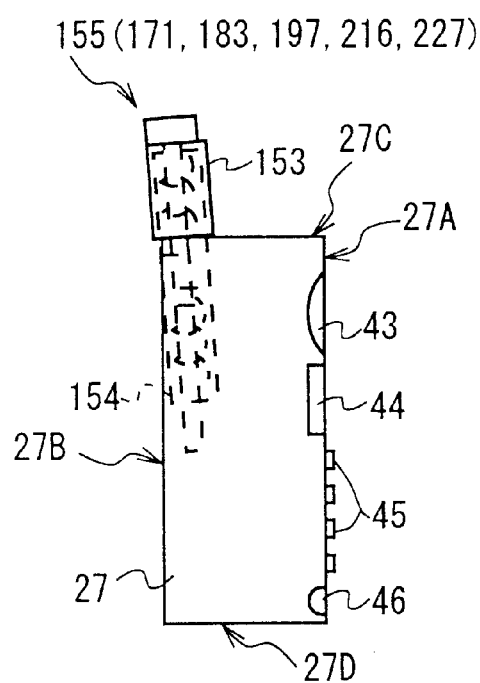
FIGS. 68A and 68B are the outlined drawings of the side view for explanation of retracting and pulling directions of the second antenna parts, according to another embodiment.
Figure 68B:
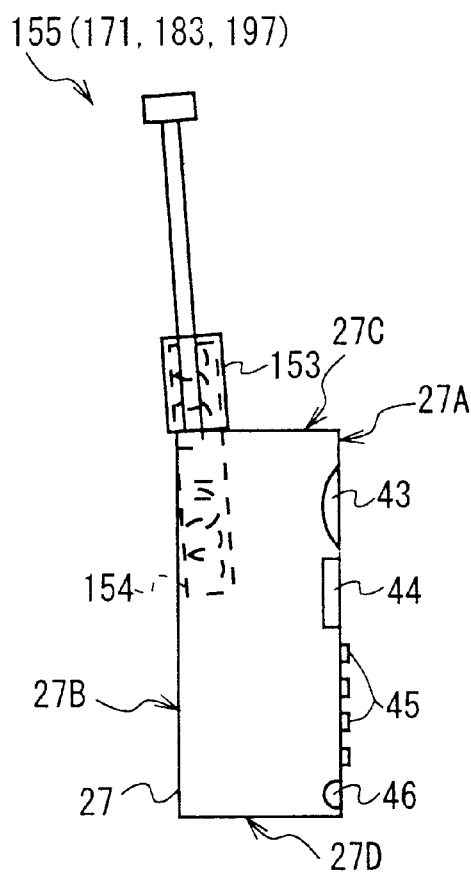
Figure 69A:
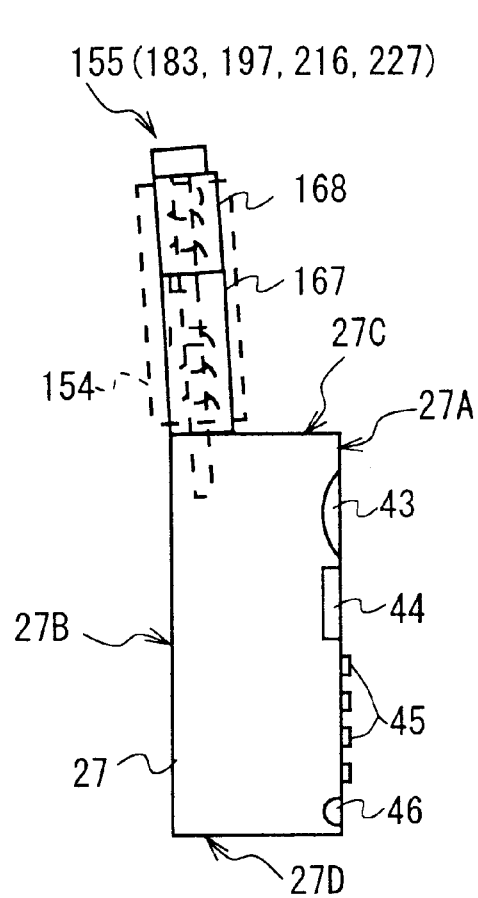
FIGS. 69A and 69B are the outlined drawings of the side view for explanation of retracting and pulling directions of the second antenna parts, according to another embodiment.
Figure 69B:
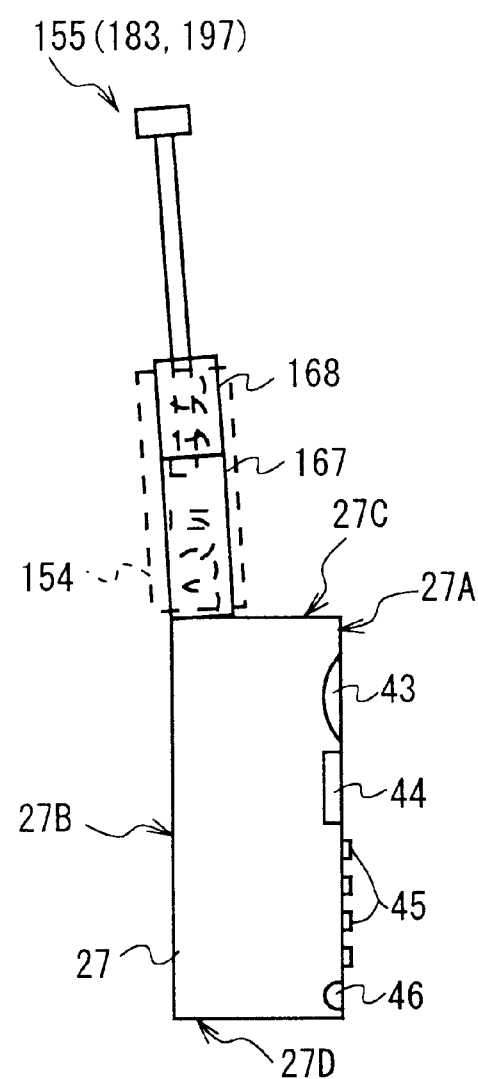

In the ninth to seventeenth embodiments as described above, description has been made on cases adapted to install retractably and pullably the second antenna parts 155, 171, 183, 197, 216, and 227 along with the retracting direction almost parallel to the housing length direction and on the contrary, the pulling direction. However, the present invention is not restricted to this. Similar to FIGS. 68A and 68B in which a same numeral is assigned to a part corresponding to the identical part of the FIG. 32 and FIGS. 69A and 69B in which a same numeral is assigned to a part corresponding to the identical part of the FIG. 35, it can be adapted to install retractably and pullably the second antenna part 155 (171, 183, 197, 216, and 227,) along with the direction sloping toward the housing length direction from the back face 27B side of the top end 27C of the housing case 27 to the front face 27A side of the bottom end 27D.

According to this, under the condition of pulling out the second antenna parts 155, 171, 183, 197, 216, and 227, when the cellular telephone is moved to the user's head closely, the second antenna parts 155, 171, 183, 197, 216, and 227 can be keep a further distance from the head and hence, the performance deterioration of the antenna of the cellular telephone near the human body can be further reduced.

Figure 70:
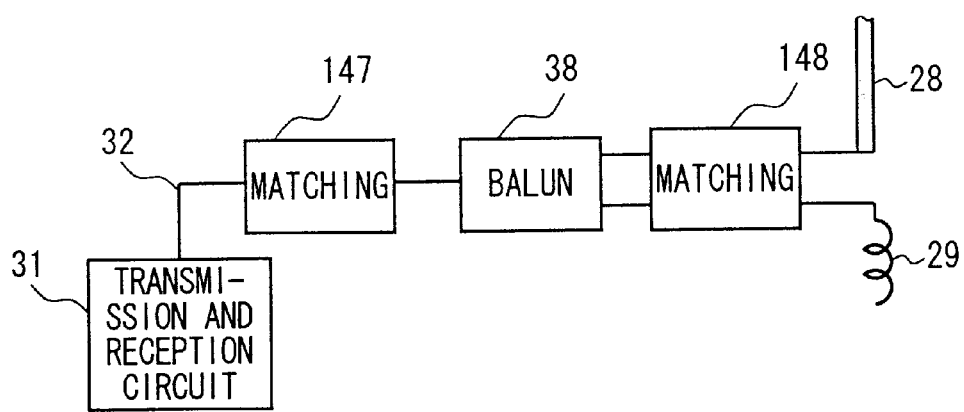
FIG. 70 is the block diagram for explanation of arrangement of the matching circuit, according to another embodiment.

Further, the first to seventeenth embodiments as described above describe cases, as described in the Principle, adapted to install the matching circuit across the transmission and reception circuit 31 and the balun 38 or, the balun 38 and the telescopic antenna 28 and the helical antenna 29. However, the present invention is not restricted to this. As shown in FIG. 70, the matching circuits 147 and 148 can be installed in both the balanced side and the unbalanced side of the balun 38.

Further, the third and the sixth to eighth embodiments as described above describe cases adapted to locate the second helical antenna 62 making the second central axis almost parallel to the housing orthogonal direction or locate the thin, linear antenna 76 making the length direction thereof almost parallel to the housing orthogonal direction. However, the present invention is not restricted to this. It can be adapted to locate the second helical antenna 62 making the second central axis oblique to the housing orthogonal direction or locate the thin, linear antenna 76 making the length direction thereof oblique to the housing orthogonal direction.

Further, the first to seventeenth embodiments as described above describe cases adapted to prevent flow of the leaked current from the second antenna element to the grounded side of the unbalanced transmission line 32 by the balanced-unbalanced converter action of the balun 38. However, the present invention is not restricted to this. It can be adapted to prevent flow of the leaked current from the first antenna element to the grounded side of the unbalanced transmission line 32 by the balanced-unbalanced converter action of the balun 38 by switching the connection of the first and second antenna elements to the terminal of the balanced side of the balun 38.

Further, the first to eighth embodiments as described above describe cases adapted to apply the present invention to the cellular telephone as described above. However, the present invention is not restricted to this, and can be widely applied to other various cellular telephones such as a handset of the cordless telephone.

Furthermore, in the ninth to seventeenth embodiments as described above, description has been made on the cases to be adapted to applying the telescopic antennae 160 and 202 and the first and the second antenna halves 172, 217 and 219, 174 to the first antenna element installed retractably and pullably. However, the present invention is not restricted to this, and can be widely applied to other various first antenna elements.

Furthermore, in the ninth to seventeenth embodiments as described above, description has been made on the cases to be adapted to applying the first and the second helical antennae 156, 198 and 157, 199 to the fixed type second and third antenna elements. However, the present invention is not restricted to, and can be widely applied to other various second and third antenna elements.

Further, the first to seventeenth embodiments as described above describe cases adapted to apply the balun 38 using the phase circuit 42, shown in FIG. 14, to the balanced-unbalanced converter means operating the balanced-unbalanced converter action across the unbalanced transmission line and the first and the second antenna elements. However, the present invention is not restricted to this, and other various the balanced-unbalanced converter means such as various baluns described above can be widely applied.

Further, the first to eighth embodiments as described above describe cases adapted to apply the second helical antenna cover 73 to housing means, which houses the second antenna element and, of which inside the telescopic antenna is pushed in and pulled out through. However, the present invention is not restricted to this. Other various housing means for example, housing means integrally formed with the housing case 27, can be widely applied, if it is adapted to house the second antenna element and push in and pull out telescopic antenna through inside thereof.

Furthermore, in the ninth to seventeenth embodiments as described above, description has been made on the cases to be adapted to applying the first and the second antenna covers 153, 167, 181, 191, 195, 212, 215, and 168, 192, 213 to the housing means by which at least one second and third antenna elements is housed and the first antenna element is passed through the inside thereof to push in and pull out. However, the present invention is not restricted to this, and can be widely applied to other various types of the housing means such as the housing means integrated in the housing case 27, by which at least one second and third antenna elements is housed and the first antenna element is passed through the inside thereof to push in and pull out.

Furthermore, in the ninth to seventeenth embodiments as described above, description has been made on the cases to be adapted to applying the first to the fourth feeding members 158, 151, 161, and 162, the seventh and the eighth feeding members 200 and 201, the first and the second feeding terminals 203 and 206, the first and the second antenna members 205 and 208 to the connecting means to connect electrically any two of the first and the second and the third antenna elements to the balanced converter circuit respectively in pushing and pulling the first antenna element. However, the present invention is not restricted to this, and can be widely applied to other various types of the connecting means, if it allows connecting electrically any two of the first and the second and the third antenna elements to the balanced converter circuit respectively in retracting and pulling the first antenna element.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An antenna apparatus comprising:
  a first antenna element installed retractably and pullably;
  a fixed second antenna element arranged adjacent said first antenna element;
  an unbalanced transmission line feeding said first antenna element and said fixed second antenna element; and
  balanced-unbalanced converter means for performing balanced-unbalanced converter action between said unbalanced transmission line and said first antenna element and said fixed second antenna element, wherein
    at a time of retracting and pulling said first antenna element, said first antenna element and said fixed second antenna element are supplied an electric power from said unbalanced transmission line through said balanced-unbalanced converter means for operating said first antenna element and said fixed second antenna element as an antenna.

2. The antenna apparatus according to claim 1, wherein
said first antenna element is formed by connecting a rod-like telescopic antenna to a first helical antenna through a connecting part made of a nonconductive material,
at the time of retracting said first antenna element, only said telescopic antenna is pushed to connect electrically said first helical antenna to said balanced-unbalanced converter means, and
at the time of pulling said first antenna element, said telescopic antenna is pulled to connect electrically to said balanced-unbalanced converter means.

3. The antenna apparatus according to claim 2, wherein
said telescopic antenna is formed by installing pushably and pullably a conductive rod-like member in a conductive cylindrical member and shorten by pushing said rod-like member in said conductive cylindrical member in retracting said first antenna element.

4. The antenna apparatus according to claim 2, wherein
said second antenna element comprises a second helical antenna and said telescopic antenna is pushably and pullably arranged along a central axis of the helix of the second helical antenna.

5. The antenna apparatus according to claim 4 comprising:
housing means for housing said second antenna element, and to allow pushing and pulling said telescopic antenna passing through inside thereof.

6. The antenna apparatus according to claim 2, wherein
said second antenna element comprises the second helical antenna and is arranged making the central axis of the helix of the second helical antenna almost parallel to a length direction of said telescopic antenna.

7. The antenna apparatus according to claim 6, wherein
said second antenna element comprises an antenna prepared by forming a conductive plate-like material in a predetermined shape.

8. The antenna apparatus according to claim 2, wherein
said second antenna element comprises the second helical antenna and is arranged making the central axis of the helix of the second helical antenna almost orthogonal to the length direction of said telescopic antenna.

9. The antenna apparatus according to claim 1, wherein
said first antenna element is made from a rod-like telescopic antenna,
at the time of retracting said first antenna element, said telescopic antenna is pushed to connect electrically to said balanced-unbalanced converter means, and
at the time of pulling said first antenna element, said telescopic antenna is pulled to connect electrically to said balanced-unbalanced converter means.

10. The antenna apparatus according to claim 9, wherein
in said telescopic antenna, a conductive rod-like member is formed by installing pushably and pullably in a conductive cylindrical member, and said rod-like member is shorten by pushing in said cylindrical member in retracting said first antenna element.

11. A portable radio set having an antenna apparatus, wherein said antenna apparatus comprises:
a first antenna element installed retractably and pullably;
a fixed second antenna element arranged adjacent said first antenna element;
an unbalanced transmission line feeding said first antenna element and said fixed second antenna element; and
balanced-unbalanced converter means performing balanced-unbalanced converter action between said unbalanced transmission line and said first antenna element and said fixed second antenna element, and
at a time of retracting and pulling said first antenna element, said first antenna element and said fixed second antenna element are supplied an electric power from said unbalanced transmission line through said balanced-unbalanced converter means for operating said first antenna element and fixed second antenna element as an antenna.

12. The portable radio set according to claim 11 further comprising:
a housing case through which said first antenna element is pushed in and pulled out, wherein
said antenna apparatus is formed by connecting a rod-like telescopic antenna to a first helical antenna through a connecting part made of a nonconductive material,
at the time of retracting said first antenna element, only said telescopic antenna is pushed in said housing case to connect electrically said first helical antenna to said balanced-unbalanced converter means,
at the time of pulling said first antenna element, said telescopic antenna is pulled from said housing case to connect electrically to said balanced-unbalanced converter means.

13. The portable radio set according to claim 12, wherein
said telescopic antenna is formed by installing pushably and pullably a conductive rod-like member in a conductive cylindrical member and shorten by pushing said rod-like member in said cylindrical member in retracting said first antenna element.

14. The portable radio set according to claim 12, wherein
said second antenna element comprises a second helical antenna and said telescopic antenna is pushably and pullably arranged along with a central axis of the helix of the second helical antenna.

15. The portable radio set according to claim 14, wherein
said antenna apparatus has a housing means installed in said housing case by projecting, houses said second antenna element, and allows pushing and pulling said telescopic antenna passing through inside thereof.

16. The portable radio set according to claim 12, wherein
said second antenna element comprises the second helical antenna and is arranged making the central axis of the helix of the second helical antenna almost parallel to a length direction of said telescopic antenna.

17. The portable radio set according to claim 16, wherein
said second antenna element comprises an antenna prepared by forming a conductive plate-like material in a predetermined shape.

18. The portable radio set according to claim 12, wherein
said second antenna element comprises the second helical antenna and is arranged making the central axis of the helix of the second helical antenna almost orthogonal to the length direction of said telescopic antenna.

19. The portable radio set according to claim 11 further comprising:
a housing case through which said first antenna element is pushed in and pulled out, wherein
in said antenna apparatus, said first antenna element comprises the rod-like telescopic antenna,
at the time of retracting said first antenna element, said telescopic antenna is pushed in said housing case to electrically connect to said balanced-unbalanced converter means, and at the time of pulling said first antenna element, said telescopic antenna is pulled from said housing case to electrically connect to said balanced-unbalanced converter means.

20. The portable radio set according to claim 19, wherein in said telescopic antenna, the conductive rod-like member is formed by installing pushably and pullably in a conductive cylindrical member, and said rod-like member is shorten by pushing in said cylindrical member in retracting said first antenna element.

21. The portable radio set according to claim 11, wherein said first and said second antenna elements is installed in a back face side, opposite to a frontal face, of said housing case to move to a human body closely.

22. An antenna apparatus comprising:

a first antenna element installed pushably and pullably;

fixed second and third antenna elements;

an unbalanced transmission line feeding to said first and second and third antenna elements, balanced-unbalanced converter means operating the balanced converter between said second and third antenna elements, wherein at the time of pushing said first antenna element, said first antenna element is electrically connected to said third antenna elements to make a first complex antenna to work as an antenna by feeding said second antenna elements and said first complex antenna from said unbalanced transmission line through said balanced-unbalanced converter means, and at the time of pulling out said first antenna element, said first antenna element is electrically connected to said second antenna elements to make a second complex antenna to work as an antenna by feeding said second complex antenna and third antenna elements from said unbalanced transmission line through said balanced-unbalanced converter means.

23. The antenna apparatus according to claim 22, wherein said first antenna element is formed in the rod shape, and said second and third antenna elements are formed in a helical shape and either ends or any one end thereof is electrically connected to said first antenna elements in pushing in and pulling out said first antenna element.

24. The antenna apparatus according to claim 23, wherein at least one of said second and third antenna elements and having sheathing means of which inside said first antenna element is pushed in and pulled out through.

25. The antenna apparatus according to claim 24, wherein said second and third antenna elements are arranged as said first antenna element is pushed in and pulled out along with a central axis of said helix.

26. The antenna apparatus according to claim 25, wherein said first antenna element is telescopically formed by passing the conductive rod member through a hole part of the conductive cylindrical member, and shortened in pushing in said first antenna element.

27. The antenna apparatus according to claim 23, wherein said first antenna element is formed in the rod shape, and said second and third antenna elements are formed in the helical shape and the central axis of the helix is arranged in almost parallel with a length direction of said first antenna element.

28. The antenna apparatus comprising:

a first antenna element installed pushably and pullably;

a fixed second and third antenna elements;

an unbalanced transmission line feeding to said first and second and third antenna elements;

balanced-unbalanced converter means operating the balanced converter between said unbalanced transmission line and said first and second and third antenna elements; and connection means connecting electrically any two of said first and second and third antenna elements to balanced converter circuit respectively in pushing in and pulling out said first antenna element, wherein at the time of pushing in said first antenna element, said first and second antenna elements are electrically connected to said balanced converter circuit respectively through said connection means to work as an antenna by feeding said first antenna element and said second antenna elements from said unbalanced transmission line through said balanced-unbalanced converter means, and at the time of pulling out said first antenna element, said first and third antenna elements are electrically connected to said balanced converter circuit through said connection means to work as the antenna by feeding said first and third antenna elements from said unbalanced transmission line through said balanced-unbalanced converter means.

29. The antenna apparatus according to claim 28, wherein at least one of said second and third antenna elements and having housing means of which inside said first antenna element is retracted and pulled out through.

30. The antenna apparatus according to claim 29, wherein said first antenna element is formed in the rod shape, and said second and third antenna elements are arranged as said first antenna element is pushed -in and pulled out along with the central axis of said helix.

31. The antenna apparatus according to claim 30, wherein said first antenna element is telescopically formed by passing the conductive rod member through the hole part of the conductive cylindrical member, and shortened in pushing in said first antenna element.

32. The antenna apparatus according to claim 28, wherein said first antenna element is formed in the rod shape, and said second and third antenna elements are formed in the helical shape and the central axis of the helix is arranged in almost parallel with a length direction of said first antenna element.

33. A portable radio set having the antenna apparatus comprising:

a first antenna element installed pushably and pullably;

fixed second and third antenna elements;

an unbalanced transmission line feeding to said first and second and third antenna elements;

balanced-unbalanced converter means operating the balanced converter between said unbalanced transmission line and said second and third antenna elements, and at the time of pushing in said first antenna element, said first antenna element is electrically connected to said third antenna elements to make a first complex antenna to work as an antenna by feeding said second antenna elements and said first complex antenna from said unbalanced transmission line through said balanced-unbalanced converter means, and at the time of pulling out said first antenna element, said first antenna element is electrically connected to said second antenna elements to make a second complex antenna to work as an antenna by feeding said second complex antenna and third antenna elements from said unbalanced transmission line through said balanced-unbalanced converter means.

34. The portable radio set according to claim 33, wherein said first antenna element is formed in the rod shape, and said second and third antenna elements are formed in a helical shape and either ends or any one end thereof is electrically connected to said first antenna elements in pushing in and pulling out said first antenna element.

35. The portable radio set according to claim 34 further comprising:

a housing case through which said first antenna element is pushed in and pulled out, wherein
said antenna apparatus has housing means installed projecting from said housing case and including at least one of said second and third antenna elements, wherein said first antenna element is retracted and pulled out through inside thereof.

36. The portable radio set according to claim 35, wherein said second and third antenna elements are arranged as said first antenna element is pushed in and pulled out along with a central axis of said helix.

37. The portable radio set according to claim 36, wherein said first antenna element is telescopically formed by passing the conductive rod member through a hole part of the conductive cylindrical member, and shortened in pushing in said first antenna element.

38. The portable radio set according to claim 34, wherein said first antenna element is formed in the rod shape, and said second and third antenna elements are formed in the helical shape and the central axis of the helix is arranged in almost parallel with a length direction of said first antenna element.

39. A portable radio set having the antenna apparatus comprising:

a first antenna element installed pushably and pullably;

a fixed second and third antenna elements;

an unbalanced transmission line feeding to said first and second and third antenna elements;

balanced-unbalanced converter means operating the balanced converter between said unbalanced transmission line and said first and second and third antenna elements;

connection means connecting electrically any two of said first and second and third antenna elements to balanced converter circuit respectively in pushing in and pulling out said first antenna element, and at the time of pushing in said first antenna element, said first and second antenna elements are electrically connected to said balanced converter circuit respectively through said connection means to work as an antenna by feeding said first antenna element and said second antenna elements from said unbalanced transmission line through said balanced-unbalanced converter means, and at the time of pulling out said first antenna element, said first and third antenna elements are electrically connected to said balanced converter circuit through said connection means to work as the antenna by feeding said first and third antenna elements from said unbalanced transmission line through said balanced-unbalanced converter means.

40. The portable radio set according to claim 39 further comprising:

a housing case through which said first antenna element is pushed in and pulled out, wherein
said antenna apparatus has housing means installed projecting from said housing case and including at least one of said second and third antenna elements, wherein said first antenna element is retracted in and pulled out through inside thereof.

41. The portable radio set according to claim 40, wherein said first antenna element is formed in the rod shape, and said second and third antenna elements are arranged as said first antenna element is pushed in and pulled out along with the central axis of said helix.

42. The portable radio set according to claim 41, wherein said first antenna element is telescopically formed by passing the conductive rod member through the hole part of the conductive cylindrical member, and shortened in pushing in said first antenna element.

43. The portable radio set according to claim 39, wherein said first antenna element is formed in the rod shape, and said second and third antenna elements are formed in the helical shape and the central axis of the helix is arranged in almost parallel with a length direction of said first antenna element.

* * * * *